(12) United States Patent
Orlowski

(10) Patent No.: US 11,968,421 B2
(45) Date of Patent: *Apr. 23, 2024

(54) MEASURING VIDEO-PROGRAM-VIEWING ACTIVITY

(71) Applicant: Comcast Cable Communications, LLC, Philadelphia, PA (US)

(72) Inventor: Robert Alan Orlowski, Centennial, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/662,149

(22) Filed: May 5, 2022

(65) Prior Publication Data

US 2022/0368983 A1    Nov. 17, 2022

Related U.S. Application Data

(63) Continuation of application No. 16/549,440, filed on Aug. 23, 2019, now Pat. No. 11,363,331, which is a
(Continued)

(51) Int. Cl.
*H04H 60/32* (2008.01)
*H04N 21/25* (2011.01)
(Continued)

(52) U.S. Cl.
CPC ..... *H04N 21/44204* (2013.01); *H04N 21/252* (2013.01); *H04N 21/258* (2013.01); *H04N 21/2407* (2013.01); *H04N 21/4788* (2013.01)

(58) Field of Classification Search
CPC .......... H04N 21/44204; H04N 21/252; H04N 21/258; H04N 21/2407; H04N 21/4788
(Continued)

(56) References Cited

U.S. PATENT DOCUMENTS 5,374,951 A   12/1994   Welsh
5,589,892 A   12/1996   Knee et al.
(Continued)

FOREIGN PATENT DOCUMENTS

CN   102236867 A   11/2011
EP     1995878 A   11/2008
(Continued)

OTHER PUBLICATIONS

U.S. Pat. No. 8,365,212, System and Method for Analyzing Human Interaction with Electronic Devices that Access a Computer System Through a Network, Jan. 29, 2013.
(Continued)

*Primary Examiner* — Jefferey F Harold
*Assistant Examiner* — Sahar Aqil Riaz
(74) *Attorney, Agent, or Firm* — Banner & Witcoff, Ltd.

(57) ABSTRACT

A computer-implemented method of using video viewer interaction data as input to a measurement engine which then calculates: demographic level and aggregate level (a) household reach for advertisements and video content based on user defined reach periods, (b) One-minute, Thirty-minute, and Sixty-minute channel viewing metrics, and (c) One-minute, Thirty-minute, and Sixty-minute aggregate viewing metrics, all based on second-by-second household level viewing activity. Also shows creation of Commercial Schedule Cumulative Audience, Impressions for Reach Periods, Demographic Group Impressions, Average Audience, Average Audience Share, Average Rating, Households Using Television, and Households Using Television Percent using household level data. Works with IP and linear video delivery. Together these metrics provide detailed information on customer viewing behavior which can be used to drive business decisions for service providers, advertisers, and content producers.

20 Claims, 64 Drawing Sheets

Related U.S. Application Data continuation of application No. 13/740,199, filed on Jan. 13, 2013, now Pat. No. 10,440,428.

(51) Int. Cl.
*H04N 21/258* (2011.01)
*H04N 21/442* (2011.01)
*H04N 21/24* (2011.01)
*H04N 21/4788* (2011.01)

(58) Field of Classification Search
USPC .......................................................... 725/46
See application file for complete search history.

(56) References Cited

U.S. PATENT DOCUMENTS

| | | |
|---|---|---|
| 5,790,935 A | 8/1998 | Payton |
| 5,872,588 A | 2/1999 | Aras et al. |
| 6,286,005 B1 | 9/2001 | Cannon |
| 6,449,350 B1 | 9/2002 | Cox |
| 6,820,277 B1 | 11/2004 | Eldering et al. |
| 7,383,243 B2 | 6/2008 | Conkwright et al. |
| 7,490,045 B1 | 2/2009 | Flores et al. |
| 7,509,663 B2 | 3/2009 | Maynard et al. |
| 7,590,993 B1 | 9/2009 | Hendricks et al. |
| 7,614,064 B2 | 11/2009 | Zigmond |
| 7,729,940 B2 | 6/2010 | Harvey et al. |
| 7,930,391 B1 | 4/2011 | Holt |
| 8,001,561 B2 | 8/2011 | Gibbs et al. |
| 8,079,054 B1 | 12/2011 | Dhawan et al. |
| 8,108,886 B1 | 1/2012 | Murahashi et al. |
| 8,214,867 B2 | 7/2012 | Hudspeth |
| 8,280,996 B2 | 10/2012 | Lu et al. |
| 8,351,645 B2 | 1/2013 | Srinivasan |
| 8,352,984 B2 | 1/2013 | Gogoi et al. |
| 8,365,212 B1 | 1/2013 | Orlowski |
| 8,365,213 B1 | 1/2013 | Orlowski |
| 8,453,173 B1 | 5/2013 | Anderson et al. |
| 8,548,991 B1 | 10/2013 | Zamir et al. |
| 8,694,396 B1 | 4/2014 | Craner et al. |
| 8,739,197 B1 | 5/2014 | Pecjak et al. |
| 8,745,647 B1 | 6/2014 | Shin et al. |
| 8,924,993 B1 | 12/2014 | Niebles Duque et al. |
| 8,949,873 B1 | 2/2015 | Bayer et al. |
| 8,959,540 B1 | 2/2015 | Gargi et al. |
| 9,277,275 B1 | 3/2016 | Arini |
| 9,363,464 B2 | 6/2016 | Alexander |
| 9,420,320 B2 | 8/2016 | Doe |
| 9,794,360 B1 | 10/2017 | Farhangi et al. |
| 9,854,292 B1 | 12/2017 | Matthews et al. |
| 9,883,233 B1 | 1/2018 | Barton |
| 10,070,177 B1 | 9/2018 | Gupta |
| 10,779,042 B1 * | 9/2020 | Gupta ............... H04N 21/23418 |
| 11,240,539 B1 | 2/2022 | Joshi et al. |
| 11,265,602 B2 * | 3/2022 | Malhotra ......... H04N 21/44204 |
| 2002/0055854 A1 | 5/2002 | Kurauchi et al. |
| 2002/0056087 A1 | 5/2002 | Berezowski et al. |
| 2002/0059576 A1 | 5/2002 | Feininger et al. |
| 2002/0062393 A1 | 5/2002 | Borger et al. |
| 2002/0083451 A1 | 6/2002 | Gill et al. |
| 2002/0104083 A1 | 8/2002 | Hendricks et al. |
| 2002/0129368 A1 | 9/2002 | Schlack et al. |
| 2002/0144262 A1 | 10/2002 | Plotnick et al. |
| 2002/0194196 A1 | 12/2002 | Weinberg et al. |
| 2003/0020744 A1 | 1/2003 | Ellis et al. |
| 2003/0046696 A1 | 3/2003 | Mizuno et al. |
| 2003/0088715 A1 | 5/2003 | Chaudhuri et al. |
| 2003/0115585 A1 | 6/2003 | Barsness et al. |
| 2003/0145323 A1 | 7/2003 | Hendricks et al. |
| 2003/0149988 A1 | 8/2003 | Ellis et al. |
| 2003/0172374 A1 | 9/2003 | Vinson et al. |
| 2003/0174160 A1 | 9/2003 | Deutscher et al. |
| 2003/0237095 A1 | 12/2003 | Srinivas |
| 2004/0019899 A1 | 1/2004 | Pelletier |
| 2004/0215698 A1 | 10/2004 | Bertin |
| 2004/0268226 A1 | 12/2004 | McMullin |
| 2005/0060745 A1 | 3/2005 | Riedl et al. |
| 2005/0086110 A1 | 4/2005 | Haley et al. |
| 2005/0149964 A1 | 7/2005 | Thomas et al. |
| 2005/0204387 A1 | 9/2005 | Knudson et al. |
| 2005/0229199 A1 | 10/2005 | Yabe |
| 2005/0235307 A1 | 10/2005 | Relan et al. |
| 2005/0286860 A1 | 12/2005 | Conklin |
| 2006/0015891 A1 | 1/2006 | Lazzaro et al. |
| 2006/0075420 A1 | 4/2006 | Ludvig et al. |
| 2006/0075421 A1 | 4/2006 | Roberts et al. |
| 2006/0168609 A1 | 7/2006 | Chen |
| 2006/0184961 A1 | 8/2006 | Lee et al. |
| 2006/0198302 A1 | 9/2006 | Sofman et al. |
| 2006/0223495 A1 | 10/2006 | Cassett et al. |
| 2007/0067794 A1 | 3/2007 | Russell et al. |
| 2007/0074258 A1 | 3/2007 | Wood et al. |
| 2007/0092204 A1 | 4/2007 | Wagner et al. |
| 2007/0124756 A1 | 5/2007 | Covell et al. |
| 2007/0136753 A1 | 6/2007 | Bovenschulte et al. |
| 2007/0157249 A1 | 7/2007 | Cordray et al. |
| 2007/0157260 A1 | 7/2007 | Walker |
| 2007/0186228 A1 | 8/2007 | Ramaswamy et al. |
| 2007/0214483 A1 | 9/2007 | Bou-Abboud |
| 2007/0271300 A1 | 11/2007 | Ramaswamy |
| 2007/0283409 A1 | 12/2007 | Golden |
| 2007/0288950 A1 | 12/2007 | Downey et al. |
| 2008/0046912 A1 | 2/2008 | Gemelos et al. |
| 2008/0077951 A1 | 3/2008 | Maggio et al. |
| 2008/0127252 A1 | 5/2008 | Eldering et al. |
| 2008/0300965 A1 | 12/2008 | Doe |
| 2009/0007171 A1 | 1/2009 | Casey et al. |
| 2009/0052864 A1 | 2/2009 | Ohde |
| 2009/0070798 A1 | 3/2009 | Lee et al. |
| 2009/0077577 A1 | 3/2009 | Allegrezza et al. |
| 2009/0077579 A1 | 3/2009 | Li et al. |
| 2009/0094630 A1 | 4/2009 | Brown |
| 2009/0100456 A1 | 4/2009 | Hughes |
| 2009/0133047 A1 | 5/2009 | Lee et al. |
| 2009/0150224 A1 | 6/2009 | Lu et al. |
| 2009/0150814 A1 | 6/2009 | Eyer et al. |
| 2009/0172725 A1 | 7/2009 | Heilbron et al. |
| 2009/0183210 A1 | 7/2009 | Andrade |
| 2009/0193460 A1 | 7/2009 | Barnett |
| 2009/0268905 A1 | 10/2009 | Matsushima et al. |
| 2009/0313232 A1 | 12/2009 | Tinsley et al. |
| 2009/0327208 A1 | 12/2009 | Bittner et al. |
| 2010/0043021 A1 | 2/2010 | Torsiello et al. |
| 2010/0088716 A1 | 4/2010 | Ellanti et al. |
| 2010/0145791 A1 | 6/2010 | Canning et al. |
| 2010/0161492 A1 | 6/2010 | Harvey et al. |
| 2010/0211439 A1 | 8/2010 | Marci et al. |
| 2010/0235852 A1 | 9/2010 | Mears |
| 2010/0251302 A1 | 9/2010 | Chao et al. |
| 2010/0262986 A1 | 10/2010 | Adimatyam et al. |
| 2010/0330954 A1 | 12/2010 | Manning Cassett et al. |
| 2011/0069940 A1 | 3/2011 | Shimy et al. |
| 2011/0072448 A1 | 3/2011 | Stiers et al. |
| 2011/0110515 A1 | 5/2011 | Tidwell et al. |
| 2011/0126241 A1 | 5/2011 | Beattie, Jr. et al. |
| 2011/0145847 A1 | 6/2011 | Barve et al. |
| 2011/0289524 A1 | 11/2011 | Toner et al. |
| 2011/0307913 A1 | 12/2011 | Wang et al. |
| 2011/0321077 A1 | 12/2011 | Wang et al. |
| 2012/0005527 A1 | 1/2012 | Engel et al. |
| 2012/0079518 A1 | 3/2012 | Wan et al. |
| 2012/0151511 A1 | 6/2012 | Bernard et al. |
| 2012/0191815 A1 | 7/2012 | Tabbal et al. |
| 2012/0222058 A1 | 8/2012 | el Kaliouby et al. |
| 2012/0240143 A1 | 9/2012 | Mathews |
| 2012/0254911 A1 | 10/2012 | Doe |
| 2012/0260278 A1 | 10/2012 | Lambert et al. |
| 2012/0278161 A1 | 11/2012 | Lazzaro |
| 2012/0278179 A1 | 11/2012 | Campbell et al. |
| 2012/0278828 A1 | 11/2012 | Yazdani et al. |
| 2012/0296909 A1 | 11/2012 | Cao et al. |
| 2012/0304210 A1 | 11/2012 | Zaslavsky et al. |
| 2012/0304211 A1 | 11/2012 | Berezowski et al. |
| 2013/0007789 A1 | 1/2013 | Wang et al. |

(56) References Cited

U.S. PATENT DOCUMENTS

| | | | |
|---|---|---|---|
| 2013/0024901 A1 | 1/2013 | Sharif-Ahmadi et al. | |
| 2013/0124309 A1 | 5/2013 | Traasdahl et al. | |
| 2013/0145385 A1 | 6/2013 | Aghajanyan et al. | |
| 2013/0173765 A1 | 7/2013 | Korbecki | |
| 2013/0198125 A1 | 8/2013 | Oliver et al. | |
| 2013/0247081 A1 | 9/2013 | Vinson et al. | |
| 2013/0254787 A1* | 9/2013 | Cox | H04N 21/252 725/13 |
| 2013/0283304 A1 | 10/2013 | Wan et al. | |
| 2013/0346154 A1 | 12/2013 | Holz et al. | |
| 2014/0075465 A1 | 3/2014 | Petrovic et al. | |
| 2014/0109124 A1* | 4/2014 | Morales | H04N 21/44204 725/14 |
| 2014/0123173 A1 | 5/2014 | Mak et al. | |
| 2014/0150005 A1 | 5/2014 | Kalmes et al. | |
| 2014/0181019 A1 | 6/2014 | Bajaria et al. | |
| 2014/0359649 A1 | 12/2014 | Cronk et al. | |
| 2015/0113153 A1 | 4/2015 | Lin | |
| 2015/0128162 A1 | 5/2015 | Ionescu | |
| 2016/0261655 A1 | 9/2016 | Aggarwal et al. | |
| 2016/0314404 A1* | 10/2016 | Carmichael | G06F 16/435 |
| 2017/0289226 A1 | 10/2017 | Deshpande et al. | |
| 2018/0007431 A1 | 1/2018 | Sidhu et al. | |
| 2019/0378164 A1 | 12/2019 | Fich et al. | |
| 2019/0379938 A1 | 12/2019 | Salo et al. | |
| 2020/0296456 A1 | 9/2020 | Yungster | |
| 2021/0058670 A1 | 2/2021 | Benamrouche | |
| 2021/0158391 A1 | 5/2021 | Sheppard et al. | |
| 2021/0240681 A1 | 8/2021 | Algranati et al. | |
| 2022/0084052 A1 | 3/2022 | Sheppard et al. | |
| 2022/0150581 A1 | 5/2022 | Sidhu et al. | |
| 2022/0159326 A1 | 5/2022 | Sheppard et al. | |
| 2022/0182722 A1 | 6/2022 | Bolivar et al. | |
| 2022/0256219 A1 | 8/2022 | Saafi | |
| 2022/0286722 A1 | 9/2022 | Milavsky et al. | |
| 2022/0303618 A1 | 9/2022 | Whitely et al. | |
| 2022/0383350 A1 | 12/2022 | Keshavan et al. | |

FOREIGN PATENT DOCUMENTS

| | | |
|---|---|---|
| WO | 98/31114 5 | 7/1998 |
| WO | 2012162693 A1 | 11/2012 |
| WO | 2013033123 A2 | 3/2013 |

OTHER PUBLICATIONS

U.S. Pat. No. 8,365,213, System and Method for Measuring Television Advertising and Program Viewing at a Second-by-Second Level and for Measuring Effectiveness of Targeted Advertising, Jan. 29, 2013.
U.S. Pat. No. 10,089,592, Measuring Video Asset Viewing, Oct. 2, 2018.
U.S. Pat. No. 10,440,428, Measuring Video-Program-Viewing Activity, Oct. 8, 2019.
U.S. Pat. No. 10,645,433, Measuring Video-Content Viewing, May 5, 2020.
U.S. Pat. No. 10,945,011, Measuring Video Viewing, Mar. 9, 2021.
U.S. Pat. No. 11,012,726, Measuring Video-Content Viewing, May 18, 2021.
U.S. Pat. No. 11,212,565, Measuring Video-Content Viewing, Dec. 28, 2021.
U.S. Pat. No. 11,218,755, Measuring Video Viewing, Jan. 4, 2022.
U.S. Pat. No. 11,363,331, Measuring Video-Program-Viewing Activity, Jun. 14, 2022.
U.S. Appl. No. 14/020,778, Measuring Video-Program Viewing, filed Sep. 6, 2013.
U.S. Appl. No. 14/037,352, Data Translation for Video-Viewing Activity, filed Sep. 25, 2013.
U.S. Appl. No. 14/608,929, System and Method for Analyzing Human Interaction with Electronic Devices that Access a Computer System Through a Network, filed Jan. 29, 2015.
U.S. Appl. No. 14/608,960, System and Method for Measuring Television Advertising and Program Viewing at a Second-by-Second Level and for Measuring Effectiveness of Targeted Advertising, filed Jan. 29, 2015.
U.S. Appl. No. 16/032,414, Measuring Video-Asset Viewing, filed Jul. 11, 2018.
U.S. Appl. No. 17/532,563, Measuring Video Viewing, filed Nov. 22, 2021.
U.S. Appl. No. 17/533,375, Measuring Video-Content Viewing, filed Nov. 23, 2021.
Ineoquest Technologies, Inc., "Switched Digital Video Solutions", http://www.ineoquest.com/switched-digital-video-solutions, Dec. 28, 2010, pp. 1-2.
Cisco Systems, Inc., "Channel Viewership Analyzer", 2009, Web page: http://www.cisco.com/en/us/prod/collateral/video/ps9119/ps9883/7016867.pdf, pp. 1-2.
Motorola, Inc., Solutions Paper, "Implementing Switched Digital Video Solutions", http://www.motorola.com/staticfiles/Business/Products/_Documents/_Static%20files/SDV%20Implementation%20Solutions%20paper%20-555998-001-a.pdf?localeId=33, Copyright 2008, p. 6.
Strickland, Jonathan, "How Switched Digital Video Works", Nov. 20, 2007. HowStuffWorks.com. <http://electronics.howstuffworks.com/switched-digital-video.htm>, pp. 1-4.
Rentrak Corporation, Television, TV Essentials, Web source: http://www.rentrak.com/section/media/tv/linear.html, Feb. 1, 2011, p. 1.
Wayne Friedman, Rentrak's 'Stickiness' Mines TV Value On Granular Level, MediaPost, Jan. 27, 2010, Web source: http://www.tvb.org/media/file/TVB_Measurement_Rentraks_Stickiness_Mines_TV_Value_on_Granular_Level_1-27-10.pdf.
Rentrak Corporation, Reaching Your Target Audience Using Viewership Segments, Rentrak Case Studies, http://rentrak.com/downloads/Viewership_Segment_Case_Study.pdf, Oct. 18, 2013, p. 1-2.
Rentrak Corporation, Reaching Your Target Audience Using Commercial Ratings and Pod Analysis, Rentrak Case Studies, http://www.rentrak.com/downloads/Commercial_and_Pod_Analysis_Case_Study.pdf, Oct. 18, 2013, p. 1-2.
Rentrak Corporation, Rentrak Overview: Exact Commercial Ratings®, http://www.rentrak.com/downloads/Exact_Commercial_Ratings_Presentation.pdf, Jan. 22, 2013, p. 1-30.
Tim Brooks, Stu Gray, Jim Dennison, "The State Of Set-Top Box Viewing Data as of Dec. 2009", STB Committee of the Council for Research Excellence. Research Report, Feb. 24, 2010, http://researchexcellence.com/stbstudy.php, pp. 1-9.
FourthWall Media, Product information from web page, MassiveDataTM, http://www.fourthwallmedia.tv, Oct. 18, 2013, p. 1.
Cisco Systems, Inc., "Network Efficiency with Switched Digital", Web page: http://www.cisco.com/en/US/products/ps9258/index.html, accessed Oct. 13, 2014, 2 pages.
Cisco Systems, Inc., "Access Viewership Data, Monitor Performance", Web page: http://www.cisco.com/en/US/products/ps9122/index.html, accessed May 20, 2013, 1 page.
Extended European Search Report—EP 14183827.6—dated Oct. 23, 2014.
Extended European Search Report—EP 14182927.5—dated Dec. 16, 2014.
Terry A. Welch, Sperry Research Center, "A Technique for High-Performance Data Compression," 1984.
Extended European Search Report, EP Application 14186382.9, dated February Feb. 4, 2015.
Response to European Search Report—EP Appl. 14182927.5—dated Sep. 4, 2015.
Response to European Search Report—EP 14183827.6—dated Sep. 10, 2015.
Response to EP Search Report—EP 14186382.9—dated Sep. 29, 2015.
EP Office Action—EP App 14182927.5—dated Mar. 31, 2016.
Konstantin Shvachko et al.: "The Hadoop Distributed File System", Mass Storage Systems and Technologies (MSST), 2010 IEEE 26th Symposium On, IEEE, Piscataway, NJ, USA, May 3, 2010 (May 3, 2010), pp. 1-10, XP031698650, ISBN: 978-1-4244-7152-2.

(56) References Cited

OTHER PUBLICATIONS

Anonymous: "Apache Hadoop", Sep. 5, 2013 (Sep. 5, 2013), XP055394634, Retrieved from the Internet: URL: https://en.wikipedia.org/w/index.php?title=Apache_Hadoop&oldid=571641303 [retrieved on Jul. 28, 2017].
Aug. 4, 2017—(EP) Office Action—App No. 14183827.6.
May 22, 2018—European Office Action—EP 14183827.6.
Mark Landler, Digital TV Converter Boxes to Expand Cable Offerings, 1996, The New York Times.
Mar. 22, 2019—EP Office Action—EP 14186382.9.
Nov. 10, 2020—CA Office Action—CA 2,864,621.
Nov. 6, 2020—EP Office Action—EP 14186382.9.
Jan. 12, 2021—Canadian Office Action—CA 2,860,802.
Jan. 13, 2021—Canadian Office Action—CA 2,861,861.
Jun. 23, 2021—Canadian Office Action—CA 2,864,621.
Jun. 22, 2021—European Office Action—EP 14186382.9.
Nov. 3, 2021—Canadian Office Action—CA 2,860,802.
Nov. 5, 2021—Canadian Office Action—CA 2,861,861.
Dec. 9, 2021—European Office Action—14186382.9.

\* cited by examiner

FIG. 5
Summary Information

| Specification Name: | Channel Mapping Definition File Structure file 120 |
|---|---|
| Computer Program Name: | CHANNEL-MAPPING-DEF-REC |
| Record description: | The Channel Mapping Definition File Structure is used to map one or more channels to a single channel for aggregation purposes. It is common that multiple channels may map to a single channel for aggregation. An example is that Viewing Activity for both a standard definition channel and a high definition channel may be captured in the Tuning Activity file; when calculating overall viewership, both of these channels should be combined into a single target channel. The business analyst will define this mapping. This data structure allows the analyst to map any number of Source channels to a single Target channel; this can be used to aggregate channels with the same content (the standard definition and high definition versions) or to aggregate multiple lightly viewed channels together in a single bucket in the aggregation process. This mapping is done during the Data Preparation phase prior to aggregation. |
| Input File Name used by PreProcessing Engine 140 and Measurement Engine 200 | channel-mapping-def.csv |

Data Structure

|          | 2000 | 2002 | 2004 | 2006 |
|----------|------|------|------|------|
|          | NAME | TYPE | SIZE | DESCRIPTION |
| 2010~ | IN-C-MAP-REGION | CHAR | 4 | The Region or Geographic area applicable to the Channel Mapping. This may be a city or a market where these channel call signs are used. Used to populate FIG 6 2110. |
| 2020~ | IN-C-MAP-CALL-SIGN-SOURCE | CHAR | 10 | The Channel Call Sign as represented in the Source file. Used to populate FIG 6 2120. |
| 2030~ | IN-C-MAP-CALL-SIGN-TARGET | CHAR | 10 | The Channel Call Sign that should be used for aggregation purposes. Used to populate FIG 6 2130. |
| 2040~ | IN-C-MAP-AGGREGATION-NBR | NUMBER | 3 | The Mapping Aggregation Number. This is used by the program to assign a row in the aggregation data structure to use for aggregating data for the Target channel. Used to populate FIG 6 2140. |

FIG. 5 – Continued

Sample Data

DENV|ABC|ABC|006|
DENV|DISNEY|DISNEY|007|
DENV|DISNEYHD|DISNEY|007|
DENV|FOOD|MISC|009|
DENV|SHOP|MISC|009|
DENV|TRAVEL|MISC|009|

FIG. 6

Summary Information

| Specification Name: | Channel Mapping Definition Array Data Structure |
|---|---|
| Computer Program Name: | CHANNEL-MAPPING-DEF-TABLE |
| Record description: | The Channel Mapping Definition Array Data Structure is the data structure used to record the Channel Mapping Definitions. This Data Structure is loaded from the Channel Mapping Definition File Structure FIG 5.<br><br>Usage: During the mapping process, in preparation for aggregating the channel tuning data, the system looks for a match on the Channel Call Sign in the Tuning Record with the value in CHAN-MAP-CALL-SIGN-SOURCE. Then the system enriches the Tuning Record with the CHAN-MAP-CALL-SIGN-TARGET and the CHAN-MAP-AGGREGATION-NBR. |

FIG. 6 - Continued

Data Structure

| | NAME (2100) | TYPE (2102) | SIZE (2104) | DESCRIPTION (2106) |
|---|---|---|---|---|
| | \multicolumn{4}{} | | | The following fields occur 600 times to allow for 600 Channel Mappings to be processed.<br><br>Note: Mapping multiple source channels to a single target channel enables the analysis of viewing activity and the calculation of Reach period viewing across different channels that carry the same content while maintaining the detail tuning events in the source video viewing file for use in specific channel viewing measurements such as bandwidth consumption. |
| 2110~ | CHAN-MAP-REGION | CHAR | 4 | The Region or Geographic area applicable to the Channel Mapping. This may be a city or a market where these channel call signs are used.<br><br>Populated from FIG 5 2010. |
| 2120~ | CHAN-MAP-CALL-SIGN-SOURCE | CHAR | 10 | The Channel Call Sign as represented in the Source file.<br><br>Populated from FIG 5 2020. |
| 2130~ | CHAN-MAP-CALL-SIGN-TARGET | CHAR | 10 | The Channel Call Sign that should be used for aggregation purposes; the target channel.<br><br>Populated from FIG 5 2030. |
| 2140~ | CHAN-MAP-AGGREGATION-NBR | NUMBER | 3 | The Mapping Aggregation Number. This is used by the Measurement Engine 200 to assign a row in the aggregation data structure to use for aggregating data for the Target channel.<br><br>Populated from FIG 5 2040. |

FIG. 7

Summary Information

| Specification Name: | Raw Video Viewing Event House File Structure 110 |
|---|---|
| Computer Program Name: | CHAN-TUNE-HOUSE-FILE |
| Record description: | The Raw Video Viewing Event House File Structure records the input channel tuning data as it exists before enrichment. |
| Input File Name used by PreProcessing Engine 140 | pipe-delimited-channel-tune.dat |

Data Structure

|  | 2600 | 2602 | 2604 | 2606 |
|---|---|---|---|---|
|  | NAME | TYPE | SIZE | DESCRIPTION |
| 2605~ | TUNE-DATE-YYYYMMDD | DATE |  | The date on which the Viewing Activity occurred. Used to validate that the Tuning Event matches the Data date 8030 in the parameter file FIG 50. |
| 2610~ | HOUSE-ID-IN | CHAR | 64 | House Id records the identifier of this house. This is typically de-identified to preserve viewer privacy.<br><br>Used to populate FIG 8 2825. |
| 2615~ | SET-TOP-BOX-ID-IN | CHAR | 64 | Set Top Box Id records the identifier of this video viewing device. This can be any video viewing device identifier, it is not limited to set top boxes.<br>This may be de-identified to preserve viewer privacy.<br><br>Used to populate FIG 8 2830. |
| 2620~ | TUNER-INDEX-IN | CHAR | 1 | Tuner Index records the tuner within the set top box associated with the viewing activity.<br><br>Used to populate FIG 8 2835. |

FIG. 7 - Continued

| | | | | |
|---|---|---|---|---|
| 2625~ | MARKET-IN | CHAR | 4 | The Geographic Region in which the Viewing Activity occurred.<br><br>Used to populate FIG 8 2805. |
| 2630~ | TUNE-IN-DATE | DATE | | Tune in date records the tune in date of the viewing activity.<br><br>Used to populate FIG 8 2850. |
| 2635~ | TUNE-IN-TIME | TIME | | Tune in time records the tune in time of the viewing activity.<br><br>Used to populate FIG 8 2855. |
| 2640~ | TUNE-OUT-DATE | DATE | | Tune out date records the tune out date of the viewing activity.<br><br>Used to populate FIG 8 2865. |
| 2645~ | TUNE-OUT-TIME | TIME | | Tune out time records the tune out time of the viewing activity.<br><br>Used to populate FIG 8 2870. |
| 2650~ | CHANNEL-CALL-SIGN | CHAR | 10 | Channel Call Sign records the channel call sign as provided in the tuning data prior to the data preparation mapping process.<br><br>Used to populate FIG 8 2840. |
| 2655~ | CHANNEL-SOURCE-ID | CHAR | 5 | Channel Source Id records the source id of the channel as provided in the tuning data.<br><br>Used to populate FIG 8 2845. |
| 2660~ | DEMOGRAPHIC-CODE-IN | CHAR | 12 | The Demographic Code associated with the viewer. This is used to identify demographic code values for things such as age, income, education, occupation, home value, and viewing interests where each one of these types may have multiple allowable values. The Demographic Type associated with this Demographic Code is defined as by the Demographic Type 8035 input parameter FIG 50.<br>Used to populate FIG 8 2810. |

FIG. 8

Summary Information

| Specification Name: | Enriched Video Viewing Event House File Structure 170 |
|---|---|
| Computer Program Name: | CHAN-TUNE-HOUSE-FILE |
| Record description: | The Enriched Video Viewing Event House File Structure records the channel tuning data after it has been enriched in the data preparation phase. The file format is shown below. This file is sorted by MARKET-IN, DEMOGRAPHIC-CODE-IN, CHANNEL-CALL-SIGN-TARGET-IN, CHANNEL-AGGREGATION-NBR-IN, HOUSE-ID-IN in preparation for processing by the House Demographic Measurement Engine 200. |

Data Structure

| NAME (2800) | TYPE (2802) | SIZE (2804) | DESCRIPTION (2806) |
|---|---|---|---|
| \multicolumn{4}{l}{Claims Reference: By putting the Market in this record, this enables aggregation for any user defined Geographic area. This provides a geographic identifier identifying the location of a video asset viewing device.} | | | |
| \multicolumn{4}{l}{Claims Reference: By putting the Demographic Code in this record, this enables aggregation by any user defined demographic codes. This provides a demographic identifier describing a viewer operating a video asset viewing device.} | | | |
| \multicolumn{4}{l}{Claims Reference: By putting the Target Channel Call Sign in this record, this enables aggregation by any user defined Target channel grouping such as aggregating by the standard definition and high definitions versions of a channel. This also allows mapping to the Channel Call Sign in the Reach Period Definition.} | | | |
| \multicolumn{4}{l}{Claims Reference: By putting the House Identifier in this record, this enables aggregation of all the viewing activity in a house so that duplicate viewing can be eliminated from the resulting metrics.} | | | |
| \multicolumn{4}{l}{Claims Reference: By putting the Tune-in second of the day and the Tune-out second of the day in this record, this enables the execution of algorithms that populate the Channel Viewing Detail One-Second Array Data Structure Buckets based on the Buckets being within the range of Buckets defined by the Tune-in second of the day and the Tune-out second of the day.} | | | |
| 2805~ MARKET-IN | CHAR | 4 | Populated from FIG 7 2625. See definition there. |

FIG. 8- Continued

| | | | | |
|---|---|---|---|---|
| 2810~ | DEMOGRAPHIC-CODE-IN | CHAR | 12 | Populated from FIG 7 2660.<br>See definition there. |
| 2815~ | CHANNEL-CALL-SIGN-TARGET-IN | CHAR | 10 | Channel Call Sign Target records the channel call sign to which the Viewing Activity will be mapped during preprocessing / data preparation.<br>Assigned by the Data Preparation Processing. See FIGs 4,5,6 for details. |
| 2820~ | CHANNEL-AGGREGATION-NBR-IN | NUMBER | 3 | Channel Aggregation Number records the aggregation number assigned to this Viewing Activity during preprocessing / data preparation.<br>Assigned by the Data Preparation Processing. See FIGs 4,5,6 for details. |
| 2825~ | HOUSE-ID-IN | CHAR | 64 | Populated from FIG 7 2610.<br>See definition there. |
| 2830~ | SET-TOP-BOX-ID-IN | CHAR | 64 | Populated from FIG 7 2615.<br>See definition there.<br><br>Set Top Box Id can be any video viewing device identifier. |
| 2835~ | TUNER-INDEX-IN | CHAR | 1 | Populated from FIG 7 2620.<br>See definition there. |
| 2840~ | CHANNEL-CALL-SIGN | CHAR | 10 | Populated from FIG 7 2650.<br>See definition there. |
| 2845~ | CHANNEL-SOURCE-ID | CHAR | 5 | Populated from FIG 7 2655.<br>See definition there. |
| 2850~ | TUNE-IN-DATE | DATE | | Populated from FIG 7 2630.<br>See definition there. |
| 2855~ | TUNE-IN-TIME | TIME | | Populated from FIG 7 2635.<br>See definition there. |

FIG. 8- Continued

| | | | | |
|---|---|---|---|---|
| 2860~ | TUNE-IN-SECOND-OF-DAY | Number | 5 | Calculated during Data Preparation Processing where the system assigns the tune in second of the day based on the corresponding seconds past midnight for the tune in time. This value is used to control the assignment of viewing seconds to individual buckets represented by FIG 14 CVDS-CHAN-HOUS-VIEWING-COUNT 3045. |
| 2865~ | TUNE-OUT-DATE | DATE | | Populated from 2640.<br>See definition there. |
| 2870~ | TUNE-OUT-TIME | TIME | | Populated from 2645.<br>See definition there. |
| 2875~ | TUNE-OUT-SECOND-OF-DAY | Number | 5 | Calculated during Data Preparation Processing where the system assigns the tune out second of the day based on the corresponding seconds past midnight for the tune out time. This value is used to control the assignment of viewing seconds to individual buckets represented by FIG 14 CVDS-CHAN-HOUS-VIEWING-COUNT 3045. |

FIG. 10

Summary Information

| Specification Name: | Demographic Code File Structure 190 |
|---|---|
| Computer Program Name: | DEMOGRAPHIC-GROUPS-REC |
| Record description: | The Demographic Code File Structure records the list of Demographic Codes that will be analyzed. This data is used to populate Demographic codes in these arrays:<br>Channel Viewing Detail Array for Aggregation Data Structure<br>Channel Daily Summary Array for Aggregation Data Structure |
| Input File Name used by Measurement Engine 200 | demographic-group-list-for-array-load.csv |

Data Structure

|  | 2400<br>NAME | 2402<br>TYPE | 2404<br>SIZE | 2406<br>DESCRIPTION |
|---|---|---|---|---|
| 2410~ | IN-DEMO-TYPE | CHAR | 6 | Demographic Type records the type of demographic code. Example: Income, Age, Education, etc. |
| 2420~ | IN-DEMO-CODE | CHAR | 12 | Demographic Code records the demographic code. Example:<br>For type Age:<br>13-19<br>20-24<br>25-29<br>etc.<br>Used to populate 3215, 3415 |

FIG. 12

Summary Information

| Specification Name: | Household Reach Definition File Structure 180 |
|---|---|
| Computer Program Name: | HOUSEHOLD-REACH-DEF-REC |
| Record description: | The Household Reach Definition File Structure contains the fields needed to identify a time period for which Household Reach will be calculated. The input file containing this data is read and loaded to the HOUSEHOLD-REACH-DEF-TABLE FIG 13. |
| Input File Name used by Measurement Engine 200 | house-reach-def.csv |

Data Structure

| | NAME 2200 | TYPE 2202 | SIZE 2204 | DESCRIPTION 2206 |
|---|---|---|---|---|
| 2210~ | IN-REACH-DEF-CALL-SIGN | CHAR | 10 | The Channel Call Sign for which Audience House Reach is to be tracked. This value should match one of the Target Channel Call Signs found in FIG 8 CHANNEL-CALL-SIGN-TARGET-IN 2815. Used to populate 2310. |
| 2214~ | REACH-PERIOD-DATE | Date | | The Reach Period Date records the date applicable to the Reach Period. Used to populate 2314. |
| 2216~ | REACH-PERIOD-MARKET | CHAR | 4 | The Reach Period Market records the geographic identifier applicable to the Reach Period. Used to populate 2316. |
| 2220~ | IN-REACH-DEF-PERIOD-ID | NUMBER | 5 | The Reach Period Definition Identifier records the identifier which the analyst has assigned to the Reach Period. Used to populate 2320. |
| 2230~ | IN-REACH-DEF-BEG-SEC-OF-DAY | NUMBER | 5 | The Reach Period Definition Beginning Second of the Day. The second that defines the start of the Reach Period. This value will be used in analyzing the House level viewing activity to identify viewing by the House during the Reach period. Used to populate 2330. |

FIG. 12 - Continued

| | | | | |
|---|---|---|---|---|
| 2235~ | IN-REACH-DEF-BEG-TIME | TIME | | The Reach Period Definition Begin Time.<br>Used to populate 2335. |
| 2240~ | IN-REACH-DEF-END-SEC-OF-DAY | NUMBER | 5 | The Reach Period Definition Ending Second of the Day. The second that defines the end of the Reach Period. This value will be used in analyzing the House level viewing activity to identify viewing by the House during the Reach period.<br>Used to populate 2340. |
| 2245~ | IN-REACH-DEF-END-TIME | TIME | | The Reach Period Definition Begin Time.<br>Used to populate 2345. |
| 2250~ | IN-REACH-DEF-MIN-SEC-EXPOSU | NUMBER | 5 | The Reach Period Definition seconds of viewing required to be counted as an exposure. The unique viewing seconds measured for the house during the Reach Period will be compared to this value to determine whether there is sufficient viewing to be counted as an exposure.<br>Used to populate 2350. |
| 2260~ | IN-REACH-DEF-CAMPAIGN-ID | NUMBER | 8 | The Reach Period Definition Campaign Id provides a link to the Advertising Campaign associated with this Reach Period Definition. This allows the Measurement Engine 200 to calculate viewing within the context of an advertising campaign.<br>Used to populate 2360. |
| 2270~ | IN-REACH-DEF-ASSET-ID | NUMBER | 8 | The Reach Period Definition Asset Id provides a link to the Asset associated with this Reach Period Definition. An Asset Id identifies video content such as an Advertisement for which Audience House Reach is being measured.<br>Used to populate 2370. |

Sample Data

ABC|2012-12-01|DENV|20001|68400|68429|20|10004|20004|
ABC|2012-12-01|DENV|20002|68430|68459|21|10006|20024|
ABC|2012-12-01|DENV|20003|68460|68489|22|10002|20013|
ABC|2012-12-01|DENV|20004|68490|68519|23|10006|20017|
FOX|2012-12-01|DENV|40001|68400|68429|22|10003|20014|
FOX|2012-12-01|DENV|40002|68430|68459|22|10008|20003|
FOX|2012-12-01|DENV|40003|68460|68489|22|10005|20004|

FIG. 13

Summary Information

| Specification Name: | Household Reach Definition Array Data Structure |
|---|---|
| Computer Program Name: | HOUSEHOLD-REACH-DEF-TABLE |
| Record description: | The Household Reach Definition Array Data Structure is used in tracking Reach activity. The Reach definitions are loaded from the Household Reach Definition File Structure file FIG 12. During processing, the Engine 200 compares each Reach definition to the House viewing activity that was recorded in Channel Viewing Detail One-Second Data Structure (FIG 14) to determine whether or not the House had sufficient viewing during the Reach period to qualify as an Exposure. |

Data Structure

| | NAME (2300) | TYPE (2302) | SIZE (2304) | DESCRIPTION (2306) |
|---|---|---|---|---|
| | The following fields occur 30 times to allow for Reach Definitions to be recorded for each of 30 different Channel Call Signs.<br><br>Claims Reference: By making the Channel Call Sign (reach period channel call sign) a part of the Reach Period Definition, this enables collection of Reach statistics for the channel by correlating the Channel in the Channel Viewing Detail One-Second Array Data Structure with the Channel in the Household Reach Definition Array Data Structure. | | | |
| 2310~ | REACH-DEF-CALL-SIGN | CHAR | 10 | The Channel Call Sign for which Audience House Reach is to be tracked. This identifies a Video Content Provider.<br><br>Populated from FIG. 12 # 2210. |
| 2314~ | REACH-PERIOD-DATE | Date | | Reach Period Date<br>Populated from FIG. 12 # 2214. |
| 2316~ | REACH-PERIOD-MARKET | CHAR | 4 | Reach Period Market<br>Populated from FIG. 12 # 2216. |

FIG. 13 - Continued

| | | | | |
|---|---|---|---|---|
| | The following fields occur 180 times to allow for 180 Reach Definitions to be recorded for each of the 30 different Channel Call Signs.<br>Claims Reference: By putting the Reach Definition data as a child of the Reach Period Definition Channel Call Sign, this enables multiple Reach Definitions to be tracked for each reach period channel call sign.<br>Claims Reference: By identifying the Beginning and Ending Second of the Day for each Reach Period, this enables measurement of the viewing activity in the Channel Viewing Detail One-Second Array Data Structure Buckets against the Reach Period to identify viewing during the Reach Period.<br>Claims Reference: By identifying the Minimum Seconds for Exposure for each Reach Period, this enables each Reach Period to have its own unique Exposure viewing requirement thus enabling tracking of viewing that is sufficient or less than sufficient to qualify as an Exposure according to the Reach Period Definition.<br>Claims Reference: By identifying Campaign Identifier (reach period campaign id) for each Reach Period, this enables each Reach Period to be linked to a specific advertising campaign in a Campaign Management System.<br>Claims Reference: By identifying Asset Identifier for each Reach Period (reach period asset id), this enables each Reach Period to be linked to a specific ad or video asset in a Video Asset Management System.<br>Claims Reference: By identifying Channel Call Sign for each Reach Period (reach period channel call sign) where the channel call sign identifies a Video Content Provider, this enables each Reach Period to be linked to a specific Video Content Provider.<br>Claims Reference: By identifying Date for each Reach Period, this enables the Measurement Engine to track the number of Homes reached by Reach Period Date.<br>Claims Reference: By identifying Homes Reach Count for each Reach Period, this enables the Measurement Engine to track the number of Homes reach during each Reach Period. | | | |
| 2320~ | REACH-DEF-PERIOD-ID | NUMBER | 5 | The Reach Period Definition Identifier. Populated from FIG. 12 # 2220. |
| 2330~ | REACH-DEF-BEG-SEC-OF-DAY | NUMBER | 5 | The Reach Period Definition Beginning Second of the Day. Populated from FIG. 12 # 2230 |
| 2335~ | REACH-DEF-BEG-TIME | TIME | | The Reach Period Definition Beginning Time. Populated from FIG. 12 # 2235 |
| 2340~ | REACH-DEF-END-SEC-OF-DAY | NUMBER | 5 | The Reach Period Definition Ending Second of the Day. Populated from FIG. 12 # 2240. |
| 2345~ | REACH-DEF-END-TIME | TIME | | The Reach Period Definition Ending Time. Populated from FIG. 12 # 2245. |
| 2350~ | REACH-DEF-MIN-SEC-EXPOSU | NUMBER | 5 | The Reach Period Definition seconds of viewing required to be counted as an exposure. Populated from FIG. 12 # 2250 |

FIG. 13 - Continued

| | | | | |
|---|---|---|---|---|
| 2360~ | REACH-DEF-CAMPAIGN-ID | NUMBER | 8 | The Reach Period Definition Campaign Id provides a link to the Advertising Campaign associated with this Reach Period Definition. Populated from FIG. 12 # 2260 |
| 2370~ | REACH-DEF-ASSET-ID | NUMBER | 8 | The Reach Period Definition Asset Id provides a link to the Ad or video Asset associated with this Reach Period Definition. Populated from FIG. 12 # 2270 |
| 2380~ | HOMES-REACHED-COUNT | NUMBER | 9 | Homes Reached Count is a count of the number of homes that had sufficient viewing during the Reach Period to qualify as an Exposure.<br><br>Calculated by House Demographic Measurement Engine 200. Ref FIG 19. |
| | The following fields occur 60 times to allow for 60 Demographic Codes to be recorded for each of the 180 different Reach Periods. This allows the Engine 200 to break down the Reach activity by Demographic Code. This is helpful to advertisers because it identifies how many homes having the indicated demographic code were reached.<br><br>Claims Reference: By putting the Demographic Code and corresponding Demographic Code Home Reached Count as a child of the Reach Definition, this enables Reach measurement counts to be collected for each Demographic Code so that advertisers can determine the demographics of the audience reached by their advertisements. | | | |
| 2390~ | REACH-DEMO-CODE | CHAR | 12 | The Demographic Code identifies the group of homes (by demographic code) who had sufficient viewing to qualify as being Reached during the Reach Period.<br><br>Populated from CHAN-VD-DEMO-CODE in FIG 11 in part 530. |
| 2395~ | DEMO-CODE-HOMES-REACHED-COUNT | NUMBER | 9 | Demographic Code Homes Reached Count is a count of the number of homes having the indicated Demographic Code that had sufficient viewing during the Reach Period to qualify as an Exposure.<br>Calculated by House Demographic Measurement Engine 200. Ref FIG 19. |

FIG. 14

Summary Information

| Specification Name: | Channel Viewing Detail One-Second Array Data Structure |
|---|---|
| Computer Program Name: | CHAN-VIEWING-DETAIL-SECOND |
| Record description: | The Channel Viewing Detail One-Second Array Data Structure contains fields that allow the Engine 200 to aggregate all of the viewing activity on or for a Channel across multiple devices in a House for each second of the day thus producing House level aggregations. The identifiers include the Market, Demographic code, Channel, and House. Each House has only one Market (geographic code) and one Demographic Code per run of the Engine (a subsequent run of the Engine may have additional Demographic and Geographic codes assigned to the same House id). The detail includes one bucket for each second of the day (86,400 buckets). There are other fields that support various aspects of reporting. |

Data Structure

3000, 3002, 3004, 3006

| NAME | TYPE | SIZE | DESCRIPTION |
|---|---|---|---|
| Claims Reference: By putting the Market in this record, this provides a geographic identifier identifying the location of a video asset viewing device. Claims Reference: By putting the Demographic Code in this record, this provides a demographic identifier describing a viewer operating a video asset viewing device. Claims Reference: By putting the Target Channel Call Sign in this record, this provides a channel call sign identifier; this also allows the viewing activity to be aggregated by any user defined Target channel grouping. Claims Reference: By putting the House Identifier in this record, this enables the viewing activity in or identified with a house to be aggregated so that duplicate viewing within the house can be eliminated from the resulting metrics. | | | |
| CVDS-CHAN-VD-MARKET | Char | 4 | Market associated with the Viewing Event. This is populated from: Enriched Video Viewing Event House File Structure FIG 8 MARKET-IN 2805. |

| | | | | |
|---|---|---|---|---|
| 3015~ | CVDS-DEMO-CODE | Char | 12 | Demographic Code associated with the Viewing Event.<br>This is populated from:<br>Enriched Video Viewing Event House File Structure FIG 8 DEMOGRAPHIC-CODE-IN 2810. |
| 3020~ | CVDS-CHAN-CALL-SIGN-TRGT | Char | 10 | Target Channel Call Sign associated with the Viewing Event.<br><br>This is populated from:<br>Enriched Video Viewing Event House File Structure FIG 8 CHANNEL-CALL-SIGN-TARGET-IN 2815. |
| 3025~ | CVDS-CHANNEL-AGGREGATION-NBR | Number | 3 | Channel Aggregation Number associated with the Viewing Event.<br><br>This is populated from:<br>Enriched Video Viewing Event House File Structure FIG 8 CHANNEL-AGGREGATION-NBR-IN 2820. |
| 3030~ | CVDS-HOUSE-ID | Char | 64 | House Id associated with the Viewing Event.<br>May be De-identified.<br>This is populated from:<br>Enriched Video Viewing Event House File Structure FIG 8 HOUSE-ID-IN 2825. |

FIG. 14 - Continued

| | | | | |
|---|---|---|---|---|
| | The following field occurs 86400 times within the context of a Market / Demographic Code / Target Channel Call Sign / House. This is one bucket for each second of the day. The Bucket is used to track viewing of the Target Channel within the House during that second of the day. This allows the Engine 200 to track video viewing activity in the house for every second of the day. This is used to eliminate duplicate viewing where multiple devices in or linked to the House are all tuned to the same channel during the same second of the day.<br><br>Claims Reference: By putting the Buckets in the same Data Structure as child members to the Channel Viewing Detail One-Second Data Structure One-Second Array Identifying Fields, this creates the correlation between the One-Second Array Identifying Fields and the Buckets.<br><br>Claims Reference: By putting buckets for each individual second of the day in this record and associating them with the One-Second Array Identifying Fields of Market, Demographic, Target Channel, and House this correlates the viewing activity with the One-Second Array Identifying Fields and enables tracking of the viewing activity for those One-Second Array Identifying Fields.<br><br>Claims Reference: By tracking viewing activity at the one-second level with a bucket for each second, this enables the system to determine whether or not there was viewing by any device identified with the One-Second Array Identifying Fields of Market, Demographic, Target Channel, and House during that second which provides the basis for eliminating duplicate viewing activity at the one-second level while capturing unique viewing activity. | | | |
| 3045~ | CVDS-CHAN-HOUS-VIEWING-COUNT | Number | 1 | Channel House Viewing Count is populated with a value of 1 to show that at least one video viewing device in or linked to the House was viewing the identified Channel during the indicated (by the array position) second of the day. A zero value means no device in the house was viewing the channel during that second of the day.<br><br>In an alternative embodiment, by adding 1 to this value for each video viewing device in or linked to the House that was viewing the identified Channel during the indicated (by the array position) second of the day the Engine 200 is able to get total viewing seconds across all devices in the House for the day. |

FIG. 15

Summary Information

| Specification Name: | Channel Viewing Detail Array for Aggregation Data Structure |
|---|---|
| Computer Program Name: | CHAN-VIEWING-DETAIL |
| Record description: | The Channel Viewing Detail Array for Aggregation data structure contains fields that allow the Engine 200 to aggregate all of the house level viewing activity by Market (geographic area), Demographic Code, and Channel for the levels of one minute, five minute, fifteen minute, thirty minute, and sixty minute aggregation for each combination of Demographic code and Channel within a geographic area. In this specification, I have only shown drawings for one minute, thirty minute, and sixty minute aggregation levels to save space.<br><br>This array allows up to 60 Demographic codes within a geographic area and then 600 channels within each Demographic code. Then for each channel, the array (in the source program) has fields to support minute, five-minute, fifteen-minute, thirty, and sixty-minute aggregations. |

Data Structure

|  | 3200 | 3202 | 3204 | 3206 |
|---|---|---|---|---|
|  | NAME | TYPE | SIZE | DESCRIPTION |
| 3210~ | CHAN-VD-MARKET | Char | 4 | Market associated with the Viewing Activity. Market defines a geographic area. This is populated from: Enriched Video Viewing Event House File Structure FIG 8 MARKET-IN 2805. |
|  | \multicolumn{4}{l}{The following fields occur 60 times within the context of a Market. This allows the Engine 200 to track viewing information for each of 60 different Demographic Codes in a geographic area. The demographic codes that the Engine 200 will track are loaded from the file Demographic Code File Structure FIG 10.<br><br>Claims Reference: By putting the Demographic Codes in the same Data Structure as child members to the Geographic area (Market), this creates the correlation between the Geographic Area and the Demographic Codes with the result that the system is able to track viewing activity for multiple demographic groups within a geographic area.} |

FIG. 15 - Continued

| | | | | |
|---|---|---|---|---|
| 3215~ | CHAN-VD-DEMO-CODE | Char | 12 | Demographic Code associated with the Viewing Activity.<br><br>This is populated from:<br>Demographic Code File Structure FIG 10 field IN-DEMO-CODE 2420. |
| | colspan | | | The following fields occur 600 times within the context of a Demographic Code. This allows the Engine 200 to track viewing information for each of 600 different Channels for each of 60 Demographic Codes. The Channels that the Engine 200 will track are loaded from the file Channel Mapping Definition File 120 FIG 5nd are copied to the Demographic Code as described in FIG 23.<br><br>Claims Reference: By putting the Channels for which the system is tracking viewing activity in the same Data Structure as child members to the Demographic Code, this creates the correlation between the Demographic Code and the Channels thus allowing the system to track viewing activity at the channel level for many channels for each demographic code. |
| 3230~ | CHAN-VD-CHANNEL-CALL-SIGN-TRGT | Char | 10 | Channel Viewing Detail Channel Call Sign Target is the target channel call sign for which the House Demographic Measurement Engine 200 is calculating metrics.<br>This is populated from:<br>Channel Mapping Definition Array Data Structure FIG 6 CHAN-MAP-CALL-SIGN-TARGET 2130.<br>Reference program routine:<br>D400-COPY-CHNS-TO-NEW-DEMO-ROW |
| 3235~ | CHAN-VD-MAP-AGGREGATION-NBR | Number | 3 | Channel Viewing Detail Map Aggregation Number is the array row used by the House Demographic Measurement Engine 200 when aggregating viewing activity for this channel.<br>This is populated from:<br>Channel Mapping Definition Array Data Structure FIG 6 CHAN-MAP-AGGREGATION-NBR 2140.<br>Reference program routine:<br>D400-COPY-CHNS-TO-NEW-DEMO-ROW |

FIG. 15 - Continued

| | | | | |
|---|---|---|---|---|
| 3245~ | DEMO-CODE-CHANNEL-COUNT<br><br>Claims Reference: This is Demographic Code Channels Viewed | Number | 9 | For the identified Demographic Code, this is a count of the number of different Channels viewed.<br><br>This is calculated as described in FIG 17.<br><br>Reference program routine: D120-PROCESS-CHAN-TUNE-DETAIL |
| 3250~ | DEMO-CODE-CHANNEL-HOUSE-COUNT<br><br>Claims Reference: This is Demographic Code Channel House Count | Number | 9 | For the identified Demographic Code, this is a count of the number of different Houses that viewed this Channel.<br><br>This is calculated as described in FIG 17.<br><br>Reference program routine: D120-PROCESS-CHAN-TUNE-DETAIL |
| 3255~ | DEMO-CODE-CHANNEL-TUNE-COUNT<br><br>Claims Reference: This is Demographic Code Channel Tune Count | Number | 9 | For the identified Demographic Code, this is a count of the number channel tuning events for this Channel.<br><br>This is calculated as described in FIG 17.<br><br>Reference program routine: D120-PROCESS-CHAN-TUNE-DETAIL |
| 3275~ | AGG-CHANNEL-VIEWING-SECONDS<br><br>Claims Reference: This is Demographic Code Aggregate Viewing Seconds for Day | Number | 12 | For the identified Demographic Code, this is a count of the total viewing seconds for this Channel for the entire day.<br><br>This is calculated as described in FIG 17.<br><br>Reference program routine: D120-PROCESS-CHAN-TUNE-DETAIL |

FIG. 15 - Continued

| | The following fields occur 1440 times within the context of a Market / Demographic Code / Channel Call Sign. This is one bucket for each minute of the day. The Bucket is used to track viewing of that Channel during that minute by Viewing Events having the identified Demographic Code in the identified Geographic Area. This allows the Engine 200 to track minute-by-minute viewing for the channel (within the demographic code and geographic area) for every minute of the day.<br><br>Claims Reference: By putting the Video Viewing Aggregation Group with its One Minute Aggregation Fields in the same Data Structure as a child of the Channel Aggregation Identifying Fields, this creates the correlation between the Channel Aggregation Identifying Fields and the child One Minute Aggregation Fields.<br><br>Claims Reference: The following fields are One Minute Aggregation Fields in the Video Viewing Aggregation Group. | | | |
|---|---|---|---|---|
| 3280~ | AGGR-CHAN-VIEW-SEC-THIS-MINUTE<br><br>Claims Reference: This is Demographic Code Channel Viewing Seconds This Minute | Number | 15 | For the identified Demographic Code, this is a count of the total viewing seconds for this Channel during the indicated minute of the day. The minute of the day is identified by the subscript value (1 to 1440).<br>This is calculated as described in FIG 18.<br>Reference program routine:<br>D200-TABULATE-CHANNEL-VIEWING. |
| 3282~ | AGGR-CHAN-VIEW-AT-BEG-OF-MINUTE<br><br>Claims Reference: This is Demographic Code Channel House Viewing Count at Start of Minute | Number | 15 | For the identified Demographic Code, this is a count of the total unique homes viewing at the beginning (first second) of the minute. The minute of the day is identified by the subscript value (1 to 1440).<br>This is calculated as described in FIG 18.<br>Reference program routine:<br>D200-TABULATE-CHANNEL-VIEWING. |
| 3284~ | AGGR-CHAN-VIEW-AT-MID-OF-MINUTE<br><br>Claims Reference: This is Demographic Code Channel House Viewing Count at Middle of Minute | Number | 15 | For the identified Demographic Code, this is a count of the total unique homes viewing at the middle (30th second) of the minute. The minute of the day is identified by the subscript value (1 to 1440).<br>This is calculated as described in FIG 18.<br>Reference program routine:<br>D200-TABULATE-CHANNEL-VIEWING. |

FIG. 15 - Continued

| | The following fields occur 48 times within the context of a Market / Demographic Code / Channel Call Sign. This is one bucket for each thirty-minute segment of the day. The Bucket is used to track viewing of that Channel during that thirty-minute segment by Tuning Events having the identified Demographic Code in the identified Geographic Area. This allows the Engine 200 to track viewing for the channel (within the demographic code and geographic area) for every thirty-minute segment of the day. There are 48 thirty-minute segment during the day.<br><br>Claims Reference: By putting the Video Viewing Aggregation Group with its Thirty Minute Aggregation Fields in the same Data Structure as a child of the Channel Aggregation Identifying Fields, this creates the correlation between the Channel Aggregation Identifying Fields and the child Thirty Minute Aggregation Fields.<br><br>Claims Reference: The following fields are Thirty Minute Aggregation Fields in the Video Viewing Aggregation Group. | | | |
|---|---|---|---|---|
| 3295~ | AGG-CHAN-VIEW-SEC-THIS-30-MIN<br><br>Claims Reference: This is Demographic Code Channel Viewing Seconds This Thirty Minute Segment | Number | 15 | For the identified Demographic Code in the Market, this is a count of the total viewing seconds for this Channel during the indicated thirty minute segment of the day.<br>The thirty minute segment of the day is identified by the subscript value (1 to 48).<br><br>This is calculated as described in FIG 37. |
| 3297~ | AGG-CHAN-VIEW-AT-BEG-OF-30-MIN<br><br>Claims Reference: This is Demographic Code Channel House Viewing Count at Start of Thirty Minute Segment | Number | 15 | For the identified Demographic Code, this is a count of the total unique homes viewing at the beginning (first second) of the thirty minute segment.<br>The thirty minute segment of the day is identified by the subscript value (1 to 48).<br><br>This is calculated as described in FIG 37. |
| 3299~ | AGG-CHAN-VIEW-AT-MID-OF-30-MIN<br><br>Claims Reference: This is Demographic Code Channel House Viewing Count at Middle of Thirty Minute Segment | Number | 15 | For the identified Demographic Code, this is a count of the total unique homes viewing at the middle (first second of the 15th minute) of the thirty minute segment.<br>The thirty minute segment of the day is identified by the subscript value (1 to 48).<br><br>This is calculated as described in FIG 37. |

FIG. 15 - Continued

| | | | | |
|---|---|---|---|---|
| | The following fields occur 24 times within the context of a Market / Demographic Code / Channel Call Sign. This is one bucket for each hour the day. The Bucket is used to track viewing of that Channel during that hour by Tuning Events having the identified Demographic Code in the identified Geographic Area. This allows the Engine 200 to track viewing for the channel (within the demographic code and geographic area) for every hour of the day.<br><br>Claims Reference: By putting the Video Viewing Aggregation Group with its Sixty Minute Aggregation Fields in the same Data Structure as a child of the Channel Aggregation Identifying Fields, this creates the correlation between the Channel Aggregation Identifying Fields and the child Sixty Minute Aggregation Fields.<br><br>Claims Reference: The following fields are Sixty Minute Aggregation Fields in the Video Viewing Aggregation Group. | | | |
| 3300 | AGG-CHAN-VIEW-SEC-THIS-60-MIN<br><br>Claims Reference: This is Demographic Code Channel Viewing Seconds This Sixty Minute Segment | Number | 15 | For the identified Demographic Code, this is a count of the total viewing seconds for this Channel during the indicated hour of the day. The hour of the day is identified by the subscript value (1 to 24).<br><br>This is calculated as described in FIG 39 |
| 3302~ | AGG-CHAN-VIEW-AT-BEG-OF-60-MIN<br><br>Claims Reference: This is Demographic Code Channel House Viewing Count at Start of Sixty Minute Segment | Number | 15 | For the identified Demographic Code, this is a count of the total unique homes viewing at the beginning (first second) of the sixty minute segment.<br>The sixty minute segment of the day is identified by the subscript value (1 to 24).<br><br>This is calculated as described in FIG 39. |
| 3304~ | AGG-CHAN-VIEW-AT-MID-OF-60-MIN<br><br>Claims Reference: This is Demographic Code Channel House Viewing Count at Middle of Sixty Minute Segment | Number | 15 | For the identified Demographic Code, this is a count of the total unique homes viewing at the middle (first second of the 30th minute) of the sixty minute segment.<br>The sixty minute segment of the day is identified by the subscript value (1 to 24).<br><br>This is calculated as described in FIG 39. |

FIG. 16

Summary Information

| Specification Name: | Channel Daily Summary Array for Aggregation Data Structure |
|---|---|
| Computer Program Name: | DAILY-SUMRY-SEC-1-5-15-60-MIN |
| Record description: | The Channel Daily Summary Array for Aggregation Data Structure contains fields that allow the Engine 200 to aggregate all of the viewing activity by Demographic Code for the levels of one minute, five minute, fifteen minute, thirty minute, and sixty minute aggregation across all the channels for each Demographic code. In this specification, I have only shown drawings for one minute, thirty minute, and sixty minute aggregation levels to save space.<br><br>This array allows up to 60 Demographic codes. Then for each Demographic code, the array (in the source program) has fields to support minute, five-minute, fifteen-minute, thirty, and sixty-minute aggregations. |

Data Structure

| NAME | TYPE | SIZE | DESCRIPTION |
|---|---|---|---|
| CHAN-DAY-SUM-MKT | Char | 4 | Market associated with the Viewing Activity.<br>This is populated from:<br>Enriched Video Viewing Event House File Structure FIG 8 MARKET-IN 2805. |
| The following fields occur 60 times within the context of a Market. This allows the Engine 200 to track viewing information for each of 60 different Demographic Codes in a geographic area. The demographic codes that the Engine 200 will track are loaded from the file Demographic Code File Structure FIG 10.<br><br>Claims Reference: By putting the Demographic Codes in the same Data Structure as child members to the Geographic area (Market), this creates the correlation between the Geographic Area and the Demographic Codes with the result that the system is able to track viewing activity for multiple demographic groups within a geographic area. | | | |

3400 — NAME, 3402 — TYPE, 3404 — SIZE, 3406 — DESCRIPTION

3410 — CHAN-DAY-SUM-MKT

FIG. 16 - Continued

| | | | | |
|---|---|---|---|---|
| 3415~ | CHAN-DAY-SUM-DEMO-CODE | Char | 12 | Demographic Code associated with the Viewing Activity.<br>This is populated from:<br>Demographic Code File Structure FIG 10 field IN-DEMO-CODE 2420. |
| | colspan="4" The following fields occur 1440 times within the context of a Market / Demographic Code. This is one bucket for each minute of the day. The Bucket is used to aggregate viewing across all the channels during that minute by Viewing Events having the identified Demographic Code. This allows the Engine 200 to track minute-by-minute aggregate viewing for all the channels together (within the demographic code) for every minute of the day.<br><br>Claims Reference: By putting the Video Viewing Summary Aggregation Group with its One Minute Summary Aggregation Fields in the same Data Structure as a child of the Channel Summary Identifying Fields, this creates the correlation between the Channel Summary Identifying Fields and the child One Minute Summary Aggregation Fields. | | | |
| 3420~ | MINUTE-AGGR-VIEWING-SECONDS<br><br>Claims Reference: This is Demographic Code Total Viewing Seconds Across All Channels This Minute | Number | 15 | For the identified Demographic Code, this is a count of the total viewing seconds across all Channels during the indicated minute of the day. The minute of the day is identified by the subscript value (1 to 1440).<br><br>This is calculated as described in FIG 35. |
| | colspan="4" The following fields occur 48 times within the context of a Market / Demographic Code. There is one bucket for each thirty-minute segment of the day. The Bucket is used to track aggregate viewing across all the channels during that thirty-minute segment by Viewing Events having the identified Demographic Code in the identified Geographic Area. This allows the Engine 200 to track aggregate viewing for all the channels together (within the demographic code and geographic area) for every thirty-minute segment of the day.<br>There are 48 thirty-minute segments during the day.<br><br>Claims Reference: By putting the Video Viewing Summary Aggregation Group with its Thirty Minute Summary Aggregation Fields in the same Data Structure as a child of the Channel Summary Identifying Fields, this creates the correlation between the Channel Summary Identifying Fields and the child Thirty Minute Summary Aggregation Fields. | | | |

FIG. 16 - Continued

| | | | | |
|---|---|---|---|---|
| 3435~ | S30-AGGR-VIEWING-SECONDS<br><br>Claims Reference: This is Demographic Code Total Viewing Seconds Across All Channels This Thirty Minute Segment | Number | 15 | For the identified Demographic Code in the Market, this is a count of the total viewing seconds for this Channel during the indicated thirty-minute segment of the day.<br><br>This is calculated as described in FIG 38. |
| | The following fields occur 24 times within the context of a Market / Demographic Code. This is one bucket for each hour of the day. The Bucket is used to track aggregate viewing across all the channels during that hour by Viewing Events having the identified Demographic Code in the identified Geographic Area. This allows the Engine 200 to track aggregate viewing for all the channels together (within the demographic code) for every hour of the day.<br><br>Claims Reference: By putting the Video Viewing Summary Aggregation Group with its Sixty Minute Summary Aggregation Fields in the same Data Structure as a child of the Channel Summary Identifying Fields, this creates the correlation between the Channel Summary Identifying Fields and the child Sixty Minute Summary Aggregation Fields. | | | |
| 3440~ | S60-AGGR-VIEWING-SECONDS<br>Claims Reference: This is Demographic Code Total Viewing Seconds Across All Channels This Sixty Minute Segment | Number | 15 | For the identified Demographic Code, this is a count of the total viewing seconds for this Channel during the indicated hour of the day.<br><br>This is calculated as described in FIG 40. |

Tabulate Channel Viewing
648

FIG. 18

```
Loop
Varying Second-sub
From Tune-in Second of Day
By 1
To Adjusted Tune-out Second of Day
   Calculate Minute-Sub = ((Second-sub - 1) / 60) + 1
   Compute second-for-beg-of-minute = minute-sub * 60
   Compute second-for-mid-of-minute = second-for-beg-of-minute + 30
   If Calculate 'All' Viewing Seconds
      Add 1 to House Viewing Count (Second-sub)
      Add 1 to Demo-Channel-Minute Viewing Seconds (Demo-sub, Chan-sub, Minute-Sub)
      If second-sub = second-for-beg-of-minute
         Add 1 to AGGR-CHAN-VIEW-AT-BEG-OF-MINUTE (DEMO-SUB, CHAN-SUB, MINUTE-SUB)
      End-if
      If second-sub = second-for-mid-of-minute
         Add 1 to AGGR-CHAN-VIEW-AT-MID-OF-MINUTE (DEMO-SUB, CHAN-SUB, MINUTE-SUB)
      End-if
   Else
      If Calculate 'Unique' Viewing Seconds
         If House Viewing Count >= 1
            Add 1 to Duplicate Viewing Seconds
         Else
            Add 1 to House Viewing Count (Second-sub)
            Add 1 to Demo-Channel-Minute Viewing Seconds (Demo-sub, Chan-sub, Minute-Sub)
            If second-sub = second-for-beg-of-minute
               Add 1 to AGGR-CHAN-VIEW-AT-BEG-OF-MINUTE (DEMO-SUB, CHAN-SUB, MINUTE-SUB)
            End-if
            If second-sub = second-for-mid-of-minute
               Add 1 to AGGR-CHAN-VIEW-AT-MID-OF-MINUTE (DEMO-SUB, CHAN-SUB, MINUTE-SUB)
            End-if
         End-if
      End-if
   End-if
End-Loop Note: Demo-sub and Chan-sub are set as part of Process Enriched Video Event File Overview 600
```
649

Done
650

FIG. 24

Summary Information

| Short name: | House Reach Detail |
|---|---|
| Table name: | HOUSE-REACH-DETAIL |
| Output file name assigned by Measurement Engine 200: | 820-house-demo-reach-detail.csv |
| Record description: | The House Reach Detail file is created by the Demographic Measurement Engine 200. It records at a house level the Reach information broken down by Demographic Type / Code. Reach is defined as the House having sufficient viewing of the asset shown during the indicated time period to be counted as an exposure. |
| Specification File Name | House Reach Detail file 205 |

Claims Reference: This provides a computer readable record of Reach Period Viewing.

Claims Reference: This provides a computer readable record of Reach Period Viewing that meets the minimum viewing to qualify as an Exposure according to the Reach Period Definition.

Claims Reference: This provides a computer readable record of Reach Period Viewing that meets the minimum viewing to qualify as an Exposure according to the Reach Period Definition that can be used to determine Commercial Schedule Cumulative Audience, Impressions for a Particular Reach Period, Impressions for Multiple Reach Periods, Demographic Group Impressions for Multiple Reach Periods, and Demographic Group Impressions for a Particular Reach Period.

Claims Reference: This is House Reach Detail Data that is used to populate a Queryable House Reach Detail Data Structure containing Household Reach Fields.

Record Layout

| | NAME | TYPE | SIZE | DESCRIPTION |
|---|---|---|---|---|
| 4010~ | HRD-TUNING-ACTIVITY-DATE<br>Claims Ref: This is also Reach Period Date. | DATE | | Tuning Activity Date records the date for which the Measurement Engine 200 has calculated viewing statistics. Populated from input parameter Data date 8030. |

Column headers: 4000, 4002, 4004, 4006

FIG. 24 - Continued

| | | | | |
|---|---|---|---|---|
| 4015~ | HRD-ENGAGEMENT-LEVEL | CHAR | 3 | Engagement Level records the code which identifies the level of engagement that the user had to have with the video content for the activity to be included in the aggregation. Channel surfing may be eliminated by requiring a minimum engagement level such as ten seconds.<br>Populated from input parameter Engagement Level 8040. |
| 4020~ | HRD-REACH-VD-MARKET<br>Claims Ref: This is also Reach Period Geographic Identifier. | CHAR | 4 | The Market for which the Measurement Engine 200 has calculated viewing statistics. This records a geographic identifier.<br>Populated from CVDS-CHAN-VD-MARKET 3010. |
| 4025~ | HRD-REACH-DEMO-TYPE<br>Claims Ref: This is also Reach Period Demographic Identifier. | CHAR | 6 | Reach Demographic Type records the Demographic type associated with the Viewing Activity.<br>Populated from input parameter Demographic Type 8035. |
| 4030~ | HRD-REACH-DEMO-CODE<br>Claims Ref: This is also Reach Period Demographic Identifier. | CHAR | 12 | Reach Demographic Code records the Demographic code associated with the Viewing Activity.<br>Populated from CVDS-DEMO-CODE 3015. |
| 4035~ | HRD-REACH-VD-HOUSE-ID | CHAR | 64 | Reach House Id records the identifier of the House associated with the Viewing Activity.<br>Populated from CVDS-HOUSE-ID 3030. |
| 4040~ | HRD-REACH-VD-CHAN-CALL-SIGN | CHAR | 10 | Reach Channel Call Sign records the call sign of the channel for which the reach activity was calculated.<br>Populated from FIG 13 REACH-DEF-CALL-SIGN 2310. |
| 4045~ | HRD-REACH-PERIOD-ID | NUMBER | 5 | Reach Period Id records the identifier of the Reach Period.<br>Populated from FIG 13 REACH-DEF-PERIOD-ID 2320. |
| 4050~ | HRD-REACH-CAMPAIGN-ID | NUMBER | 8 | Reach Campaign Id records the identifier of the advertising Campaign linked to the Reach Period.<br>Populated from FIG 13 REACH-DEF-CAMPAIGN-ID 2360. |

FIG. 24 – Continued

| | | | | |
|---|---|---|---|---|
| 4055~ | HRD-REACH-ASSET-ID | NUMBER | 8 | Reach Asset Id records the identifier of the video asset linked to the Reach Period. Populated from FIG 13 REACH-DEF-ASSET-ID 2370. |
| 4060~ | HRD-REACH-PER-BEG-SEC-OF-DAY | NUMBER | 5 | Reach Period Beginning Second of Day records the second of the day on which the Reach Period begins. Populated from FIG 13 REACH-DEF-BEG-SEC-OF-DAY 2330. |
| 4062~ | HRD-REACH-DEF-BEG-TIME | TIME | | Reach Definition Begin Time. Populated from FIG 13 REACH-DEF-BEG-TIME 2335. |
| 4065~ | HRD-REACH-PER-END-SEC-OF-DAY | NUMBER | 5 | Reach Period Ending Second of Day records the second of the day on which the Reach Period ends. Populated from FIG 13 REACH-DEF-END-SEC-OF-DAY 2340. |
| 4067~ | HRD-REACH-DEF-END-TIME | TIME | | Reach Definition End Time. Populated from FIG 13 REACH-DEF-END-TIME 2345. |
| 4070~ | HRD-SECS-VIEWED-DUR-REACH-PER | NUMBER | 5 | Seconds Viewed During Reach Period records the number of unique viewing seconds by the video viewing devices associated with the House during the Reach Period. Calculated by Measurement Engine 200. Reference FIG 19. Reference Program Routine: F120-CALC-HOUSE-REACH. |
| 4075~ | HRD-HOUSE-REACH-COUNT | NUMBER | 1 | House Reach Count is a 1 to indicate that the House had sufficient viewing during the Reach Period to be counted as an Exposure. Set by Measurement Engine 200. |
| 4080~ | HRD-MIN-SECS-EXPOSU-FOR-REACH | NUMBER | 5 | Seconds Viewed During Reach Period records the number of unique viewing seconds by the video viewing devices associated with the House during the Reach Period. Populated from FIG 13 REACH-DEF-MIN-SEC-EXPOSU 2350. |

FIG. 25
Summary Information

| Short name: | House Reach Summary |
|---|---|
| Table name: | HOUSE-REACH-SUMMARY |
| Output file name assigned by Measurement Engine 200: | 821-house-reach-summary.csv |
| Record description: | The House Reach Summary file is created by the Demographic Measurement Engine 200. It records the summary of homes Reached for the defined Reach Period. Reach is defined as the House having sufficient viewing of the asset shown during the indicated time period to be counted as an exposure. |
| Specification File Name | House Reach Summary file 210 |

Claims Reference: This provides a computer readable record of Reach Period Viewing.

Claims Reference: This provides the computer readable record can be used to determine Impressions for Multiple Reach Periods.

Claims Reference: This provides the computer readable record can be used to determine Impressions for a Particular Reach Period.

Record Layout

| | NAME (4200) | TYPE (4202) | SIZE (4204) | DESCRIPTION (4206) |
|---|---|---|---|---|
| 4210~ | HRS-TUNING-ACTIVITY-DATE | DATE | | Same definition as HRD-TUNING-ACTIVITY-DATE 4010. Populated from input parameter Data date 8030. |
| 4215~ | HRS-ENGAGEMENT-LEVEL | CHAR | 3 | Same definition as HRD-ENGAGEMENT-LEVEL 4015. Populated from input parameter Engagement Level 8040. |
| 4220~ | HRS-REACH-VD-MARKET | CHAR | 4 | Same definition as HRD-REACH-VD-MARKET 4020. Populated from CVDS-CHAN-VD-MARKET 3010. |

FIG. 25 - Continued

| | | | | |
|---|---|---|---|---|
| 4225~ | HRS-REACH-VD-CHAN-CALL-SIGN | CHAR | 10 | Reach Channel Call Sign records the call sign of the channel for which the reach activity was calculated. Populated from FIG 13 REACH-DEF-CALL-SIGN 2310. |
| 4230~ | HRS-REACH-PERIOD-ID | NUMBER | 5 | Reach Period Id records the identifier of the Reach Period. Populated from FIG 13 REACH-DEF-PERIOD-ID 2320. |
| 4235~ | HRS-REACH-CAMPAIGN-ID | NUMBER | 8 | Reach Campaign Id records the identifier of the advertising Campaign linked to the Reach Period. Populated from FIG 13 REACH-DEF-CAMPAIGN-ID 2360. |
| 4240~ | HRS-REACH-ASSET-ID | NUMBER | 8 | Reach Asset Id records the identifier of the video asset linked to the Reach Period. Populated from FIG 13 REACH-DEF-ASSET-ID 2370. |
| 4245~ | HRS-REACH-PER-BEG-SEC-OF-DAY | NUMBER | 5 | Reach Period Beginning Second of Day records the second of the day on which the Reach Period begins. Populated from FIG 13 REACH-DEF-BEG-SEC-OF-DAY 2330. |
| 4250~ | HRS-REACH-PER-END-SEC-OF-DAY | NUMBER | 5 | Reach Period Ending Second of Day records the second of the day on which the Reach Period ends. Populated from FIG 13 REACH-DEF-END-SEC-OF-DAY 2340. |
| 4255~ | HRS-MIN-SECS-EXPOSU-FOR-REACH | NUMBER | 5 | Minimum Seconds for Exposure for Reach period viewing records the minimum number of seconds during the reach period that the combination of devices in the home must be being the video content to be considered an exposure. Populated from FIG 13 REACH-DEF-MIN-SEC-EXPOSU 2350. |
| 4260~ | HRS-HOMES-REACHED-COUNT | NUMBER | 9 | House Reach Count records the count of homes where the House had sufficient viewing during the Reach Period to be counted as an Exposure. Populated from FIG 13 HOMES-REACHED-COUNT 2380. |

FIG. 26

Summary Information

| Short name: | Demographic House Reach Summary |
|---|---|
| Table name: | DEMO-HOUSE-REACH-SUMMARY |
| Output file name assigned by Measurement Engine 200: | 822-demo-house-reach-summary.csv |
| Record description: | The Demographic House Reach Summary file records the Reach information broken out by Demographic Type / Code. |
| Specification File Name | House Reach Summary file 215 |

Claims Reference: This provides a computer readable record of Reach Period Viewing.

Claims Reference: This provides the computer readable record can be used to determine Demographic Group Impressions for Multiple Reach Periods.

Claims Reference: This provides the computer readable record can be used to determine Demographic Group Impressions for a Particular Reach Period.

Record Layout

|  | NAME 4400 | TYPE 4402 | SIZE 4404 | DESCRIPTION 4406 |
|---|---|---|---|---|
| 4410~ | DHRS-TUNING-ACTIVITY-DATE | DATE |  | Same definition as HRD-TUNING-ACTIVITY-DATE 4010. |
| 4415~ | DHRS-ENGAGEMENT-LEVEL | CHAR | 3 | Same definition as HRD-ENGAGEMENT-LEVEL 4015. |
| 4420~ | DHRS-REACH-VD-MARKET | CHAR | 4 | Same definition as HRD-REACH-VD-MARKET 4020. |
| 4425~ | DHRS-REACH-VD-DEMO-TYPE | CHAR | 6 | Reach Demo Type records the Demographic type associated with the Viewing Activity. Populated from input parameter Demographic Type 8035. |

FIG. 26 - Continued

| | | | | |
|---|---|---|---|---|
| 4430~ | DHRS-REACH-VD-DEMO-CODE | CHAR | 12 | Reach Demo Code records the Demographic code associated with the Viewing Activity. Populated from FIG 13 REACH-DEMO-CODE 2390. |
| 4435~ | DHRS-REACH-VD-CHAN-CALL-SIGN | CHAR | 10 | Reach Channel Call Sign records the call sign of the channel for which the reach activity was calculated. Populated from FIG 13 REACH-DEF-CALL-SIGN 2310. |
| 4440~ | DHRS-REACH-PERIOD-ID | NUMBER | 5 | Reach Period Id records the identifier of the Reach Period. Populated from FIG 13 REACH-DEF-PERIOD-ID 2320. |
| 4445~ | DHRS-REACH-CAMPAIGN-ID | NUMBER | 8 | Reach Campaign Id records the identifier of the advertising Campaign linked to the Reach Period. Populated from FIG 13 REACH-DEF-CAMPAIGN-ID 2360. |
| 4450~ | DHRS-REACH-ASSET-ID | NUMBER | 8 | Reach Asset Id records the identifier of the video asset linked to the Reach Period. Populated from FIG 13 REACH-DEF-ASSET-ID 2370. |
| 4455~ | DHRS-REACH-PER-BEG-SEC-OF-DAY | NUMBER | 5 | Reach Period Beginning Second of Day records the second of the day on which the Reach Period begins. Populated from FIG 13 REACH-DEF-BEG-SEC-OF-DAY 2330. |
| 4460~ | DHRS-REACH-PER-END-SEC-OF-DAY | NUMBER | 5 | Reach Period End Second of Day records the second of the day on which the Reach Period ends. Populated from FIG 13 REACH-DEF-END-SEC-OF-DAY 2340. |
| 4465~ | DHRS-MIN-SECS-EXPOS-FOR-REACH | NUMBER | 5 | Minimum Seconds for Exposure for Reach period viewing records the minimum number of seconds during the reach period that the combination of devices in the home must be being the video content to be considered an exposure. Populated from FIG 13 REACH-DEF-MIN-SEC-EXPOSU 2350. |
| 4470~ | DHRS-HOMES-REACHED-COUNT | NUMBER | 8 | House Reach Count is a count of the number of homes that had sufficient viewing during the Reach Period to be counted as an Exposure. Populated from FIG 13 DEMO-CODE-HOMES-REACHED-COUNT 2395. |

FIG. 27

Summary Information

| | |
|---|---|
| Short name: | House Demo Chan Viewing Detail Minute |
| Table name: | HOUSE_DEMO_CHAN_VW_DETL_01_MIN |
| Output file name assigned by Measurement Engine 200: | 830-house-demo-chan-viewing-detail-01-minute.csv |
| Record description: | The House Demographic Channel Viewing Detail Minute file contains the aggregate viewing seconds based on unique house level viewing for each channel for each minute of the day, broken out by demographic type and demographic code within market. |
| Specification File Name | House Demographic Channel Viewing Detail Minute file 220 |

Record Layout

| | NAME 4600 | TYPE 4602 | SIZE 4604 | DESCRIPTION 4606 |
|---|---|---|---|---|
| 4610~ | CVDM-TUNING-ACTIVITY-DATE | DATE | | Viewing Activity Date records the date for which the Measurement Engine 200 has calculated viewing statistics. Populated from input parameter Data date 8030. |
| 4615~ | CVDM-ENGAGEMENT-LEVEL | CHAR | 3 | Same definition as HRD-ENGAGEMENT-LEVEL 4015. |
| 4620~ | CVDM-CHAN-VD-MARKET | CHAR | 4 | The market for which the Measurement Engine 200 has calculated viewing statistics. Populated from CHAN-VD-MARKET 3210. |
| 4625~ | CVDM-CHAN-VD-DEMO-TYPE | CHAR | 6 | Reach Demo Type records the Demographic type associated with the Viewing Activity. Populated from input parameter Demographic Type 8035. |
| 4630~ | CVDM-CHAN-VD-DEMO-CODE | CHAR | 12 | Demographic Code records the Demographic code associated with the Viewing Activity. Populated from: Channel Viewing Detail Array for Aggregation Data Structure FIG 15 CHAN-VD-DEMO-CODE 3215. |

FIG. 27 - Continued

| | | | | |
|---|---|---|---|---|
| 4635~ | CVDM-CHAN-VD-CHAN-CALL-SIGN | CHAR | 10 | Channel Call Sign records the call sign of the channel for which the reach activity was calculated.<br>Populated from:<br>Channel Viewing Detail Array for Aggregation Data Structure FIG 15 CHAN-VD-CHANNEL-CALL-SIGN-TRGT 3230. |
| 4640~ | CVDM-MINUTE-SUB<br><br>NonLimiting Claims Reference: This is Detail Time Period Id in Claim 30. | NUMBER | 5 | The minute of the day. Range of values is 0 to 1439 (1440 minutes during the day). This is adjusted by -1 at the time of output.<br><br>This is populated from the subscript value. |
| 4645~ | CVDM-AGGR-CHN-VIEW-SEC-THS-MIN<br><br>NonLimiting Claims Reference: This is Detail Time Period Aggregate Viewing Seconds in Claim 30. | NUMBER | 12 | This is the sum or aggregate of all viewing seconds of this channel by all viewing devices identified by the demographic type and demographic code during this minute in this market.<br><br>Populated from:<br>Channel Viewing Detail Array for Aggregation Data Structure FIG 15 AGGR-CHAN-VIEW-SEC-THIS-MINUTE 3280. |
| 4647~ | AGGR-CHAN-VIEW-AT-BEG-OF-MINUTE | NUMBER | 12 | Aggregate Channel Viewing at Beginning of Minute is a count of the total unique homes viewing at the beginning (first second) of the minute.<br><br>Populated from: FIG 15 AGGR-CHAN-VIEW-AT-BEG-OF-MINUTE 3282. |
| 4649~ | AGGR-CHAN-VIEW-AT-MID-OF-MINUTE | NUMBER | 12 | Aggregate Channel Viewing at Middle of Minute is a count of the total unique homes viewing at the middle (30th second) of the minute.<br>Populated from: FIG 15 AGGR-CHAN-VIEW-AT-MID-OF-MINUTE 3284. |

FIG. 28

Summary Information

| Short name: | House Demo Channel Minute of Day Summary |
|---|---|
| Table name: | HOUSE_DEMO_CHAN_DAY_01_MIN_SUM |
| Output file name assigned by Measurement Engine 200: | 831-house-demo-chan-01-minute-of-day-summary.csv |
| Record description: | The House Demographic Channel Minute of Day Summary file contains the aggregate viewing seconds based on unique house level viewing for each minute of the day, summarized across all the channels, broken out by demographic type and demographic code within market. |
| Specification File Name | House Demographic Channel Minute of Day Summary file 225 |

Record Layout

| | NAME (4800) | TYPE (4802) | SIZE (4804) | DESCRIPTION (4806) |
|---|---|---|---|---|
| 4810~ | MODS-TUNING-DATE-YYYYMMDD | DATE | | Viewing Activity Date records the date for which the Measurement Engine 200 has calculated viewing statistics. Populated from input parameter Data date 8030. |
| 4815~ | MODS-ENGAGEMENT-LEVEL | CHAR | 3 | Same definition as HRD-ENGAGEMENT-LEVEL 4015.. |
| 4820~ | MODS-MARKET-CODE | CHAR | 4 | The market for which the Measurement Engine 200 has calculated viewing statistics.<br><br>Populated from FIG 16 CHAN-DAY-SUM-MKT 3410. |
| 4825~ | MODS-CHAN-DAY-SUM-DEMO-TYPE | CHAR | 6 | Demographic Type records the Demographic type associated with the Viewing Activity. Populated from input parameter Demographic Type 8035. |

FIG. 28 - Continued

| | | | | |
|---|---|---|---|---|
| 4830~ | MODS-CHAN-DAY-SUM-DEMO-CODE | CHAR | 12 | Channel Day Summary Demographic Code records the Demographic code associated with the Viewing Activity.<br>Populated from:<br>Channel Daily Summary Array for Aggregation Data Structure FIG 16 CHAN-DAY-SUM-DEMO-CODE 3415. |
| 4835~ | MODS-MINUTE-OF-DAY<br><br>NonLimiting Claims Reference: This is Summary Time Period Id in Claim 30. | NUMBER | 5 | The minute of the day. Range of values is 0 to 1439 (1440 minutes during the day).<br><br>Populated from the subscript array position. |
| 4840~ | MODS-AGGR-VIEWING-SECONDS<br><br>NonLimiting Claims Reference: This is Summary Time Period Aggregate Viewing Seconds in Claim 30. | NUMBER | 12 | This is the sum or aggregate of all viewing seconds during this minute across all the channels by all set top boxes identified by the demographic type and demographic code for the entire day in this market.<br>Populated from:<br>Channel Daily Summary Array for Aggregation Data Structure FIG 16 MINUTE-AGGR-VIEWING-SECONDS 3420. |

FIG. 29

Summary Information

| Short name: | House Demo Chan Viewing Detail Thirty Minute |
|---|---|
| Table name: | `HOUSE_DEMO_CHAN_VW_DETL_30_MIN` |
| Output file name assigned by Measurement Engine 200: | `860-house-demo-chan-viewing-detail-30-minute.csv` |
| Record description: | The House Demographic Channel Viewing Detail Thirty Minute file contains the aggregate viewing seconds based on unique house level viewing for each channel for each thirty minute segment of the day, broken out by demographic type and demographic code within market. |
| Specification File Name | House Demographic Channel Viewing Detail Thirty Minute file 250 |

FIG. 29 - Continued

Record Layout

| | NAME | TYPE | SIZE | DESCRIPTION |
|---|---|---|---|---|
| 5810~ | CVD30M-TUNING-ACTIVITY-DATE | DATE | | Viewing Activity Date.<br>Similar to CVDM-TUNING-ACTIVITY-DATE 4610. See description there. |
| 5815~ | CVD30M-ENGAGEMENT-LEVEL | CHAR | 3 | Engagement Level.<br>Same definition as HRD-ENGAGEMENT-LEVEL 4015. |
| 5820~ | CVD30M-CHAN-VD-MARKET | CHAR | 4 | Market.<br>Similar to CVDM-CHAN-VD-MARKET 4620. See description there. |
| 5825~ | CVD30M-CHAN-VD-DEMO-TYPE | CHAR | 6 | Demographic Type.<br>Similar to CVDM-CHAN-VD-DEMO-TYPE 4625. See description there. |
| 5830~ | CVD30M-CHAN-VD-DEMO-CODE | CHAR | 12 | Demographic Code.<br>Similar to CVDM-CHAN-VD-DEMO-CODE 4630. See description there. |
| 5835~ | CVD30M-CHAN-VD-CHAN-CALL-SIGN | CHAR | 10 | Channel Call Sign.<br>Similar to CVDM-CHAN-VD-CHAN-CALL-SIGN 4635. See description there. |
| 5840~ | CVD30M-MINUTE-SUB<br><br>NonLimiting Claims Reference: This is Detail Time Period Id in Claim 30. | NUMBER | 4 | The thirty minute segment of the day. Range of values is 0 to 47 (48 thirty minute segments during the day). This is adjusted by -1 at the time of output.<br><br>Populated from the subscript array position. |
| 5845~ | CVD30M-AGGR-CHN-VIEW-SEC-THS-MIN<br><br>NonLimiting Claims Reference: This is Detail Time Period Aggregate Viewing Seconds in Claim 30. | NUMBER | 12 | This is the sum or aggregate of all viewing seconds of this channel by all set top boxes identified by the demographic type and demographic code during this thirty minute segment in this market.<br>Populated from:<br>Channel Viewing Detail Array for Aggregation Data Structure FIG 15 AGG-CHAN-VIEW-SEC-THIS-30-MIN 3295. |

FIG. 30

Summary Information

| Short name: | House Demo Channel Thirty Minute of Day Summary |
|---|---|
| Table name: | HOUSE_DEMO_CHAN_DAY_30_MIN_SUM |
| Output file name assigned by Measurement Engine 200: | `861-house-demo-chan-30-minute-of-day-summary.csv` |
| Record description: | The House Demographic Channel Thirty Minute of Day Summary file contains the aggregate viewing seconds based on unique house level viewing for each thirty minute segment of the day, summarized across all the channels, broken out by demographic type and demographic code within market. |
| Specification File Name | House Demographic Channel Thirty Minute of Day Summary file 255 |

Record Layout

| | NAME 6000 | TYPE 6002 | SIZE 6004 | DESCRIPTION 6006 |
|---|---|---|---|---|
| 6010~ | M30ODS-TUNING-DATE-YYYYMMDD | DATE | | Tuning Date. Similar to MODS-TUNING-DATE-YYYYMMDD 4810. See description there. |
| 6015~ | M30ODS-ENGAGEMENT-LEVEL | CHAR | 3 | Engagement Level. Same definition as HRD-ENGAGEMENT-LEVEL 4015. Populated from input parameter Engagement Level 8040. |
| 6020~ | M30ODS-MARKET-CODE | CHAR | 4 | Market. Similar to MODS-MARKET-CODE 4820. See description there. |
| 6025~ | M30ODS-CHAN-DAY-SUM-DEMO-TYPE | CHAR | 6 | Demographic Type. Similar to MODS-CHAN-DAY-SUM-DEMO-TYPE 4825. See description there. |
| 6030~ | M30ODS-CHAN-DAY-SUM-DEMO-CODE | CHAR | 12 | Channel Day Summary Demographic Code records the Demographic code associated with the Viewing Activity. Populated from: Channel Daily Summary Array for Aggregation Data Structure FIG 16 CHAN-DAY-SUM-DEMO-CODE 3415. |

FIG. 30 - Continued

| 6035~ | M30ODS-MINUTE-OF-DAY<br><br>NonLimiting Claims Reference: This is Summary Time Period Id in Claim 30. | NUMBER | 3 | The thirty minute segment of the day. Range of values is 0 to 47 (48 thirty minute segment during the day).<br><br>Populated from the subscript array position. |
|---|---|---|---|---|
| 6040~ | M30ODS-AGGR-VIEWING-SECONDS<br><br>NonLimiting Claims Reference: This is Summary Time Period Aggregate Viewing Seconds in Claim 30. | NUMBER | 12 | This is the sum or aggregate of all viewing seconds during this thirty minute segment across all the channels by all set top boxes identified by the demographic type and demographic code for the entire day in this market.<br>Populated from:<br>Channel Daily Summary Array for Aggregation Data Structure FIG 16 S30-AGGR-VIEWING-SECONDS 3435. |

FIG. 31

Summary Information

| Short name: | House Demo Chan Viewing Detail Sixty Minute |
|---|---|
| Table name: | HOUSE_DEMO_CHAN_VW_DETL_60_MIN |
| Output file name assigned by Measurement Engine 200: | 870-house-demo-chan-viewing-detail-60-minute.csv |
| Record description: | The House Demographic Channel Viewing Detail Sixty Minute file contains the aggregate viewing seconds based on unique house level viewing for each channel for each sixty minute segment of the day, broken out by demographic type and demographic code within market. |
| Specification File Name | House Demographic Channel Viewing Detail Sixty Minute file 260 |

FIG. 31 - Continued

Record Layout

| | NAME | TYPE | SIZE | DESCRIPTION |
|---|---|---|---|---|
| 5810~ | CVD60M-TUNING-ACTIVITY-DATE | DATE | | Viewing Activity Date. Similar to CVDM-TUNING-ACTIVITY-DATE 4610. See description there. |
| 5815~ | CVD60M-ENGAGEMENT-LEVEL | CHAR | 3 | Same definition as HRD-ENGAGEMENT-LEVEL 4015. |
| 5820~ | CVD60M-CHAN-VD-MARKET | CHAR | 4 | Market. Similar to CVDM-CHAN-VD-MARKET 4620. See description there. |
| 5825~ | CVD60M-CHAN-VD-DEMO-TYPE | CHAR | 6 | Demographic Type. Similar to CVDM-CHAN-VD-DEMO-TYPE 4625. See description there. |
| 5830~ | CVD60M-CHAN-VD-DEMO-CODE | CHAR | 12 | Demographic Code. Similar to CVDM-CHAN-VD-DEMO-CODE 4630. See description there. |
| 5835~ | CVD60M-CHAN-VD-CHAN-CALL-SIGN | CHAR | 10 | Channel Call Sign. Similar to CVDM-CHAN-VD-CHAN-CALL-SIGN 4635. See description there. |
| 5840~ | CVD60M-MINUTE-SUB<br><br>NonLimiting Claims Reference: This is Detail Time Period Id in Claim 30. | NUMBER | 4 | The sixty minute segment of the day. Range of values is 0 to 23 (24 sixty minute segments during the day). This is adjusted by -1 at the time of output.<br><br>Populated from the subscript array position. |
| 5845~ | CVD60M-AGGR-CHN-VIEW-SEC-THS-MIN<br><br>NonLimiting Claims Reference: This is Detail Time Period Aggregate Viewing Seconds in Claim 30. | NUMBER | 12 | This is the sum or aggregate of all viewing seconds of this channel by all set top boxes identified by the demographic type and demographic code during this sixty minute segment in this market. This is populated from: Channel Viewing Detail Array for Aggregation Data Structure FIG 15 AGG-CHAN-VIEW-SEC-THIS-60-MIN 3300. |

FIG. 32

Summary Information

| Short name: | House Demo Channel Sixty Minute of Day Summary |
|---|---|
| Table name: | HOUSE_DEMO_CHAN_DAY_60_MIN_SUM |
| Output file name assigned by Measurement Engine 200: | 871-house-demo-chan-60-minute-of-day-summary.csv |
| Record description: | The House Demographic Channel Sixty Minute of Day Summary file contains the aggregate viewing seconds based on unique house level viewing for each sixty minute segment of the day, summarized across all the channels, broken out by demographic type and demographic code within market. |
| Specification File Name | House Demographic Channel Sixty Minute of Day Summary file 265 |

Record Layout

| | NAME 6000 | TYPE 6002 | SIZE 6004 | DESCRIPTION 6006 |
|---|---|---|---|---|
| 6010~ | M60ODS-TUNING-DATE-YYYYMMDD | DATE | | Tuning Date. Similar to MODS-TUNING-DATE-YYYYMMDD 4810. See description there. |
| 6015~ | M60ODS-ENGAGEMENT-LEVEL | CHAR | 3 | Engagement Level. Same definition as HRD-ENGAGEMENT-LEVEL 4015. Populated from input parameter Engagement Level 8040. |
| 6020~ | M60ODS-MARKET-CODE | CHAR | 4 | Market. Similar to MODS-CHAN-VD-MARKET 4820. See description there. |
| 6025~ | M60ODS-CHAN-DAY-SUM-DEMO-TYPE | CHAR | 6 | Demographic Type. Similar to MODS-CHAN-VD-DEMO-TYPE 4825. See description there. |
| 6030~ | M60ODS-CHAN-DAY-SUM-DEMO-CODE | CHAR | 12 | Channel Day Summary Demographic Code records the Demographic code associated with the Viewing Activity. Populated from: Channel Daily Summary Array for Aggregation Data Structure FIG 16 CHAN-DAY-SUM-DEMO-CODE 3415. |

FIG. 32 - Continued

| | | | | |
|---|---|---|---|---|
| 6035~ | M60ODS-MINUTE-OF-DAY<br><br>NonLimiting Claims Reference: This is Summary Time Period Id in Claim 30. | NUMBER | 3 | The sixty minute segment of the day. Range of values is 0 to 23 (24 sixty minute segment during the day).<br><br>Populated from the subscript array position. |
| 6040~ | M60ODS-AGGR-VIEWING-SECONDS<br><br>NonLimiting Claims Reference: This is Summary Time Period Aggregate Viewing Seconds in Claim 30. | NUMBER | 12 | This is the sum or aggregate of all viewing seconds during this sixty minute segment across all the channels by all set top boxes identified by the demographic type and demographic code for the entire day in this market.<br><br>Populated from:<br>Channel Daily Summary Array for Aggregation Data Structure FIG 16 S60-AGGR-VIEWING-SECONDS 3440. |

FIG. 33

Summary Information

| | |
|---|---|
| Short name: | House Demo Chan Daily Summary |
| Table name: | HOUSE_DEMO_CHAN_DAILY_SUMMARY |
| Output file name assigned by Measurement Engine 200: | 880-house-demo-chan-daily-summary.csv |
| Record description: | The Channel Daily Summary file contains the aggregate viewing seconds based on unique house level viewing for each channel for the entire day, broken out by demographic type and demographic code within market. |
| Specification File Name | House Demographic Channel Daily Summary file 270 |

FIG. 33 - Continued

Record Layout

| | NAME | TYPE | SIZE | DESCRIPTION |
|---|---|---|---|---|
| | | 4800 | 4802 | 4804 | 4806 |
| 4810~ | HDCDS-TUNING-ACTIVITY-DATE | DATE | | Viewing Activity Date.<br>Similar to CVDM-TUNING-ACTIVITY-DATE 4610. See description there. |
| 4815~ | HDCDS-ENGAGEMENT-LEVEL | CHAR | 3 | Engagement Level.<br>Same definition as HRD-ENGAGEMENT-LEVEL 4015. |
| 4820~ | HDCDS-CHAN-VD-MARKET | CHAR | 4 | Market. Similar to CVDM-CHAN-VD-MARKET 4620. See description there. |
| 4825~ | HDCDS-CHAN-VD-DEMO-TYPE | CHAR | 6 | Demographic Type.<br>Similar to CVDM-CHAN-VD-DEMO-TYPE 4625. See description there. |
| 4830~ | HDCDS-CHAN-VD-DEMO-CODE | CHAR | 12 | Demographic Code records the demographic code associated with the Viewing Activity.<br>Populated from:<br>Channel Viewing Detail Array for Aggregation Data Structure FIG 15 CHAN-VD-DEMO-CODE 3215. |
| 4835~ | HDCDS-CHAN-VD-CHAN-CALL-SIGN | CHAR | 10 | Channel Call Sign records the call sign of the channel for which the viewing activity was calculated.<br>Populated from:<br>Channel Viewing Detail Array for Aggregation Data Structure FIG 15 CHAN-VD-CHANNEL-CALL-SIGN-TRGT 3230. |
| 4840~ | HDCDS-AGGR-CHAN-VIEW-SECS | NUMBER | 12 | This is the sum or aggregate of all viewing seconds of this channel by all set top boxes identified by the demographic type and demographic code for the entire day in this market.<br><br>Populated from:<br>Channel Viewing Detail Array for Aggregation Data Structure FIG 15 AGG-CHANNEL-VIEWING-SECONDS 3275. |

FIG. 37

Calculate Channel Viewing for Thirty Minute Segment
740

Calculate Aggregate Viewing for Each Channel For Each Thirty Minute Segment for Day Loop
Varying Channel-Sub
From 1 By 1 for All Channels
  Loop
  Varying Minute-sub
  From 1 By 1
  For All minutes of Day
    For each group of 30 minutes
      Add Aggregate Channel Viewing Seconds This Minute
        (Demo-sub, Channel-sub, Minute-sub) 3280 to
        Aggregate Channel Viewing Seconds for 30 minute segment (Demo-sub, Channel-sub) 3295
      If it is first minute of thirty-minute segment, using proper subscripts
        Load AGG-CHAN-VIEW-AT-BEG-OF-30-MIN 3297 from AGGR-CHAN-VIEW-AT-BEG-OF-MINUTE 3282
      End-if
      If it is minute fifteen of thirty-minute segment, using proper subscripts
        Load AGG-CHAN-VIEW-AT-MID-OF-30-MIN 3299 from AGGR-CHAN-VIEW-AT-BEG-OF-MINUTE 3282
      End-if
    End Loop
End Loop
                                        742
Note: Demo-sub is controlled in the calling routine.

FIG. 38

Calculate Aggregate Viewing for Thirty Minute Segment
744

Calculate Aggregate Viewing Across All Channels During Each Thirty Minute Segment of Day Loop
Varying Thirty-minute-sub
From 1 By 1
For All Thirty Minute Segments of Day
  Loop Varying Channel-Sub
  From 1 By 1 for All Channels
    Add Aggregate Channel Viewing Seconds for 30 minute segment
      (Demo-sub, Channel-sub, Thirty-minute-sub) 3295 to
    Aggregate Viewing Seconds This Thirty Minute Segment
      (Demo-sub, Thirty-minute-sub) 3435
  End Loop
End Loop
                                        746
Note: Demo-sub is controlled in the calling routine.

Calculate Channel Viewing for Sixty Minute Segment
760

FIG. 39

```
Calculate Aggregate Viewing for Each Channel For Each Sixty Minute Segment for Day Loop
Varying Channel-Sub
From 1 By 1 for All Channels
   Loop
   Varying Minute-sub
   From 1 By 1
   For All minutes of Day
      For each group of 60 minutes
         Add Aggregate Channel Viewing Seconds This Minute
            (Demo-sub, Channel-sub, Minute-sub) 3280 to
            Aggregate Channel Viewing Seconds for 60 minute segment (Demo-sub, Channel-sub) 3300
         If it is first minute of sixty-minute segment, using proper subscripts
            Load AGG-CHAN-VIEW-AT-BEG-OF-60-MIN 3302 from AGGR-CHAN-VIEW-AT-BEG-OF-MINUTE 3282
         End-if
         If it is minute thirty of sixty-minute segment, using proper subscripts
            Load AGG-CHAN-VIEW-AT-MID-OF-60-MIN 3304 from AGGR-CHAN-VIEW-AT-BEG-OF-MINUTE 3282
         End-if
      End Loop
End Loop
                                              762
Note: Demo-sub is controlled in the calling routine.
```

Calculate Aggregate Viewing for Sixty Minute Segment
764

FIG. 40

```
Calculate Aggregate Viewing Across All Channels During Each Sixty Minute Segment of Day Loop
Varying Sixty-minute-sub
From 1 By 1
For All Sixty Minute Segments of Day
   Loop Varying Channel-Sub
   From 1 By 1 for All Channels
      Add Aggregate Channel Viewing Seconds for 60 minute segment
            (Demo-sub, Channel-sub, Sixty-minute-sub) 3300 to
         Aggregate Channel Viewing Seconds This Sixty Minute Segment
            (Demo-sub, Sixty-minute-sub) 3440
   End Loop
End Loop
                                              766
Note: Demo-sub is controlled in the calling routine.
```

File Name: 830-house-demo-chan-viewing-detail-01-minute.csv

File Name: 831-house-demo-chan-01-minute-of-day-summary.csv

File Name: 860-house-demo-chan-viewing-detail-30-minute.csv

File Name: 861-house-demo-chan-30-minute-of-day-summary.csv

File Name: 870-house-demo-chan-viewing-detail-60-minute.csv

File Name: 871-house-demo-chan-60-minute-of-day-summary.csv

FIG. 50

Summary Information

| Short name: | Input Parameters |
|---|---|
| Record description: | The Input Parameters contains several parameters that control processing. |
| Specification File Name | Input Parameter file 125 |

Record Layout

| | NAME | TYPE | SIZE | DESCRIPTION |
|---|---|---|---|---|
| 8010~ | Max Tune Duration | Number | 5 | Max Tune Duration specifies the maximum allowable tune duration. Tunes longer than this will be truncated to this length. |
| 8015~ | Min Tune Duration | Number | 5 | Min Tune Duration specifies the minimum allowable tune duration. Tunes shorter than this will be skipped. |
| 8020~ | Market | Char | 4 | Market specifies the market or geographic area that is being processed. The data in the input file should match this value. |
| 8025~ | All or Unique Seconds | Char | 1 | All or Unique Seconds controls whether the process tabulates all viewing seconds (A) or only unique viewing seconds (U). |
| 8030~ | Data date | Date | | The date of the tuning data. Also used to populate Viewing Activity Date in the output files. |
| 8035~ | Demographic Type | Char | 6 | The grouping of the demographic codes found in the video viewing data file. This value is used in populating the Demographic Type wherever it occurs in the output files. |
| 8040~ | Engagement Level | Char | 3 | Engagement Level records the code which identifies the level of engagement that the user had to have with the video content for the activity to be included in the aggregation. Used in populating the Engagement Level wherever it occurs in the output files. |

Columns above: 8000, 8002, 8004, 8006

MEASURING VIDEO-PROGRAM-VIEWING ACTIVITY

CROSS-REFERENCE TO RELATED APPLICATIONS

This application is a continuation of U.S. patent application Ser. No. 16/549,440, filed Aug. 23, 2019, which is a continuation of U.S. patent application Ser. No. 13/740,199, filed Jan. 13, 2013 and now U.S. Pat. No. 10,440,428. The above-referenced applications are hereby incorporated by reference in their entireties.

This application is also related to the application U.S. application Ser. No. 13/052,026 filed on Mar. 18, 2011 entitled "SYSTEM AND METHOD FOR MEASURING TELEVISION ADVERTISING AND PROGRAM VIEWING AT A SECOND-BY-SECOND LEVEL AND FOR MEASURING EFFECTIVENESS OF TARGETED ADVERTISING" by the present inventor which is incorporated by reference in its entirety but is not admitted to be prior art.

This application is also related to the application U.S. application Ser. No. 13/360,704 filed on Jan. 28, 2012 entitled "SYSTEM AND METHOD FOR MEASURING LONGITUDINAL VIDEO ASSET VIEWING AT A SECOND-BY-SECOND LEVEL TO UNDERSTAND BEHAVIOR OF VIEWERS AS THEY INTERACT WITH VIDEO ASSET VIEWING DEVICES THAT ACCESS A COMPUTER SYSTEM THROUGH A NETWORK" by the present inventor which is incorporated by reference in its entirety but is not admitted to be prior art.

This application is also related to the application U.S. application Ser. No. 13/567,073 filed on Aug. 5, 2012 entitled "SYSTEM AND METHOD FOR MEASURING LINEAR, DVR, AND VOD VIDEO PROGRAM VIEWING AT A SECOND-BY-SECOND LEVEL TO UNDERSTAND BEHAVIOR OF VIEWERS AS THEY INTERACT WITH VIDEO ASSET VIEWING DEVICES DELIVERING CONTENT THROUGH A NETWORK" by the present inventor which is incorporated by reference in its entirety but is not admitted to be prior art.

PROGRAM LISTING

This patent submission contains four (4) program listings as shown in the table below. The following program listings are incorporated in this Specification by reference.

| | Name of the ASCII Text file | Date of Creation | Size in bytes |
|---|---|---|---|
| 1. | Orlowski-PREPROCESS-CHANNEL-TUNE-FILE-HOUSE-DEMO.txt | Jan. 12, 2013 | 68,438 |
| 2. | Orlowski-CHANNEL-TUNE-SORT-for-HOUSE-DEMO.txt | Jan. 11, 2013 | 11,411 |
| 3. | Orlowski-ANALYTICS-ENGINE-HOUSE-DEMO.txt | Jan. 12, 2013 | 363,421 |
| 4. | Orlowski-Query-Source-Code-Ref.txt | Jan. 7, 2013 | 7,813 |

Note:
Variable names used in program correspond to specification, but may not match exactly.

BACKGROUND-PRIOR ART

The following is a tabulation of some prior art that presently appears relevant:

U.S. Patents

| U.S. Pat. No. | Class | Issue Date | Patentee |
|---|---|---|---|
| 7,383,243 | 725/2 | Jun. 3, 2008 | Conkwright, et al. |
| 7,590,993 | 725/35 | Sep. 15, 2009 | Hendricks, et al. |

U.S. Patent Application Publications

| Publication Number | Kind Code | Class | Publication Date | Applicant |
|---|---|---|---|---|
| 20070074258 | A1 | 725/105 | Mar. 29, 2007 | Wood; Catherine Alexandra |
| 2010/0145791 | A1 | 705/14.41 | Jun. 10, 2010 | Canning; Brian P. |
| 20060168609 | A1 | 725/9 | Jul. 27, 2006 | Chen; Michael A. |

BACKGROUND INFORMATION

General Statement of Problem

With the ever increasing number of consumer choices for television viewing, it is important for advertisers, content producers, and service providers such as cable television and satellite television and internet protocol television companies to be able to accurately measure audience reach at the house-level for various demographic groups within a geographic area where the house-level viewing accounts for various multiple devices in the home where those devices may or may not be viewing the same content at the same moment in time. Additionally, there is an urgent industry need to measure house-level viewing across all the devices in the home by demographic group for video programming across all channels and all minutes of the day.

Traditional methods of measuring television viewership do not provide one-second level viewing information aggregated to the house-level for various demographic groups even though this could be extremely helpful to advertisers, content producers, and content providers.

Advertising Industry Problem

Producing television ads and purchasing ad time to run those ads is expensive. Ideally, the advertising purchased with those dollars can be correlated with ad impressions. Unfortunately, measuring ad impressions or ad viewership is very difficult, especially when there are hundreds of channels and many of them are lightly viewed. The problem is magnified by channel-surfing and by multi-screen activity wherein one person may use personal viewing devices, traditional cable or satellite television, and perhaps computer based viewing. While traditional survey techniques provide audience measures for popular channels, they are inadequate for lightly-viewed channels, which can be up to 80% of the channels. In today's competitive media environment, television advertisers need accurate and detailed viewing information for video content aggregated to the house-level with suitable breakouts for demographic and geographic groupings so that they can measure the effectiveness of their advertising.

Advertisers need detailed house-level reach information on viewing of the ads that they pay to air. When an advertising campaign includes commercials that are aired on multiple programs at various times, and when a home has multiple viewing devices on which a viewer may be exposed to those ads, sometimes having the same ad on the same device at the same time, it is very important for an advertiser to be able to accurately measure house-level exposure to the ad. Additionally, the advertiser needs to know what demographic group in a particular geographic area was exposed to the ad. All of this information enables advertisers to make wise decisions regarding ad placement.

In order to be able to reach particular demographic groups, advertisers also need to know about the demographic characteristics of the audience that views any particular program. They need access to this information at minute-level, thirty-minute level, and sixty-minute level for all programs on all channels across all hours of the day.

I have not found any patents or patent applications that teach how to use set top box data to efficiently analyze second-by-second viewership of advertising to produce the detailed information that advertisers need.

Television Network Problem

Television networks need to create an appealing programming schedule with content that the viewers are interested in viewing. It is difficult for television networks to get accurate audience feedback, particularly for lightly viewed networks. They need to be able to measure demographic-based viewing patterns for each show. Traditional measurement tools do not provide the detailed information needed to help television networks understand how viewers are responding to the content. The result is that television networks may develop programming schedules that do not appeal to the audience. This is wasteful.

Content Producers Problem

Producing television content is often expensive. It is difficult for the content producers to get accurate audience feedback. Additionally, there is not one audience, but many audiences, because of the wide variety of viewer interests. Furthermore, various demographic groups may have different viewing preferences. The content producers need to tailor the content to the audience; understanding viewing based on demographic patterns is very helpful for this. With the increasing number of viewing choices it is all the more important to be able to accurately measure viewership of demographic groups. By identifying specific demographic groups and the content they prefer to consume, content producers can increase ad revenue by enabling advertisers to target ads based on the demographic characteristics of the audience thus justifying higher advertising fees. Traditional measurement tools do not provide the detailed information needed to help producers and writers to understand how viewers are responding to the content. The result is that producers may develop content that lacks interest to the audience. This is wasteful.

Cable Television Industry Problem

In the cable television industry, content providers offer consumers hundreds of channels. Cable television companies pay very large amounts of money for content. It is imperative for the cable television companies to be able to accurately measure audience viewership in order to understand what value the various programs bring to their customers. They must understand viewership by demographic groupings. Also, by understanding the time of day when various programs are viewed by the demographic groups, the cable television companies can create more attractive viewing schedules for their customers. Additionally, as cable television companies are able to accurately measure audience viewership, they will be able to better negotiate with the program providers on the price to be paid for programming content and with advertisers on the price to charge for airing advertising.

Satellite Television Industry Problem

The satellite television industry faces the same problems as the cable television industry in regard to understanding what programming the viewers are watching and at what time of day and on what device. In general they have the same need to understand viewer behavior as do the cable television companies.

Internet Protocol Television Industry Problem

The Internet Protocol television (IP TV) industry faces the same problems as the cable television industry in regard to understanding what programming the viewers are watching and at what time of day and on what device. In general they have the same need to understand viewer behavior as do the cable television companies.

Need for Information about the Customer

In addition to these issues, cable television companies, satellite television companies, IP TV providers, television content providers, television advertisers, and other interested parties are continually desiring to know more about the customers they serve, the patterns of customer interactions, the content customers find interesting or that keeps their attention, the ads they view, the time of day when various program are viewed, how programs compare with one another in keeping viewer interest, and numerous other measures, all of which often vary by demographic group. With the advent of multiple video viewing devices in the home, the need to understand viewer behavior is even more important.

Fortunately, currently available technology enables the collection of raw data that, with proper analysis, can begin to answer many of these questions, and even do so with great specificity.

We will now look at some sources of raw data in the television industry.

Video Viewing Activity Data Sources

Since my original United States Patent Application having application Ser. No. 12/981,301 filed on Dec. 29, 2010, the industry has continued to mature. In the past it was common to refer to this data as Channel Tuning activity. While that term is accurate, in this specification I will often use the more general term Video Viewing Activity.

Within the video viewing space there are collection systems in place for collecting Video Viewing Activity. Such collection systems include switched digital video collection systems, set top box data collection systems, IP Television collection systems, EBIF agents, etc. Many such applications are now well established in the industry; others are continually being developed. Such data collection is beyond the scope of this Patent Application. It will suffice to know that the needed video viewing activity is available. Such Video Viewing Activity can readily be enriched to include demographic information about the house or about the viewer using the video viewing device. Such Video Viewing Activity can also be enriched to include Geographic information identifying where the viewing activity occurred.

Raw Video Viewing Event Data

This specification assumes that viewer interaction data can be delivered in a format that allows my Preprocessing Engine 140 and House Demographic Measurement Engine 200 to ingest it. I will refer to this format as Raw Video Viewing Event data. This can be provided from a Media Measurement Data Model (MMDM) or from some other data source. Once data is available in the Raw Video Viewing Event format, it can be readily processed using algorithms which I will teach about in this specification. The teachings of this specification are not limited to or dependent upon using data from a Media Measurement Data Model; that is simply one possible manner in which data may be provided. Data may also be provided in a simple flat file format or any number of other formats.

Processes for providing Raw Video Viewing Event data are beyond the scope of this Patent Application. Those skilled in the art will recognize that there are any number of methods that may be used to create the input files which my Measurement Engine 200 will use.

Video Program Schedule Data Sources

As with the collection of video viewing activity data, the availability of program schedule data is rapidly expanding. There are various industry standards in this area and new standards are being developed. For purposes of media measurement, these systems can provide the detailed information about the video programs, program schedules identifying when they aired in the various markets. This schedule information can be mapped in a user interface against the one-minute, thirty-minute, and sixty-minute aggregations which I teach how to create with the result that the end-user is able to correlate program schedule data with viewing activity. This correlation is beyond the scope of this teaching.

Advertising Schedule Data Sources

There are various advertising systems in existence today. For purposes of this specification, it is sufficient to recognize that data can be made available to identify the advertisements which are to be measured to determine ad reach.

File Transfer to Receive the Data

The Raw Video Viewing Event data can be made available to my Measurement Engine whether through SQL queries, data base extracts, XML messages, or any other computer readable format.

Encryption may be applied for data security purposes. Compression may be applied to reduce data transfer volumes.

Additionally, once the data is enriched, key identifiers can be hashed or encrypted or de-identified to protect the identity of the viewer.

Existing Tools for Data Analysis

We have seen by way of background that video viewing activity data and program schedule data is readily available. Regarding tools for using this data to analyze detailed viewing patterns, I am not aware of any vendor solutions or patents that load second-by-second channel tuning data or video asset viewing device usage data into a Data Structure in the memory of a computer to identify second-by-second video viewing activity and then filtering out duplicate viewing activity at a household level. I am also not aware of any such process that calculates advertising Reach at the household-level. I am also not aware of any such process that calculates advertising Reach at the household-level by demographic group. Finally, I am not aware of any process that calculates household level viewing data across all channels and all minutes of the day with viewing breakouts by demographic group.

Relevant Patents

The patents and patent applications identified below are only mildly relevant. I include them here to acknowledge that others have taught about using set-top box data, but none have used it as I teach in this application and none have been able to produce the detailed metrics that I have identified herein.

EXAMPLES INCLUDE

Conkwright, et al. in U.S. Pat. No. 7,383,243 issued Jun. 3, 2008 teaches about collecting set-top box data for the purpose of predicting what consumers will do, not for the purpose of understanding actual viewer behavior. It appears that he does not teach the loading of a data structure containing buckets representing individual units of time to analyze viewing behavior.

Hendricks, et al. in U.S. Pat. No. 7,590,993 Method and apparatus for gathering programs watched data issued Sep. 15, 2009 teaches about collecting tuning data from the set-top box and combining that with other data in a data base to determine the types of programming the STB tunes to. It appears that he does not teach the loading of a data structure containing buckets representing individual units of time to analyze viewing behavior.

Relevant Patent Applications

Wood; Catherine Alexandra in U.S. Patent Application 20070074258 dated Mar. 29, 2007 teaches about collecting subscriber activity data, such as channel changes generated by the subscriber while watching video or TV in an IPTV system. It appears that she does not teach the loading of a data structure containing buckets representing individual units of time to analyze viewing behavior. It appears instead that she teaches loading the channel tuning data to a relational data base and then performing various SQL based queries against that data base.

Eldering; Charles A.; et al. in U.S. Patent Application 20080127252 dated May 29, 2008 teaches about targeted advertising. He notes that SDV systems have the ability to provide viewership counts. It appears that he does not teach the loading of a data structure containing buckets representing individual units of time to analyze viewing behavior.

Allegrezza; Fred J.; et al. in U.S. Patent Application 20090077577 dated Mar. 19, 2009 teaches about aggregating information obtained from the messages to generate channel viewership information identifying a number of subscribers tuned to each broadcast channel over a period of time, but it appears to be based simply on tune-in activity. It appears that he does not teach the loading of a data structure containing buckets representing individual units of time to analyze viewing behavior.

Bou-Abboud; Claude H. in U.S. Patent Application 20070214483 dated Sep. 13, 2007 teach about a tool for predicting capacity demands on an electronic system. It appears that they do not teach the loading of a data structure containing buckets representing individual units of time to analyze viewing behavior.

Canning; Brian P.; et al. in U.S. Patent Application 20100145791 dated Jun. 10, 2010 teach about storing data in multiple shards and supporting queries against the data. It appears that he does not teach the loading of a data structure containing buckets representing individual units of time to analyze viewing behavior.

Summary of Short-Comings in Data Analysis Tools

In general, these methods do not suggest the concepts taught about in my application. They do not teach about calculating household reach; they do not teach about calculating household reach along with demographic breakouts; they do not teach about loading viewing activity to a data structure containing buckets representing individual units of time to analyze viewing behavior.

In general, a short-coming of the methods identified above is that the foundation is a non-procedural language (SQL) used in conjunction with a relational data base which together do not have the detailed processing capability required to perform complex analytics. In such an environment, in order to capture the richness of certain aspects of the channel tuning data, one would have to explode the data out into individual rows with one row for each second of viewer activity. In such an environment, this is extremely expensive because adding a primary key to each data record simply to record the second (time) multiplies the volume of data many times over because the size of the primary key requires much more storage space than the data being recorded. Thus we see that using a non-procedural language (SQL) in conjunction with a relational data base is very inefficient and requires extremely powerful data base servers to analyze this data. In contrast I am able to produce these complex analytics on a simple personal computer.

As a result of not being able to perform the detailed analytics required, the behavioral and device usage information contained in the data remains hidden from interested parties.

SUMMARY

In accordance with one embodiment, I have disclosed a computer-implemented method of using video viewer interaction data as input to a measurement engine which then calculates: demographic level and aggregate level (a) household reach for advertisements and video content based on user defined reach periods, (b) One-minute, Thirty-minute, and Sixty-minute channel viewing metrics, and (c) One-minute, Thirty-minute, and Sixty-minute aggregate viewing metrics, all based on second-by-second household level viewing activity. My teaching also shows creation of Commercial Schedule Cumulative Audience, Impressions for Reach Periods, Demographic Group Impressions, Average Audience, Average Audience Share, Average Rating, Households Using Television, and Households Using Television Percent using household level data. My method works with IP and linear video delivery. Together these metrics provide detailed information on customer viewing behavior which can be used to drive business decisions for service providers, advertisers, and content producers.

Advantages

By mapping the Video Viewing Activity with demographic identifiers to Aggregation Channels and then aggregating the viewing activity to those Aggregation channels at a house level and then using that aggregated data to calculate house-level reach, I am able to determine house-level reach for both advertisements and video content in aggregate and by Demographic group. Additionally, I am able to summarize the data that has been aggregated to the house-level within demographic groupings to create one-minute, thirty-minute, and sixty-minute aggregations across all channels and all minutes of the day with viewing breakouts by demographic group within a geographic area. Each of these are provide detailed viewing metrics that could not be produced previously. Existing analysis techniques simply do not allow the creation of the detailed viewing metrics which I have been able to produce. These metrics will allow service providers, advertisers, and content producers to make intelligent business decisions benefiting both themselves and their customers.

Comparison to my Prior Applications

In my co-pending United States Patent Application having application Ser. No. 12/981,301 filed on Dec. 29, 2010 entitled "SYSTEM AND METHOD FOR ANALYZING HUMAN INTERACTION WITH ELECTRONIC DEVICES THAT ACCESS A COMPUTER SYSTEM THROUGH A NETWORK", which is incorporated in its entirety but is not admitted to be prior art, and in my co-pending United States Patent Application having application Ser. No. 13/052,026 filed on Mar. 18, 2011 entitled "SYSTEM AND METHOD FOR MEASURING TELEVISION ADVERTISING AND PROGRAM VIEWING AT A SECOND-BY-SECOND LEVEL AND FOR MEASURING EFFECTIVENESS OF TARGETED ADVERTISING", which is incorporated in its entirety but is not admitted to be prior art, I taught populating a Data Structure with identifying information and device usage information such as channel tuning data to create a foundation upon which a comprehensive set of metrics can be produced. In those applications I also taught loading the tuning data on a second-by-second basis into buckets in a data structure for analytics.

In my co-pending United States Patent Application having application Ser. No. 13/360,704 filed on Jan. 28, 2012 entitled "SYSTEM AND METHOD FOR MEASURING LONGITUDINAL VIDEO ASSET VIEWING AT A SECOND-BY-SECOND LEVEL TO UNDERSTAND BEHAVIOR OF VIEWERS AS THEY INTERACT WITH VIDEO ASSET VIEWING DEVICES THAT ACCESS A COMPUTER SYSTEM THROUGH A NETWORK", which is incorporated in its entirety but is not admitted to be prior art, I taught populating a Data Structure with identifying information and device usage information such as channel tuning data to create a foundation upon which a comprehensive set of metrics can be produced. In that applications I taught loading the tuning data on a second-by-second basis into buckets in a data structure and populating the buckets with a channel call sign to indicate viewing of the channel during that second; I then used this as a basis for creating analytics.

In my co-pending United States Patent Application having application Ser. No. 13/567,073 filed on Aug. 5, 2012 entitled "SYSTEM AND METHOD FOR MEASURING LINEAR, DVR, AND VOD VIDEO PROGRAM VIEWING AT A SECOND-BY-SECOND LEVEL TO UNDERSTAND BEHAVIOR OF VIEWERS AS THEY INTERACT WITH VIDEO ASSET VIEWING DEVICES DELIVERING CONTENT THROUGH A NETWORK" by the present inventor which is incorporated by reference in its entirety but is not admitted to be prior art, I taught populating a Data Structure with identifying information including video program being viewed, a video program airing being viewed, and fields to identify the demographic, geographic, and device information related to the viewer and the viewing device he is using to create a foundation upon which a comprehensive set of metrics can be produced. In that applications I taught loading the tuning data on a second-by-second basis into buckets in a data structure and populating the buckets with various Activity Fields including (a) an identifier to indicate the activity of the user during that second with activity being things such as Play, Skip, Forward (at various speeds), Reverse (at various speeds), etc., (b) volume level, (c) foreground/background indicator, (d) percent content visible, (e) picture in picture indicator, (f) a percentage of screen this video, and (g) a viewer interaction score which assigns a value to the viewing activity that was occurring on a second-by-second basis; I then used this as a basis for creating analytics.

Advantages of this Application

In this House Demographic Viewing Specification, I teach populating a Channel Viewing Detail One-Second Array Data Structure FIG. 14 with information identifying geographic, demographic, channel, and house values along with buckets for each second of the day where the bucket is used to identify viewing activity of that channel in that house during that second of the day. The data structure links the house with the geographic and demographic values. By aggregating the data at the channel+house level this Measurement Engine is able to filter out multiple devices in or associated with the same house and all viewing the same content at the same time, thus providing the basis for accurate house-level audience reach calculations.

The reader will recognize that in each of the several embodiments from the current and prior applications, I teach loading values that identify second-by-second video program viewing activity to selected buckets in a viewing detail data structure based on the beginning and ending time of the user interaction, thus identifying second-by-second video program viewing activity showing whether or not the video asset viewing device was viewing or interacting with the video content during each second of a period of interest and measuring user involvement during each second.

As noted, in this embodiment I introduce the concepts of aggregating to the house level to filter out duplicate viewing by viewers in the house and of tracking viewing activity by demographic code associated with the house.

By combining the teaching of my co-pending patent applications with the teachings of this application I am able to produce detailed viewing metrics based on a one-second level of granularity for video viewing.

In addition to teaching how to populate the Channel Viewing Detail One-Second Array Data Structure FIG. 14, I then teach how to aggregate from the one-second level to produce one-minute, thirty-minute, and sixty-minute aggregations of viewing activity across all channels and across all time periods of the day with viewing breakouts by demographic group within a geographic area; such aggregations can be used by a reporting application and for further analysis.

Once the data is calculated, the metrics can then be output as (i) data files that can be read by a computer program, (ii) data base tables, (iii) electronic messages, or (iv) a spreadsheet.

A person skilled in the art will readily see the benefits of loading the resulting metrics to a relational data base where additional queries and analytics can be run using standard SQL. In this specification I teach how to produce common industry metrics such as Household Advertising Reach, Impressions, Share, HUT, Rating, and Cumulative Audience using the metrics I create. Additionally, the resulting files may be loaded to other statistical analysis tools or data base structures or tools such as Hadoop. As a nonlimiting example, metrics calculated by the Measurement Engine 200 can be loaded to a data base in support of longer term analysis.

The Measurement Engine 200 presented in this embodiment provides the ability to produce metrics with a level of detail not possible previously. These metrics are described in detail in FIG. 13 (Household Reach Definition Array Data Structure), FIG. 14 (Channel Viewing Detail One-Second Array Data Structure), FIG. 15 (Channel Viewing Detail Array for Aggregation Data Structure), and FIG. 16 (Channel Daily Summary Array for Aggregation Data Structure). The metrics shown in these Figures all provide information useful for understanding viewer behavior; understanding how viewers interact with video programming on traditional television and internet protocol television and other video viewing devices; and understanding ad and program viewing habits. Such metrics will provide valuable information for advertisers, service providers (cable television companies, satellite television companies, and/or internet protocol television providers), advertising agencies, and other interested parties. The Measurement Engine 200 then creates various files containing the calculated metrics in a format suitable for loading to a database or other analytical tool. Finally, as noted, I teach how to code the SQL queries to produce several common industry metrics using this data.

These and other advantages of one or more aspects will become apparent from a consideration of the ensuing description and accompanying drawings.

Data Encryption

To protect the privacy of the viewer and/or to comply with various laws and/or regulations, service providers (cable television companies, satellite television companies, and/or internet protocol television providers) may anonymize and/or encrypt and/or de-identify any data that could identify a specific customer or viewer.

Within the various embodiments presented herein, applying consistent encryption algorithms to the house identifiers and video asset viewing device identifiers (Set-top box id's) in the Raw Video Viewing Event House File Structure FIG.

7 and the downstream files allows the Measurement Engine 200 to produce the metrics identified herein while protecting viewer privacy.

Definitions

The following are definitions that will aid in understanding one or more of the embodiments presented herein:

Buckets means individual cells in a Data Structure. Nonlimiting examples include:
(i) addressable fields in a table in a COBOL program,
(ii) addressable fields in an array or similar structure in a 'C' program or a C++ program,
(iii) cells in a spreadsheet.

COBOL is the acronym of a business oriented computing language.

Computer readable format means any data format that can be read by a computer program or a human being as necessary. Nonlimiting examples include:
(i) formatted text files,
(ii) pipe delimited text files,
(iii) data base tables,
(iv) Extensible Markup Language (XML) messages
(v) a printed report.

Computer system accessed through a network means any computer system, any individual piece of computer equipment or electronic gear, or any combination of computer equipment or electronic gear which enables or facilitates the viewer interaction with the video asset viewing device. Nonlimiting examples include:
(i) cable television system,
(ii) cable television switched digital video system,
(iii) cellular phone network,
(iv) satellite television system,
(v) web server,
(vi) any individual piece of computer equipment or electronic gear,
(vii) any combination of computer equipment or electronic gear.

Data analysis computer system means a combination of one or more computers on which a Data Analysis Program or Programs can be executed.

Data analysis computer of known type means any commonly available computer system running a commonly known operating system. Nonlimiting examples include:
(i) a standard personal computer running WINDOWS® XP operating system from MICROSOFT® Corporation,
(ii) a computer running the UNIX operating system,
(iii) a computer running the Linux operating system,
(iv) a computer in a cloud computing environment,
(v) a set-top box with its operating system,
(vi) A mainframe computer with its operating system,
(vii) a standard personal computer running WINDOWS 7 Professional operating system from MICROSOFT® Corporation.

Data analysis program means a computer program or programs that are able to execute on a Data analysis computer of known type.

Data base table means any relational data base table structure or comparable data base object.

Data structure means a place in a computer program or computer system where data can be stored in tabular form with identifying fields and buckets associated with those identifying fields in such a manner that formula and algorithms can be run against the data to produce meaningful metrics. A data structure may have multiple levels of hierarchy in it. Nonlimiting examples include:
(i) table in a COBOL program,
(ii) array or similar structure in a 'C' program or a C++ program,
(iii) spreadsheet;
such structures may be stored in the memory of the computer, but they could also be stored on electronic disk or other computer hardware.

Demographic information or identifier means any data item that can describe a characteristic of a viewer or a subscriber or a household associated with a viewer who is operating the video asset viewing device. Nonlimiting examples include income, ethnicity, gender, age, marital status, location, geographic area, postal code, census data, occupation, social grouping, family status, any proprietary demographic grouping, segmentation, credit score, dwelling type, homeownership status, property ownership status, rental status, vehicle ownership, tax rolls, credit card usage, religious affiliation, sports interest, political party affiliation, cable television subscriber type, cable television subscriber package level, and cell phone service level.

Derive, as in data that is derived, means any method or process of taking the source data and making it ready to populate a destination field or fields. This may include a direct move of the data from the source to the destination or it may include various calculations, substitutions, manipulations, or derivations performed on the source data to make it ready to populate the destination fields or fields.

Electronic message means any computer readable output that can be used as input to another computer or read by a human. Nonlimiting examples include:
(i) data output in Extensible Markup Language format,
(ii) data output in Hypertext Markup Language format, etc.

Geographic information or identifier means any service area or any network hierarchy designation or marketing area or other designated area used by a cable television company or a satellite television company or IP Television delivery company or video asset delivery system. The boundary or description of a geographic area is defined based on the needs of the service provider. Nonlimiting examples include a Market in a cable company network, a Headend in a cable company network, a Hub in a cable company network, a census tract, a cell tower identifier, a service area for satellite TV, advertising zone, a zip code, or some other geographic identifier. The geographic information may then be used to identify the location of a video asset viewing device or geographic information about the about the house associated with the device or the location of the device at the time of the viewer interaction in the event that the viewer interaction occurs in a location different than the location of the house associated with the device.

Interacting with video content means any interaction between the viewer and the video content including but not limited to viewing content, recording content, playing back recorded content including use of trick modes. Recorded content can be DVR recording or VOD content.

Network means any computer network. Nonlimiting examples include:
(i) a cable television network,
(ii) a cellular telephony network,
(iii) hybrid fiber coax system,
(iv) a satellite television network,
(v) a wi-fi network,
(vi) any means that supports communication among video asset viewing devices or electronic devices or computers or computer systems.

Outputting the contents means creating a delimited file, updating a database table, inserting to a database table, loading to an in-memory structure, writing an XML message, or any activity that allows the calculated values to be used by downstream processes.

Pipe delimited text files means data files where the fields are separated by the "|" character.

Set-top box means a video asset viewing device that receives external signals and decodes those signals into content that can be viewed on a television screen or similar display device. The signals may come from a cable television system, a satellite television system, a network, or any other suitable means. A set-top box may have one or more tuners. The set-top box allows the user to interact with it to control what is displayed on the television screen. The set-top box is able to capture the commands given by the user and then transmit those commands to another computer system. For purposes of this application, stating that a set-top box tunes to a channel is equivalent to stating that a tuner in a set-top box has tuned to a channel. A set-top box may also play back previously recorded video content.

Spreadsheet means any commonly known electronic worksheet format. Nonlimiting examples include:
(i) MICROSOFT® EXCEL® files.

STB means Set-top box.

Tuner means a tuner in a Set-top box.

Tuner index means an identifier of a tuner in a Set-top box.

Universe Estimate is the total universe or the total population of TV households in a geographic area. Universe Estimate is used in some of the calculations that produce viewing metrics. This value is provided by the Analyst; it is not calculated by the Measurement Engine 200.

Video asset means any programming content that may be viewed and/or heard. A Video Program may contain multiple Video Assets. Nonlimiting examples of Video Asset include:
(i) advertisements or commercials,
(ii) movies,
(iii) sports programs,
(iv) news casts,
(v) music.

Video asset viewing device means any electronic device that may be used either directly or indirectly by a human being to interact with video content where the video content is provided by a cable television system or a satellite television system or a computer system accessed through a network. Nonlimiting examples include: Gaming station, web browser, MP3 Player, Internet Protocol phone, Internet Protocol television, mobile device, mobile smart phone, set-top box, satellite television receiver, set-top box in a cable television network, set-top box in a satellite television system, cell phone, personal communication device, personal video recorder, personal video player, two-way interactive service platforms, personal computer, tablet device.

Viewer means the human being causing a Viewer interaction; the user of a Set-top box or a Video asset viewing device.

Viewer identifier means any numeric value or character string which can be used to identifier the human being causing a Viewer interaction; the user of a Set-top box or a Video asset viewing device.

Viewer interactions means any identifiable activity that a Video asset viewing device operator may do in regard to a Video asset viewing device and where such activity can be captured by the video asset viewing device or by the computer system, accessed through the network, that supports the device. Nonlimiting examples include:

(i) power on/power off, open web page, close web page,
(ii) channel up/channel down/channel selection, play video content on web browser,
(iii) volume up/volume down/mute/unmute,
(iv) any trick play such as fast forward, rewind, pause
(v) recording video content,
(vi) playing back recorded video content,
(vii) invoking a menu, choosing a menu option,
(viii) any response to a screen prompt.

Viewers interacting with video content through a network means that the video content was delivered through a network. The content may be live content delivered through a network; or live content that was recorded on a local device at the time it was delivered through a network and then played back later with or without the network access; or it may be DVR content in the cloud; or it may be Video on Demand content delivered through a network. Video delivery may be QAM based or Internet Protocol based.

Viewing activity information means information derived from any of the following: Linear viewing including time-shifted linear viewing, Digital Video Recorder recording and playback/viewing, Video on Demand viewing, and Internet Protocol video viewing.

Viewing metrics means any value calculated by a Data Analysis Program.

BRIEF DESCRIPTION OF THE DRAWINGS

In the drawings, closely related figures have the same number but different alphabetic suffixes.

FIG. 5 illustrates an exemplary record layout for a Channel Mapping Definition File Structure 120 formatted for use as input to the House Demographic Measurement Engine 200 with Summary Information followed by the Data Structure description and Sample Data, according to one embodiment.

FIG. 6 illustrates an exemplary data structure for recording a Channel Mapping Definition in the memory of a computer for use in Enriching Video Viewing Event 140 data and for use by the House Demographic Measurement Engine 200, according to one embodiment.

FIG. 7 illustrates an exemplary record layout for a Raw Video Viewing Event House File Structure 110 formatted for use as input to the PreProcessing Engine 140 with Summary Information followed by the Data Structure description, according to one embodiment.

FIG. 8 illustrates an exemplary record layout for a Enriched Video Viewing Event House File Structure 170 formatted for use as input to the House Demographic Measurement Engine 200 with Summary Information followed by the Data Structure description, according to one embodiment.

FIG. 10 illustrates an exemplary record layout for a Demographic Code File Structure 190 formatted for use as input to the PreProcessing Engine 140 with Summary Information followed by the Data Structure description, according to one embodiment.

FIG. 12 illustrates an exemplary record layout for a Household Reach Definition File Structure 180 formatted for use as input to the House Demographic Measurement Engine 200 with Summary Information followed by the Data Structure description and Sample Data, according to one embodiment.

FIG. 13 illustrates an exemplary Household Reach Definition Array Data Structure for use by the House Demographic Measurement Engine 200 with Summary Information followed by the Data Structure description, according to one embodiment.

FIG. 14 illustrates an exemplary Channel Viewing Detail One-Second Array Data Structure for use by the House Demographic Measurement Engine 200 with Summary Information followed by the Data Structure description, according to one embodiment.

FIG. 15 illustrates an exemplary Channel Viewing Detail Array for Aggregation Data Structure for use by the House Demographic Measurement Engine 200 with Summary Information followed by the Data Structure description, according to one embodiment.

FIG. 16 illustrates an exemplary Channel Daily Summary Array for Aggregation Data Structure for use by the House Demographic Measurement Engine 200 with Summary Information followed by the Data Structure description, according to one embodiment.

FIG. 18 illustrates an exemplary flowchart describing the process for tabulating channel viewing activity by the House Demographic Measurement Engine 200, according to one embodiment.

FIG. 24 illustrates summary information and an exemplary record layout for the House Reach Detail file 205 which is produced by the Measurement Engine 200 as a result of calculating house reach viewing activity.

FIG. 25 illustrates summary information and an exemplary record layout for the House Reach Summary file 210 which is produced by the Measurement Engine 200 as a result of calculating house reach viewing activity.

FIG. 26 illustrates summary information and an exemplary record layout for the Demographic House Reach Summary file 215 which is produced by the Measurement Engine 200 as a result of calculating house reach viewing activity.

FIG. 27 illustrates summary information and an exemplary record layout for the House Demographic Channel Viewing Detail Minute file 220 which is produced by the Measurement Engine 200 as a result of calculating house reach viewing activity.

FIG. 28 illustrates summary information and an exemplary record layout for the House Demographic Channel Minute of Day Summary file 225 which is produced by the Measurement Engine 200 as a result of calculating house reach viewing activity.

FIG. 29 illustrates summary information and an exemplary record layout for the House Demographic Channel Viewing Detail Thirty Minute file 250 which is produced by the Measurement Engine 200 as a result of calculating house reach viewing activity.

FIG. 30 illustrates summary information and an exemplary record layout for the House Demographic Channel Thirty Minute of Day Summary file 255 which is produced by the Measurement Engine 200 as a result of calculating house reach viewing activity.

FIG. 31 illustrates summary information and an exemplary record layout for the House Demographic Channel Viewing Detail Sixty Minute file 260 which is produced by the Measurement Engine 200 as a result of calculating house reach viewing activity.

FIG. 32 illustrates summary information and an exemplary record layout for the House Demographic Channel Sixty Minute of Day Summary file 265 which is produced by the Measurement Engine 200 as a result of calculating house reach viewing activity.

FIG. 33 illustrates summary information and an exemplary record layout for the House Demographic Channel Daily Summary file 270 which is produced by the Measurement Engine 200 as a result of calculating house reach viewing activity.

FIG. 37 illustrates an exemplary flowchart describing the process for calculating channel viewing metrics for each thirty-minute segment of the day by the House Demographic Measurement Engine 200, according to one embodiment.

FIG. 38 illustrates an exemplary flowchart describing the process for calculating aggregate viewing across all channels for each thirty-minute segment of the day by the House Demographic Measurement Engine 200, according to one embodiment.

FIG. 39 illustrates an exemplary flowchart describing the process for calculating channel viewing metrics for each sixty-minute segment of the day by the House Demographic Measurement Engine 200, according to one embodiment.

FIG. 40 illustrates an exemplary flowchart describing the process for calculating aggregate viewing across all channels for each sixty-minute segment of the day by the House Demographic Measurement Engine 200, according to one embodiment.

FIG. 50 illustrates summary information and an exemplary record layout for the Input Parameter file 125 which is used as input to the Measurement Engine 200, according to one embodiment.

DETAILED DESCRIPTION OF THE DRAWINGS

Figure 1:
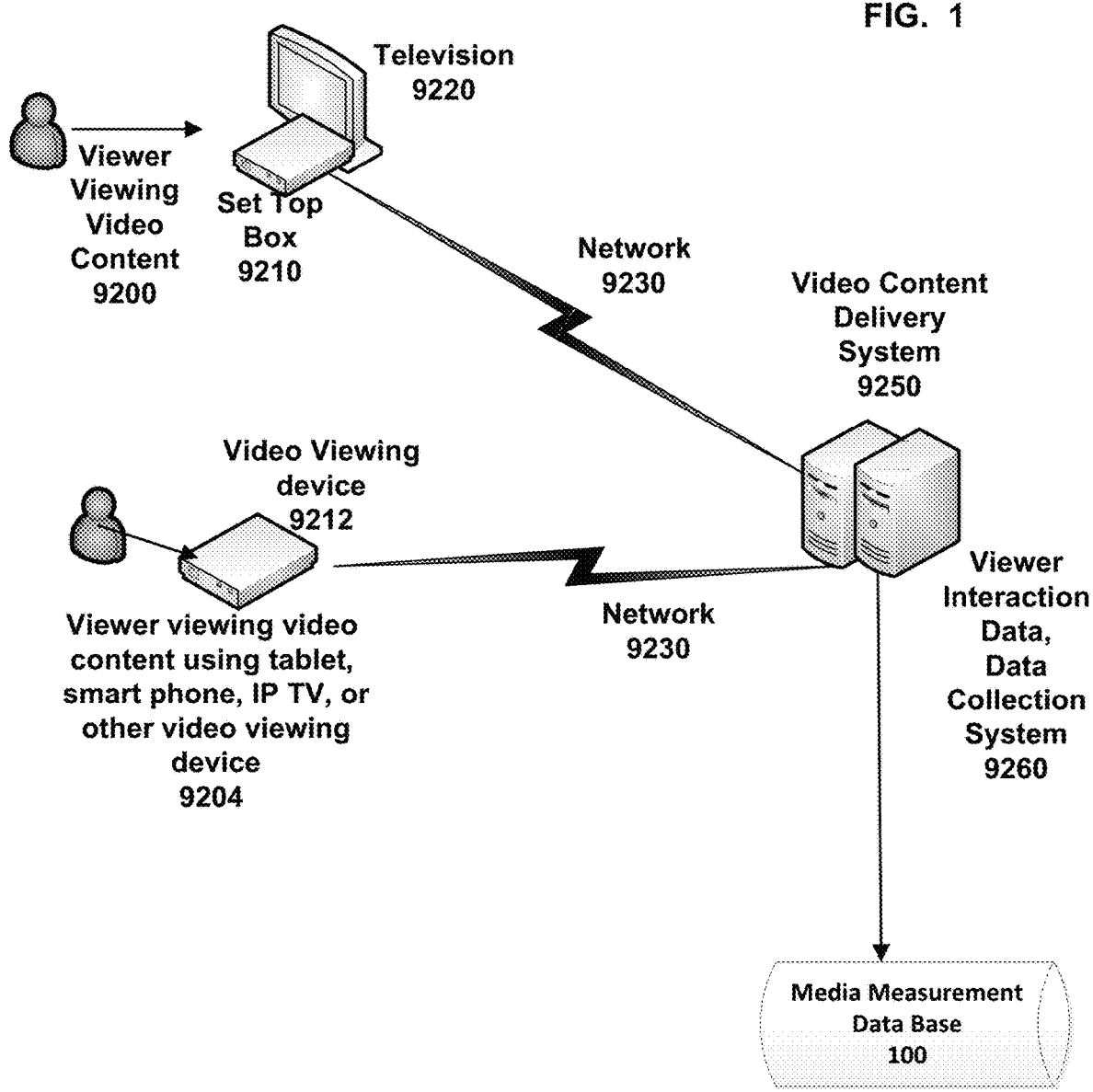
FIG. 1 provides an overview of an exemplary process for collecting viewer interaction data derived from a plurality of viewers interacting with video content that was delivered on a plurality of video asset viewing devices delivering content through a network and then loading that data to a Media Measurement Data Base.

When reading the information below, it can be appreciated that these are merely samples of table layouts, format and content, and many aspects of these tables may be varied or expanded within the scope of the embodiment. The table layouts, field formats and content, algorithms, and other aspects are what I presently contemplate for this embodiment, but other table layouts, field formats and content, algorithms, etc. can be used. The algorithms are samples and various aspects of the algorithms may be varied or expanded within the scope of the embodiment.

Note on Claims reference in drawings—because of the large number of data fields and new concepts taught in this specification, and because a description in the drawings may not use the exact same words or spelling as the corresponding concept in the claims, the reader will note that in limited cases I have added text preceded by the words "Claims reference" to assist the reader in correlating information in the drawings or detailed description of the drawings with the corresponding information in the claims. These references are not meant in any way to restrict the Claims, but rather to clarify the relationship between the Claims and the Specification.

For many of the metrics shown below, I have suggested what the metric indicates. This is not to limit the purpose of the metric to that one usage, but simply to indicate one of potentially many valuable uses for the metric.

Note that the specification and drawings use certain terms interchangeably. The reader will note this most frequently with the terms set-top box and video asset viewing device. The reader will appreciate that a set-top box is merely a specific kind of video asset viewing device. A smart phone, a tablet device, a gaming console are all examples of video asset viewing device. Thus any discussion herein that refers to a set-top box should be read to also include any kind of a video asset viewing device.

Another example of this is House Demographic Measurement Engine 200 which is often referred to simply as Measurement Engine 200 or simply Engine 200. Another example of this is Viewing Activity which is the same as Tuning Activity.

In one embodiment the House Demographic Measurement Engine 200 can be implemented on processors provided by the INTEL® Corporation under the trademark Core™ i3-2120 using single or multiple processor configurations. The operating system offered by MICROSOFT(R) Corporation under the trademark WINDOWS 7 Professional can be used as the computer operating system. The Measurement Engine 200 can be implemented in a number of programming languages, including but not limited to, COBOL, C and C++.

I have implemented the Measurement Engine 200 and supporting code in FUJITSU® NetCOBOL® for WINDOWS® version 10.1 developed by Fujitsu® and distributed by Alchemy Solutions Inc. This product is available at http://www.alchemysolutions.com or http://www.netcobol.com. The Measurement Engine 200 and all of the supporting processes have been developed and run on a DELL® Vostro 260 with INTEL® Core™ i3-2120 CPU 3.30 GHz with 4.00 GB of RAM running MICROSOFT® WINDOWS 7 Professional Service Pack 1. The computer was purchased from Dell Computer Corporation. The operating system is from Microsoft.

Although the embodiments described herein enable one of ordinary skill in the art to implement (i.e. build) the Measurement Engine 200 and supporting software, it in no way restricts the method of implementation, the Measurement Engine 200 and supporting software being capable of being implemented on a variety of hardware/software platforms using a variety of development languages, databases, communication protocols and frameworks as will be evident to those of ordinary skill in the art.

Note on Media Measurement Data Model

Cable Television Laboratories, Inc. has published a confidential "Audience Data Measurement Specification" as "OpenCable™ Specifications, Audience Measurement, Audience Measurement Data Specification" having Document Control Number "OC-SP-AMD-D01-120711" copyright© Cable Television Laboratories, Inc. 2012 which contains a Media Measurement Data Model database design which can be used as a source of data to the Measurement Engine 200 which I teach how to build in this Application.

The teaching in my present application can be implemented in conjunction with that Media Measurement Data Model or with any number of data models as long as the required input data is provided as described herein.

Additionally, my House Demographic Measurement Engine 200 creates files which may be used to load additional tables in a Media Measurement Data Model such as the one published by Cable Television Laboratories, Inc. These files are described in FIGS. 24 to 33.

Note: Numbering in the Drawings—The numbers in the drawings are usually, but not always, in sequential order.

Note on Demographic Types and Codes in the Video Viewing Event File

This specification assumes that when the Raw Video Viewing Event File is created, the analyst has assigned a Demographic Code to each record. Additionally, there is a Demographic Type which identifies or provides context to the Demographic Code. This is provided to the Engine 200 using Input Parameter file FIG. 50 field Demographic Type 8035. As a nonlimiting example, a Demographic Type might be "INCOME" and then the various Demographic Codes may be values that identify the income level associated with the viewer or the household. The analyst may use up to 60 Demographic Codes in the present embodiment. If the Analyst wanted to create one set of viewing statistics that crossed the entire population, then he could simply assign the same Demographic Code to every video viewing event. A nonlimiting example would be to assign the Demographic Type as "ALL" and the Demographic Code as "ALLRECS"; this would produce one aggregation that crossed the entire population.

FIG. 1 provides an overview of an exemplary process for collecting viewer interaction data derived from a plurality of viewers interacting with video content that was delivered on a plurality of video asset viewing devices delivering content through a network and then loading that data to a Media Measurement Data Base. This figure illustrates several viewers interacting with video asset viewing devices to view content which was delivered to those devices across a network and then to collect viewing activity from those devices.

In this nonlimiting example, the purpose is not to describe in detail the operations of a video content delivery network or a data collection process, but simply to show how the data that is collected from that system can be made available to my PreProcessing Engine 140 for enrichment for use by my House Demographic Measurement Engine 200.

It begins with Viewer Viewing Video Content 9200 who is interacting with a set-top box 9210 and television 9220 as he views video content. The set-top box 9210 interacts with a Video Content Delivery System 9250 which delivers the content across a Network 9230.

It continues with Viewer viewing video content using tablet, smart phone, IP TV, or other video, video viewing device 9204 who is interacting with a variety of video viewing devices, including but not limited to tablet, smart phone, IP TV, PC, etc. The video viewing device interacts with a Video Content Delivery System 9250 which delivers the content across a Network 9230.

Video Content Delivery System 9250 then interacts with a Viewer Interaction Data, Data Collection System 9260 which collects all manner of viewer interaction data. The Viewer Interaction Data, Data Collection System 9260 then processes the data as needed to load it to a Media Measurement Data Base 100. The data in the Media Measurement Data Base 100 can then be used as input to my PreProcessing Engine 140 which prepares the data for my House Demographic Measurement Engine 200 as described in FIG. 2.

The reader should take note that the measurement process which I describe in this specification does not require Media Measurement Data Base 100. That is simply one possible way of providing Video Viewing Activity to my measurement process. In one embodiment my process uses Video Viewing Events are provided in a format similar to that described in FIG. 7 Raw Video Viewing Event House File Structure.

Figure 2:
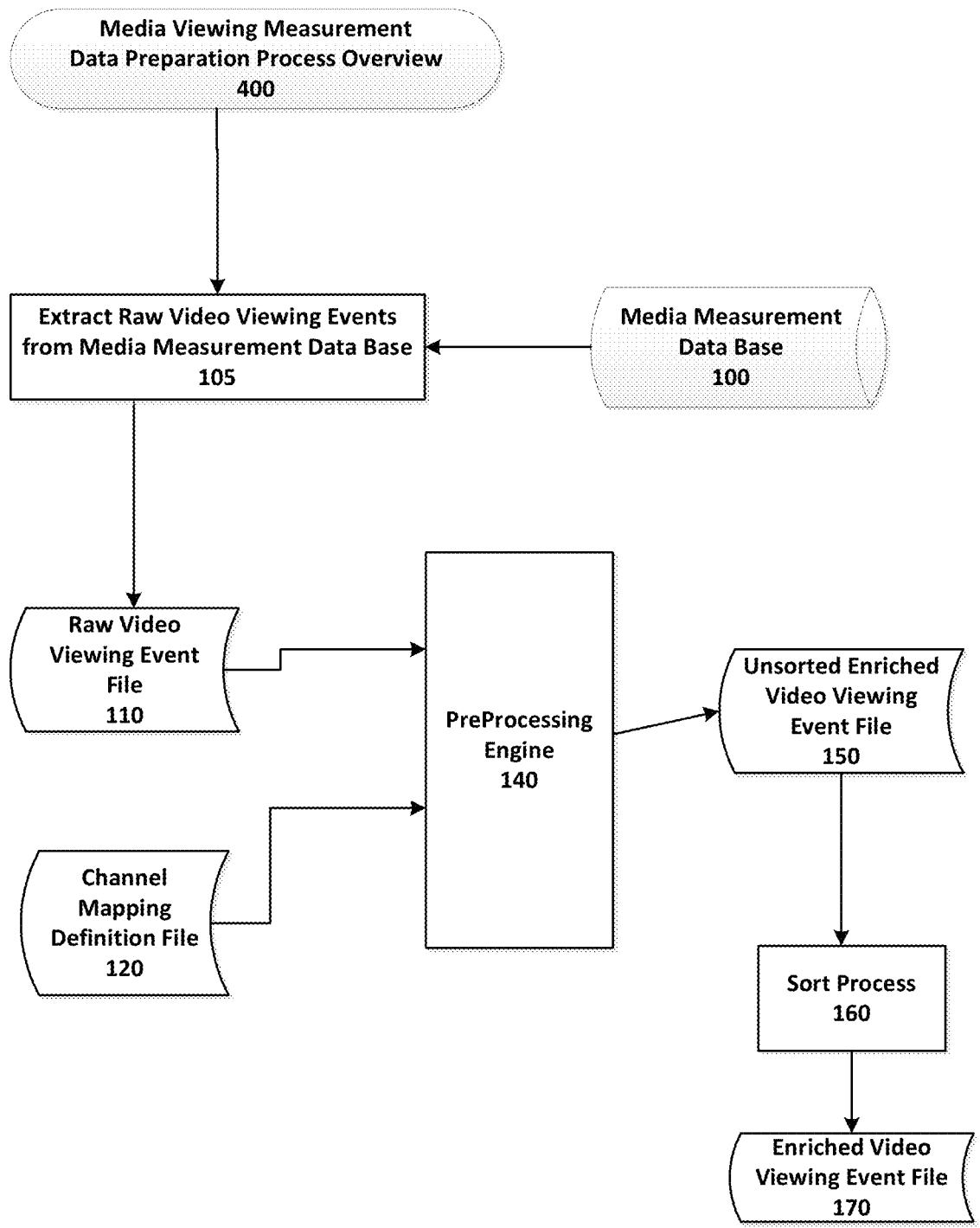
FIG. 2 illustrates an exemplary Data Preparation process which is used to prepare the Raw Video Viewing Event data for use by the House Demographic Measurement Engine 200.

FIG. 2 illustrates an exemplary Data Preparation process which is used to prepare the Raw Video Viewing Event data for use by the House Demographic Measurement Engine 200.

The populating of the Media Measurement DataBase 100 is beyond the scope of this application and so only brief remarks will be made in reference to that. There are video viewing data collection systems that are commonly used in the industry for collecting channel tuning or video viewing event data including switched digital video systems, set top box applications, internet protocol video viewing applications, and other video viewing applications. These systems enable the collection of the video viewing events which can be loaded to a Media Measurement DataBase 100. From such a database, Raw Video Viewing Events can be extracted in a format similar to that shown in FIG. 7 in order to provide the needed inputs to the Measurement Engine 200. This data can be delivered to the Measurement Engine 200 in any computer readable format including, but not limited to, database tables, flat files, and XML messages. Alternatively, such video viewing events can be collected directly from the source without the need for a Media Measurement DataBase 100. In such a case, those events can still be provided as Raw Video Viewing Events in a format similar to that shown in FIG. 7 for use by the Measurement Engine 200.

The purpose of the Data Preparation process is to enrich the Raw Video Viewing Event data so that it is ready to be used by the Measurement Engine 200. As part of this process, the PreProcessing Engine 140 will perform a channel mapping process in which the channel call sign in the source file is mapped to an aggregation channel in the enriched file. This enables to aggregation of channels with the same or similar content, such as the standard definition and the high definition version of a channel. The reason for this is that from an advertiser perspective, it often does not matter whether the viewer viewed the ad in standard definition or high definition, but simply that they viewed the ad. Additionally, from the perspective of aggregating content, the analyst may wish to map any number of lightly viewed channels to a single 'common' channel because the detail viewing of those channels is not important, but one may not want to discard the viewing entirely. The analyst has complete control of this mapping process—they define the mapping and provide it to the PreProcessing Engine 140 using File Channel Mapping Definition File 120 (FIG. 5).

Proceeding with the review of FIG. 2, the Data Preparation process begins with Media Viewing Measurement Data Preparation Process Overview 400. The first step is to extract the raw video viewing events as per Extract Raw Video Viewing Events from Media Measurement Data Base 105. Those skilled in the art will have no difficultly creating a database query or similar process to extract data from a Media Measurement DataBase 100 or other source and make it available in a format similar to that defined in Raw Video Viewing Event File 110. The file structure is defined in FIG. 7 Raw Video Viewing Event House File Structure which describes an exemplary format for the input video viewing event data as it exists before enrichment.

Proceeding with the review of FIG. 2, the PreProcessing Engine 140 also requires a channel mapping definition file Channel Mapping Definition File 120 as described in FIG. 5 Channel Mapping Definition File Structure.

Figure 4:
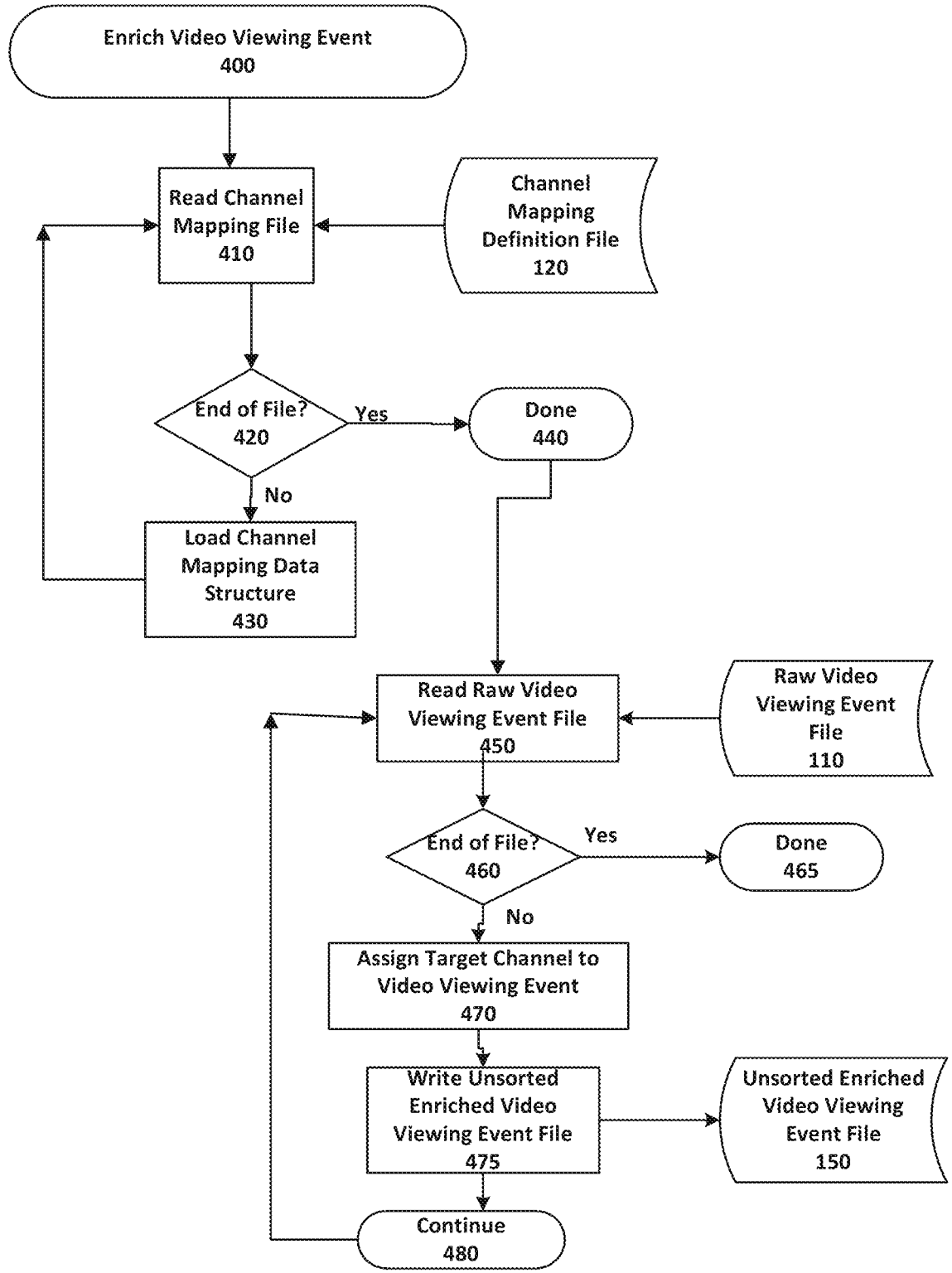
FIG. 4 illustrates an exemplary flowchart for Enriching Video Viewing Event data in preparation for use by a House Demographic Measurement Engine 200, according to one embodiment.

Proceeding with the review of FIG. 2, the PreProcessing Engine 140 reads both of these input files and then performs the enrichment process as described more fully in FIG. 4. It then writes the Unsorted Enriched Video Viewing Event File 150 which has a format as shown in FIG. 8 Enriched Video Viewing Event House File Structure. This file is then sorted by Sort Process 160 which sorts the file in order by MARKET-IN 2805, DEMOGRAPHIC-CODE-IN 2810, CHANNEL-CALL-SIGN-TARGET-IN 2815, CHANNEL-AGGREGATION-NBR-IN 2820, HOUSE-ID-IN 2825 producing sorted file Enriched Video Viewing Event File 170 which is ready for processing by the House Demographic Measurement Engine 200.

An alternative embodiment is that when the Raw Video Viewing Event File 110 is created, the field HOUSE-ID-IN 2610 is populated with a Viewer Identifier. This value can then be recorded in the Unsorted Enriched Video Viewing Event File 150 when it is created so that after the Sort Process 160 runs, the file Enriched Video Viewing Event House File Structure 170 actually contains a viewer identifier in the field HOUSE-ID-IN 2825. Loading the data in this manner enables the Measurement Engine 200 to aggregate a viewing information to a viewer level instead of a house level. This can be useful when one viewer controls multiple viewing devices.

Claims Reference: In the claims this is referred to as the house identifier in the Enriched Video Viewing Event House data containing a viewer identifier.

An alternative embodiment is that database extract process may be written such that the file created by the extract process is in a format similar to Enriched Video Viewing Event File 170 which can then be consumed directly by the Measurement Engine 200.

Figure 3:
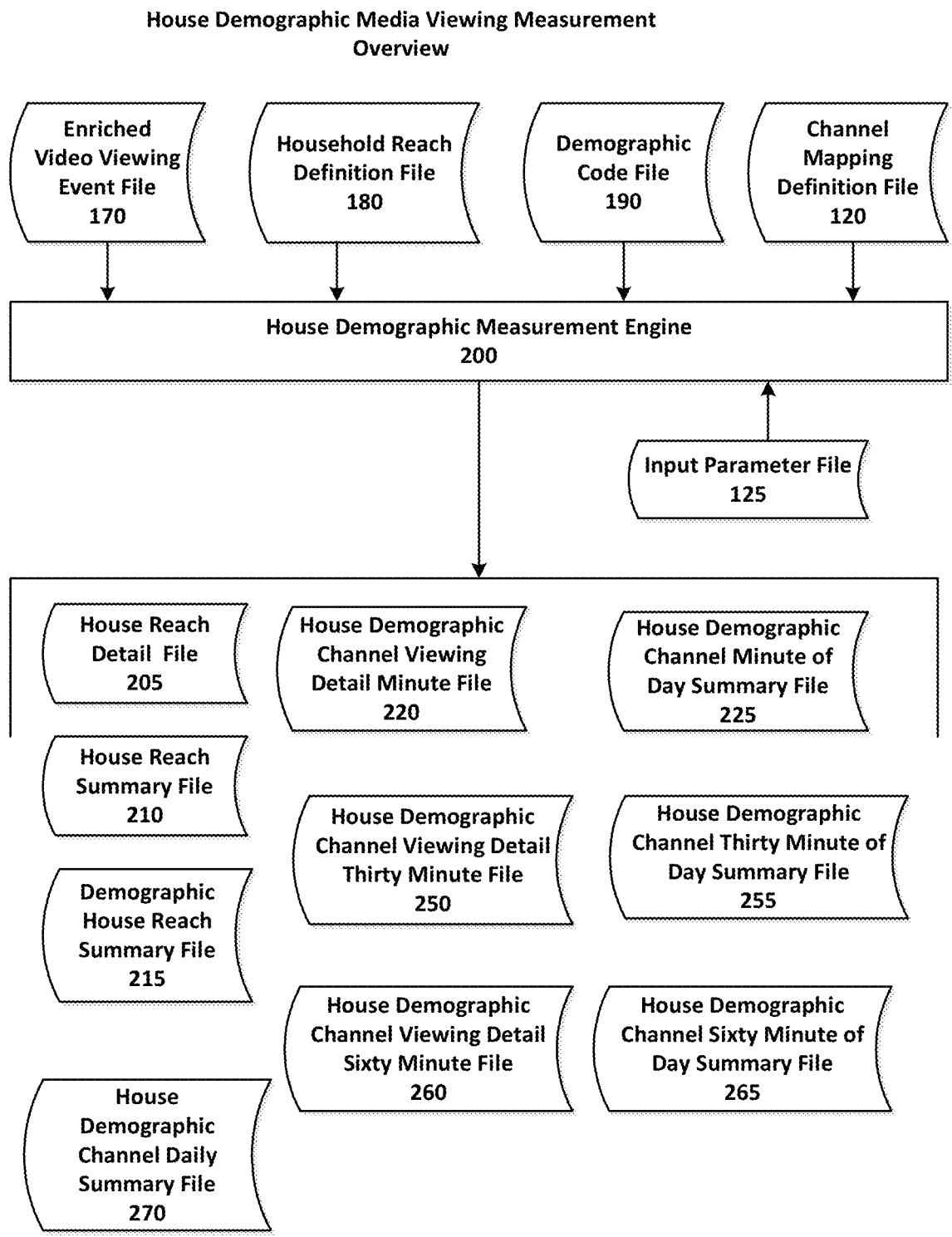
FIG. 3 is a flowchart illustrating an overview of an exemplary process for receiving (a) Enriched Video Viewing Event data, (b) Household Reach Definition data, (c) Demographic Definition, and (d) Channel Mapping data by a House Demographic Measurement Engine 200 and then using a computer to analyze these data sources to produce video viewing metrics, according to one embodiment.

FIG. 3 is a flowchart illustrating an overview of an exemplary process for House Demographic Media Viewing Measurement. The House Demographic Measurement Engine 200 receives five input files: (a) Enriched Video Viewing Event File 170, (b) Household Reach Definition File 180, (c) Demographic Code File 190, (d) Channel Mapping Definition File 120, and (e) an Input Parameter file 125 and then uses a computer to analyze the viewing events in Enriched Video Viewing Event File 170 to produce video viewing metrics, according to one embodiment.

The process works as follows: The Engine 200 first reads the Demographic Code File 190 and loads the data to the arrays in memory as described in FIG. 9 and FIG. 10. Also reference program code B200-LOAD-DEMOGRAPHIC-GROUPS.

Figure 11:
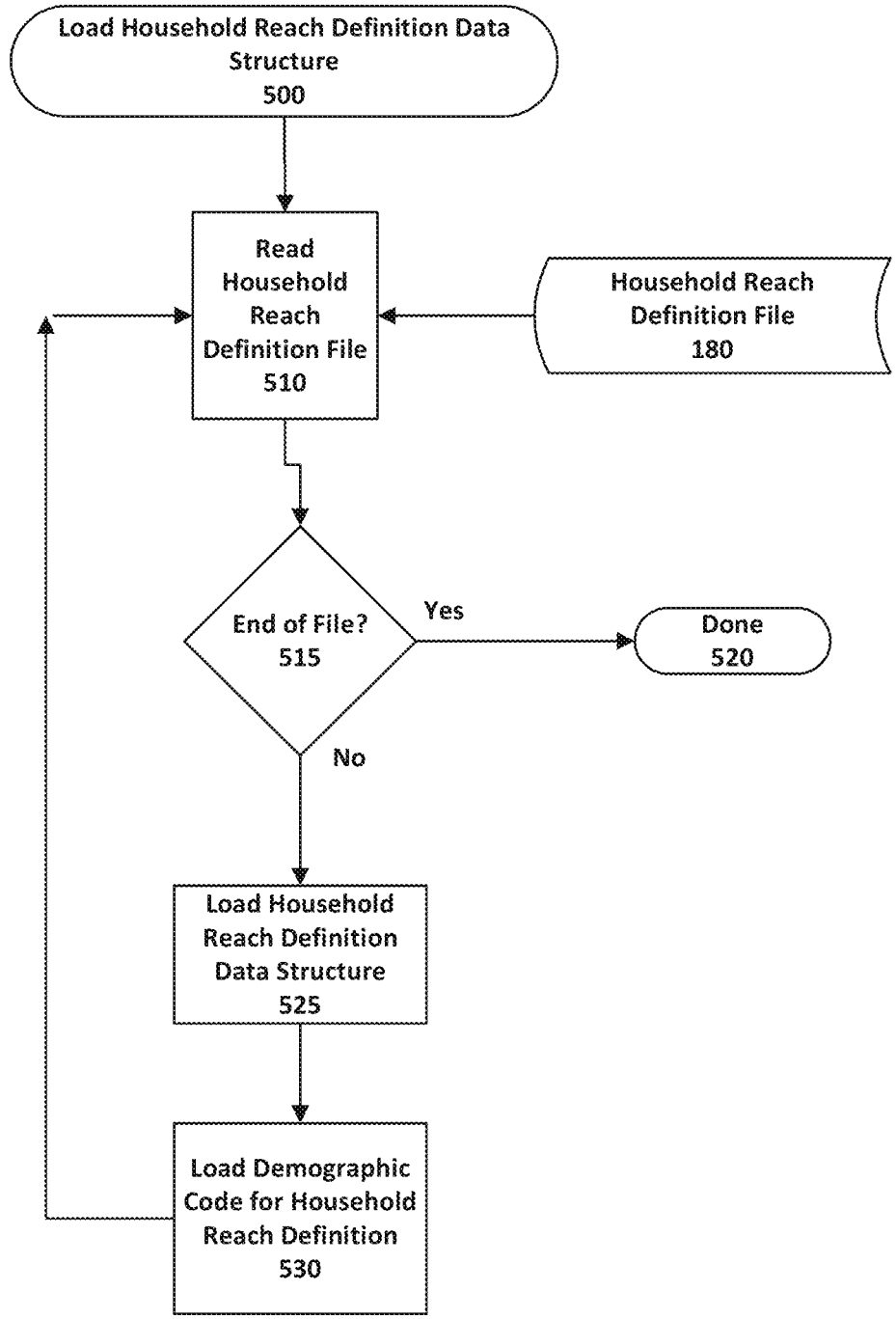
FIG. 11 illustrates an exemplary flowchart for loading Household Reach Definition Data to a Data Structure in preparation for use by the House Demographic Measurement Engine 200, according to one embodiment.

The Engine 200 then reads Household Reach Definition File 180 and loads the Reach Definitions to the array in memory as described in FIG. 11, FIG. 12, and FIG. 13. When the Engine 200 is processing the viewing activity, it will compare the house level viewing activity to the Reach definitions and calculate the viewing during each reach period. The system allows numerous Reach periods for each channel to enable tracking of Reach for many advertisements.

Also reference program code B400-LOAD-HOUSE-REACH-DEF.

The Engine 200 then reads Channel Mapping Definition File 120 and loads this to an array in memory as described in FIG. 4 and FIG. 5 and FIG. 6. Note that the actual channel mapping process was completed earlier as described in FIG. 2. In this current step, the Engine 200 is using that same input file (FIG. 5) and loading it to an array in memory (FIG. 6) so that the Channel mapping data is ready to be copied to the list of channels for a Demographic Group. Also reference program code B500-LOAD-CHANNEL-MAPPING-DEF. The Engine 200 also reads the Input Parameter file 125 and saves this information for later processing.

Once these four setup activities are completed, Engine 200 is then ready to process the Enriched Video Viewing Event File 170. The details of this are described in other figures. As output of the processing, the Engine 200 creates these files:

1) House Reach Detail File 205; reference FIG. 24 for details.
2) House Reach Summary File 210; reference FIG. 25 for details.
3) Demographic House Reach Summary File 215; reference FIG. 26 for details.
4) House Demographic Channel Viewing Detail Minute File 220; reference FIG. 27 for details.
5) House Demographic Channel Minute of Day Summary File 225; reference FIG. 28 for details.
6) House Demographic Channel Viewing Detail Thirty Minute File 250; reference FIG. 29 for details.
7) House Demographic Channel Thirty Minute of Day Summary File 255; reference FIG. 30 for details.
8) House Demographic Channel Viewing Detail Sixty Minute File 260; reference FIG. 31 for details.
9) House Demographic Channel Sixty Minute of Day Summary File 265; reference FIG. 32 for details.
10) House Demographic Channel Daily Summary File 270; reference FIG. 33 for details.

Note that the source code included with this application also includes Five Minute and Fifteen Minute aggregation files which are similar to the Thirty minute files.

The Measurement Engine 200 as presently configured accepts flat files as input and creates flat files as its output. Those skilled in the art will readily recognize that the Measurement Engine 200 could just as easily read database tables or XML messages or any other computer readable format for its input. It could then produce XML messages or update database tables for its output or produce flat files as it does in the present embodiment.

As noted, a House Reach Detail file 205 (reference FIG. 24) is created as output from the Measurement Engine 200. The Reach Detail file 205 records the Household Reach data that resulted from the video viewing activity. This Reach data is captured in the Household Reach Definition Array Data Structure FIG. 13. By creating the reach file as described in FIG. 24 and then loading this file to a database, an analyst is able to query the advertising or program Reach data to identify all of the homes where an ad or program was viewed; that is the cumulative reach of an ad. When the same ad appears in multiple Reach Period Definitions, this information is used to provide advertisers with a count of the number of different (unique) homes that viewed a particular ad. Such a situation in which the same ad appears in multiple Reach Period Definitions is very common because an advertiser may run the same ad multiple times in one program or across several programs over a period of one or more days. This unique home viewing data can be used for additional analysis. An alternative embodiment could write this Household reach data directly to a database table.

Also as noted, a House Reach Summary file 210 (reference FIG. 25) is created as output from the Measurement Engine 200. The House Reach Detail file 205 records summary reach information identifying the Reach period information along with a count of the number of homes reached. This information provides advertisers with a count of the total number of homes that viewed a particular ad during a give Reach Period. This data can be used for additional analysis.

Also as noted, a Demographic House Reach Summary file 215 (reference FIG. 26) is created as output from the Measurement Engine 200. The Demographic House Reach Summary file 215 records summary reach information identifying the Reach period information along with a count of the number of homes reached broken out by Demographic code. This information provides advertisers with a count of the total number of homes in each demographic group that viewed a particular ad during a give Reach Period. This data can be used for additional analysis.

Also as noted, a House Demographic Channel Viewing Detail Minute file 220 (reference FIG. 27) is created as output from the Measurement Engine 200. The House Demographic Channel Viewing Detail Minute file 220 records aggregate viewing seconds based on unique house level viewing for each channel for each minute of the day, broken out by demographic type and demographic code within market. This information provides the detailed data needed to analyze minute-by-minute viewing patterns for every channel for every minute of the day. This data can be used for additional analysis.

Also as noted, a House Demographic Channel Minute of Day Summary file 225 (reference FIG. 28) is created as output from the Measurement Engine 200. The House Demographic Channel Minute of Day Summary file 225 records aggregate viewing seconds based on unique house level viewing for each minute of the day, summarized across all the channels, broken out by demographic type and demographic code within market. This information provides the detailed data needed to analyze minute-by-minute viewing patterns for all channels combined for every minute of the day. This data can be used as the denominator to calculate the percentage of total viewing that a channel earned during any minute of the day.

Also as noted, a House Demographic Channel Viewing Detail Thirty Minute file 250 (reference FIG. 29) is created as output from the Measurement Engine 200. The House Demographic Channel Viewing Detail Thirty Minute file 250 records aggregate viewing seconds based on unique house level viewing for each channel for each thirty minute segment of the day, broken out by demographic type and demographic code within market. This information provides the data needed to analyze viewing patterns for every channel for every half-hour of the day. This data can be used for additional analysis.

Also as noted, a House Demographic Channel Thirty Minute of Day Summary file 255 (reference FIG. 30) is created as output from the Measurement Engine 200. The House Demographic Channel Thirty Minute of Day Summary file 255 records aggregate viewing seconds based on unique house level viewing for each thirty minute segment of the day, summarized across all the channels, broken out by demographic type and demographic code within market. This information provides the detailed data needed to analyze viewing patterns for all channels combined for every half-hour of the day. This data can be used as the denominator to calculate the percentage of total viewing that a channel earned during any half-hour of the day.

Also as noted, a House Demographic Channel Viewing Detail Sixty Minute file 260 (reference FIG. 31) is created as output from the Measurement Engine 200. The House Demographic Channel Viewing Detail Sixty Minute file 260 records aggregate viewing seconds based on unique house level viewing for each channel for each sixty minute segment of the day, broken out by demographic type and demographic code within market. This information provides the data needed to analyze viewing patterns for every channel for every hour of the day. This data can be used for additional analysis.

Also as noted, a House Demographic Channel Sixty Minute of Day Summary file 265 (reference FIG. 32) is created as output from the Measurement Engine 200. The House Demographic Channel Sixty Minute of Day Summary file 265 records aggregate viewing seconds based on unique house level viewing for each sixty minute segment of the day, summarized across all the channels, broken out by demographic type and demographic code within market. This information provides the detailed data needed to analyze viewing patterns for all channels combined for every hour of the day. This data can be used as the denominator to calculate the percentage of total viewing that a channel earned during any hour of the day.

Finally as noted, a House Demographic Channel Daily Summary file 270 (reference FIG. 33) is created as output from the Measurement Engine 200. The House Demographic Channel Daily Summary file 270 records aggregate viewing seconds based on unique house level viewing for each channel for the entire day, broken out by demographic type and demographic code within market. This information provides the detailed data needed to analyze viewing patterns for each channel to determine what portion of total channel viewing occurs during any part of the day. This data can be used as the denominator to calculate the percentage of total channel viewing that occurs for a given channel during a particular part of the day. As an example, if a channel earned 50,000 viewing seconds during the 7:00 AM hour and 800,000 viewing seconds during the entire day, then this value is used to determine that 6.25% (50,000/800,000) of that channel's total viewing occurred during the 7:00 AM hour.

Each of the output files identified above, 205-270, may be loaded to a data base in support of further analytics. Those with ordinary skill in the art will have no difficulty using common software development tools to develop a process which loads files like the ones shown to a data base or data warehouse in support of additional reporting and analytics. Alternatively, the Measurement Engine 200 could update data base tables having structures similar to those shown in output files 205-270. In this specification I will describe how several common industry metrics can be calculated using this data.

To recap the output files that are created related to Video Program viewing, the Measurement Engine 200 has created Reach files and Program viewing files. Each of these files provides breakouts for Demographic and Geographic attributes thus providing detailed insight into the viewers who are consuming the video content and their location.

The end result is that the analyst has very detailed information regarding viewing activity for each Reach period and for the entire day. The analyst now has a level of understanding of audience viewership never before possible.

Also note that while I teach how to create minute, thirty-minute, and sixty-minute aggregations in this specification, the accompanying source code includes five-minute and fifteen-minute aggregations as well. Those skilled in the art will be easily able to create other aggregations as needed, for example, four-hour aggregations or 30-second aggregations.

FIG. 4 is a flowchart which illustrates an exemplary process for enriching the video viewing event data. FIG. 4 further defines the processing that occurs in PreProcessing Engine 140. By way of overview, this process first loads the Channel Mapping Definition File into an array in memory. Once this is complete, the process then reads each of the raw video viewing events and looks up the channel call sign from the raw video viewing event in the Channel Mapping Data Structure. When a match is found the process assigns the Target Channel to the Video Viewing Event and then, after additional enrichments, writes the enriched record to the file.

This mapping process serves two functions: (a) diverse channel calls signs which carry the same video content can be reassigned to a single channel call sign; a nonlimiting example of this is the standard definition and the high definition versions of the same channel; and (b) multiple lightly viewed channels can be combined into a single aggregate channel as might be done with channels carrying similar content; a nonlimiting example of this is music channels.

The process, as part of PreProcessing Engine 140, begins with Enrich Video Viewing Event 400. The first step is to execute Read Channel Mapping File 410 which reads Channel Mapping Definition File 120 which contains the analyst defined channel mappings. The file structure is defined in FIG. 5. When End of File? 420 is No, the process proceeds to Load Channel Mapping Data Structure 430 where the data from the input record is loaded to the Channel Mapping Definition Array Data Structure defined in FIG. 6.

When End of File? 420 is Yes, PreProcessing Engine 140 is done reading the channel mapping definitions and all the data has been loaded to the array (FIG. 6). The PreProcessing Engine 140 now proceeds to processing of the Raw Video Viewing Event File beginning with Read Raw Video Viewing Event File 450 which reads Raw Video Viewing Event File 110. When End of File? 460 is No, the Engine 140 proceeds to Assign Target Channel to Video Viewing Event 470 where the PreProcessing Engine 140 looks up the channel call sign from the raw video viewing event FIG. 7 CHANNEL-CALL-SIGN 2650 to find a match in the Channel Mapping Data Structure matching on CHAN-MAP-CALL-SIGN-SOURCE 2120. When a match is found, the system populates the FIG. 8 CHANNEL-CALL-SIGN-TARGET-IN 2815 with the value from the CHAN-MAP-CALL-SIGN-TARGET 2130. The PreProcessing Engine 140 also populates the FIG. 8 CHANNEL-AGGREGATION-NBR-IN 2820 with the value in CHAN-MAP-AGGREGATION-NBR 2140.

Note: A process very similar to the one defined in FIG. 4 steps 410 to 440 is also used in the Measurement Engine 200 when it is loading the Channel Mapping Data Structure in preparation for measurement activity. Ref Engine 200 program routine B500-LOAD-CHANNEL-MAPPING-DEF.

The remaining fields in Enriched Video Viewing Event House File Structure FIG. 8 are also populated at this time as defined in FIG. 8. The TUNE-IN-SECOND-OF-DAY 2860 and the TUNE-OUT-SECOND-OF-DAY 2875 are both calculated based on the corresponding seconds past midnight. In an alternative embodiment, the tune-in and tune-out second of the day may be provided in the Raw Video Viewing Event File 110.

After populating the fields in FIG. 8, the PreProcessing Engine 140 writes the enriched record as per Write Unsorted Enriched Video Viewing Event File 475 to file Unsorted Enriched Video Viewing Event File 150. This file has the same structure as Enriched Video Viewing Event House File Structure FIG. 8. The process then continues per Continue 480 to read the next record.

When End of File? 460 is Yes, the process is done, Done 465.

At this point, the Unsorted Enriched Video Viewing Event File 150 is sorted by Sort Process 160 creating Enriched Video Viewing Event File 170 as described in FIG. 2; the sorted file is then ready for processing by the House Demographic Analytics Engine 200.

The source code for the PreProcessing Engine 140 is included as part of this Specification.

Additionally, the source code for the Sort Process 160 is included as part of this Specification.

Claims Reference: In the claims the process of assigning the target channel call sign to the video viewing event is referred to as the channel call sign being populated by a mapping function which takes a source channel call sign and uses that to lookup a target channel call sign which is then loaded to the channel call sign in the data.

FIG. 5 relates to Channel Mapping definitions.

FIG. 5 illustrates an exemplary record layout for a Channel Mapping Definition File Structure 120 formatted for use as input to the PreProcessing Engine 140 and the House Demographic Measurement Engine 200 with Summary Information followed by the Data Structure description and Sample Data in pipe delimited format, according to one embodiment. This relates to part 120.

The sample data shows various nonlimiting examples: (a) that the analyst is able to define a straight-across mapping (ABC) where the source channel call sign is the same as the target channel call sign, (b) the analyst is able to map two channels to a single channel (both DISNEY and DISNEYHD map to DISNEY). The case where multiple lightly viewed channels map to one group channel is shown by FOOD, SHOP, TRAVEL all mapping to MISC.

FIG. 6 illustrates an exemplary data structure for recording a Channel Mapping Definition in the memory of a computer for use in PreProcessing Engine 140 and for use by the House Demographic Measurement Engine 200, according to one embodiment. This data structure is used in both the PreProcessing Engine 140 and the Measurement Engine 200.

FIG. 7 illustrates an exemplary record layout for a Raw Video Viewing Event House File Structure 110 formatted for use as input to the PreProcessing Engine 140 with Summary Information followed by the Data Structure description, according to one embodiment. This record layout shows the data format prior to enrichment.

FIG. 8 illustrates an exemplary record layout for a Enriched Video Viewing Event House File Structure 170 formatted for use as input to the House Demographic Measurement Engine 200 with Summary Information followed by the Data Structure description, according to one embodiment. This record layout shows the data format after enrichment. Note that the Target Channel Call Sign has been added to the record—Reference CHANNEL-CALL-SIGN-TARGET-IN 2815. Also note that the Channel Aggregation Number has been added for use by the Measurement Engine 200—Reference CHANNEL-AGGREGATION-NBR-IN 2820. Also note that the Tune-in and Tune-out second of day fields have been added for use by the Measurement Engine 200—Reference TUNE-IN-SECOND-OF-DAY 2860 and TUNE-OUT-SECOND-OF-DAY 2875.

Figure 9:
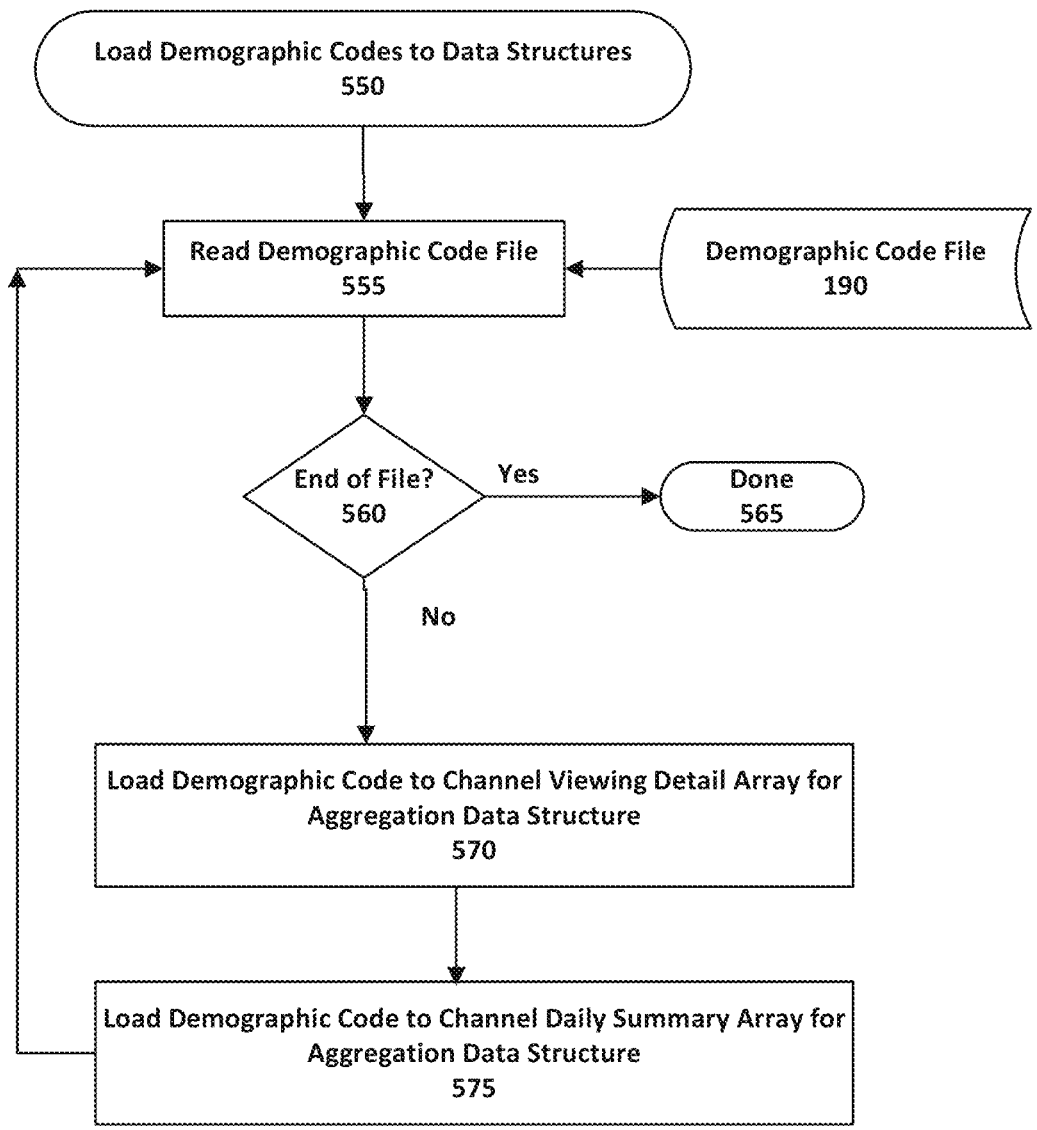
FIG. 9 illustrates an exemplary flowchart for loading Demographic Codes to a Data Structure in preparation for use by the House Demographic Measurement Engine 200, according to one embodiment.

FIG. 9 illustrates an exemplary flowchart for loading Demographic Codes to a Data Structure in preparation for use by the House Demographic Measurement Engine 200, so that it can track viewing activity by Demographic Code, according to one embodiment.

The process begins with Load Demographic Codes to Data Structures 550. The process then executes Read Demographic Code File 555 which reads file Demographic Code File 190 as input. The process checks for End of File 560. If it is the end of file, the process is Done 565. If End of File 560 does not detect an end of file condition, then the record that was read is loaded to the Channel Viewing Detail array using Load Demographic Code to Channel Viewing Detail Array for Aggregation Data Structure 570. That same demographic code is then loaded to the Channel Daily Summary array using Load Demographic Code to Channel Daily Summary Array for Aggregation Data Structure 575.

The end result of this process is that the Measurement Engine 200 has loaded the Demographic codes into two Data Structures in the memory of the computer running the engine. This enables the Measurement Engine 200 to track the viewing by Demographic code at a detail level and a summary level.

Single Demographic Group Aggregation

As noted previously, the Analyst may want to create one set of viewing statistics that cross the entire population instead of viewing statistics for every Demographic Group; to do this he simply assigns the same Demographic Code to every video viewing event in file Raw Video Viewing Event File 110. A nonlimiting example would be to assign the Demographic Type as "ALL" and the Demographic Code as "ALLRECS"; this would produce one aggregation that crossed the entire population. In this case, the Demographic Code File 190 would have one record. Such a use of the Measurement Engine 200 will enable the creation of various metrics which require values that are aggregated across the entire population.

FIG. 10 illustrates an exemplary record layout for a Demographic Code File Structure 190 formatted for use as input to the House Demographic Measurement Engine 200 with Summary Information followed by the Data Structure description, according to one embodiment.

FIG. 11 illustrates an exemplary flowchart for loading Household Reach Definitions to a Data Structure in preparation for use by the House Demographic Measurement Engine 200, so that it can track viewing activity for each of the Reach Definition periods, according to one embodiment.

The process begins with Load Household Reach Definition Data Structure 500. The process then executes Read Household Reach Definition File 510 which reads file Household Reach Definition File 180 as input. The process checks for End of File 515. If it is the end of file, the process is Done 520. If End of File 515 does not detect an end of file condition, then the record that was read is loaded to the Household Reach Definition Data Structure (Ref FIG. 13) using Load Household Reach Definition Data Structure 525. The process then proceeds to copy the Demographic code list that was loaded in FIG. 9 to each of the Reach Definitions so that the Measurement Engine 200 is able to track Reach viewing for each demographic code; this copy/load process is done by Load Demographic Code for Household Reach Definition 530.

The end result of this process is that the Measurement Engine 200 has loaded the Reach Definition data to a Data Structure in the memory of the computer running the Engine so that it can then measure the household viewing activity for each house against each of the Reach periods defined in the Reach definition data structure.

FIG. 12 illustrates an exemplary record layout for a Household Reach Definition File Structure 180 formatted for use as input to the House Demographic Measurement Engine 200 with Summary Information followed by the Data Structure description and Sample Data, according to one embodiment. Note that the analyst is able to define any number of Reach definition periods for each Channel Call Sign. Also note that the Analyst may control the duration of the Reach period by specifying the beginning and ending seconds. The Analyst may also control the viewing seconds required to be counted as an exposure. The Channel Call Sign used in the Reach definition should match one of the Target Channel Call Signs that will appear in the Enriched Video Viewing Event File 170 in order to enable a match to occur.

FIG. 13 illustrates an exemplary Household Reach Definition Array Data Structure for use by the House Demographic Measurement Engine 200 with Summary Information followed by the Data Structure description, according to one embodiment. Note that this data structure is setup to allow for Reach Definitions to be recorded for each of 30 different Channel Call Signs. Then note that the structure supports up to 180 Reach Definitions to be recorded for each of the 30 different Channel Call Signs. Also note that the structure is setup to allow 60 Demographic codes for each of the Reach periods for each channel; this provides for detail tracking by demographic code for each Reach period. In another embodiment, the number of Reach Period definitions, Channel Call Signs, and Demographic groups may be adjusted as needed.

By tracking at this level of detail, the Engine 200 provides extensive metrics regarding the ad viewing during the Reach period; such information is extremely useful to advertisers and others.

FIG. 14 illustrates an exemplary Channel Viewing Detail One-Second Array Data Structure for use by the House Demographic Measurement Engine 200 with Summary Information followed by the Data Structure description, according to one embodiment. The Engine 200 will populate this array based on the data in the Enriched Video Viewing Event House File Structure 170 as defined in FIG. 17 and following. Note that this Data Structure is used to aggregate the viewing across multiple devices associated with a House. This aggregation allows the Engine 200 to filter out duplicate viewing in the House (two or more devices tuned to the same channel at the same time) so that an accurate measure of Household Reach can then be calculated. The data is tracked at the one-second level in field CVDS-CHAN-HOUS-VIEWING-COUNT 3045 to provide a fine level of detail in measuring viewing activity.

Claims Reference: By putting this data structure (FIG. 14) into the Measurement Engine 200 it provides computer readable access to the Channel Viewing Detail One-Second Array Data Structure containing viewing activity information which was loaded to the Channel Viewing Detail One-Second Array Data Structure in preparation for analyzing a plurality of viewer interactions resulting from viewers using video asset viewing devices to interact with video content delivered through a network.

Alternative Embodiment: This same Channel Viewing Detail One-Second Array Data Structure could be implemented in a subprogram, a database table, a database structure, or other similar method and still accomplish a similar result.

FIG. 15 illustrates an exemplary Channel Viewing Detail Array for Aggregation Data Structure for use by the House Demographic Measurement Engine 200 with Summary Information followed by the Data Structure description, according to one embodiment.

In the present embodiment the Measurement Engine 200 uses this data structure to track viewing activity for up to 60 different Demographic groups (codes) in a geographic area. Within each demographic group viewing activity can be tracked for up to 600 channels. Then for each of those channels the Measurement Engine 200 can track viewing at one minute, five minute, fifteen minute, thirty minute, and sixty minute aggregation levels. Note that the source code includes five minute and fifteen minute aggregations, but they are not discussed in the Specification or Drawings in order to save space. This detailed tracking provides a rich set of additional viewing metrics in addition to the Reach period metrics. In another embodiment, the number of Demographic groups, Channels, and detail periods may be adjusted as needed.

FIG. 16 illustrates an exemplary Channel Daily Summary Array for Aggregation Data Structure for use by the House Demographic Measurement Engine 200 with Summary Information followed by the Data Structure description, according to one embodiment.

In the present embodiment the Measurement Engine 200 uses this data structure to track viewing activity for up to 60 different Demographic groups (codes) in a geographic area. Within each demographic group viewing activity can be tracked across all the channels at the one minute, five minute, fifteen minute, thirty minute, and sixty minute aggregation levels. Note that the source code includes five minute and fifteen minute aggregations, but they are not discussed in the Specification or Drawings in order to save space. So whereas the Data Structure in FIG. 15 is used to track the viewing at the channel level within Demographic Group, this Data Structure is used to track the viewing across all the channels together within Demographic Group. This detailed tracking also provides a rich set of additional viewing metrics in addition to the Reach period metrics. In another embodiment, the number of Demographic groups and detail periods may be adjusted as needed.

Figure 17:
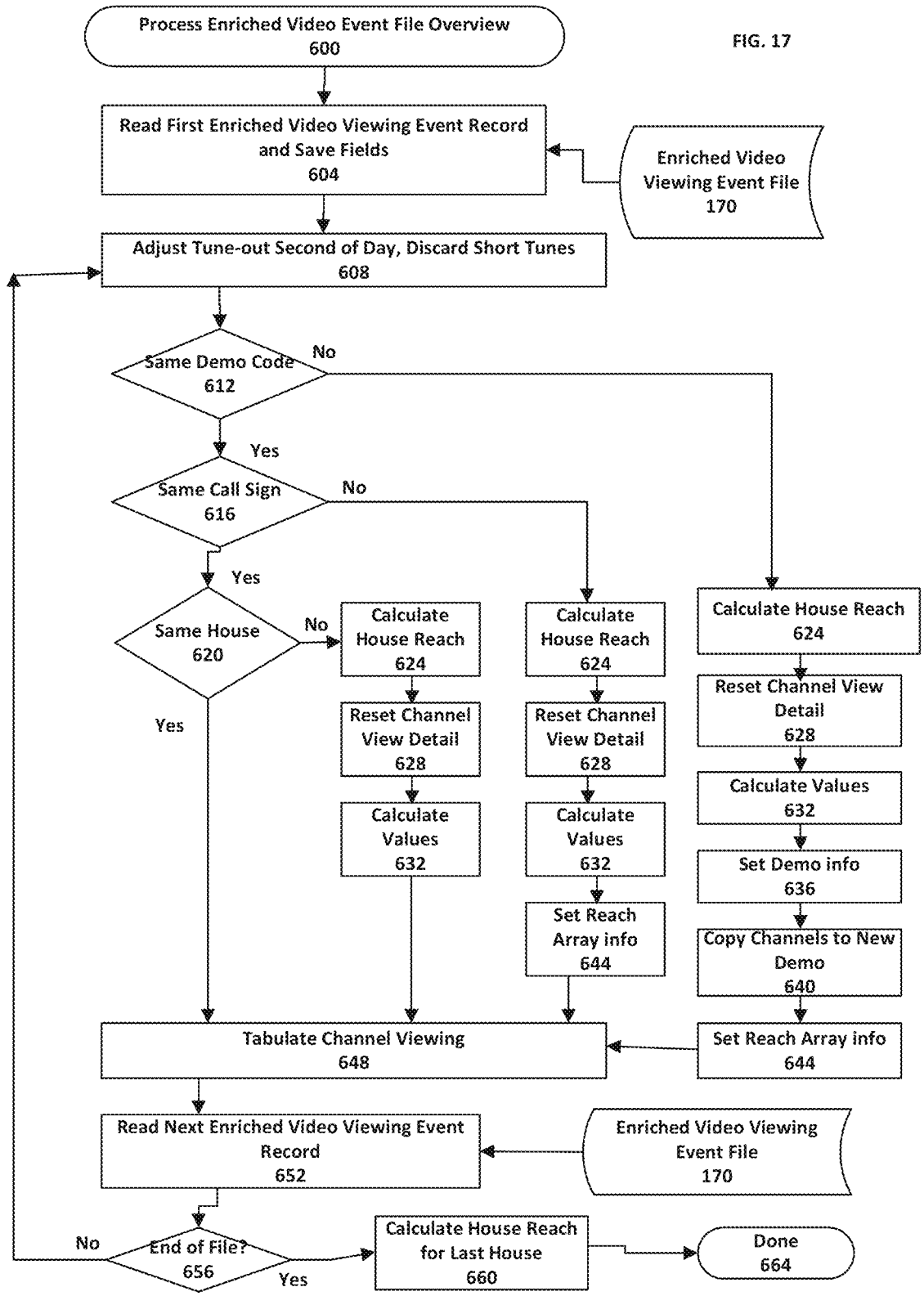
FIG. 17 illustrates an exemplary flowchart providing an overview for processing the enriched video event data by the House Demographic Measurement Engine 200, according to one embodiment.

FIG. 17 illustrates an exemplary flowchart providing an overview for processing the enriched video event data by the House Demographic Measurement Engine 200, according to one embodiment.

The process works as follows: The process begins with Process Enriched Video Event File Overview 600. The first step is to do the setup processing by reading the first record in the Enriched video viewing event file where step Read First Enriched Video Viewing Event Record and Save Fields 604 reads a record from file Enriched Video Viewing Event File 170. In this process various fields are saved for comparison later in the process. Reference source code routine D000-PREP-CHAN-TUNING-FILE. Activities that occur in this routine include saving the comparison fields, setting the Demographic subscript, copying the channels to the new demographic row in the array, and setting the Reach array subscript.

Once these initial setup tasks are complete, the Measurement Engine 200 will enter a loop where it will proceed to process each of the Enriched Video Event records. Reference source code routine D120-PROCESS-CHAN-TUNE-DETAIL.

The first step in the loop is to execute Adjust Tune-out Second of Day, Discard Short Tunes 608. Here the system will first adjust the tune-out second of the day as follows: the Measurement Engine 200 will compare the tune duration to the maximum tune duration allowed per the Max Tune Duration 8010 input parameter. For example, this may be 2 hours or 4 hours after which duration the tuning activity is considered zombie tuning. When the tune duration is longer than the allowed limit, the tune-out second is adjusted so that the tune is truncated at the duration specified by the Max Tune Duration 8010 input parameter.

Claims Reference: in the claims this is referred to as the tune-out second of day in the Enriched Video Viewing Event House data containing a value which reflects truncation of the tuning event based upon tune duration.

The next step in processing a record is to discard tunes that are too short. For example, the analyst may want to eliminate channel surfing activity, or he may want to ensure that there is a certain level of engagement by the viewer with the content. This is controlled by accepting as valid only tuning events meeting a minimum duration. This duration is specified using the Min Tune Duration 8015 input parameter. If the tune duration is less than the required duration the tune is not included in the viewing activity.

Claims Reference: in the claims this is referred to as tuning events failing to meet a minimum duration have been removed from the Enriched Video Viewing Event House data.

Reference source code routine D100-PROCESS-CHAN-TUNING-FILE for details on both of these steps.

Once these steps are complete, the Measurement Engine 200 will begin a series of checks. The first check is to validate that the Video Viewing data is from the Market (geographic area) (ref MARKET-IN 2805) that the job is processing, reference Market 8020 input parameter. If it is not, this is considered an error. This step is very basic and is not shown in FIG. 17.

The next step is to compare the Demographic code (ref DEMOGRAPHIC-CODE-IN 2810) to determine whether the demographic code in the current record has changed from the demographic code in the prior record. Reference Same Demo Code 612.

When the Demographic code is the same, the Measurement Engine 200 proceeds to check the Channel Call Sign (ref CHANNEL-CALL-SIGN-TARGET-IN 2815) as per Same Call Sign 616.

When the Channel Call Sign (ref CHANNEL-CALL-SIGN-TARGET-IN 2815) is the same, the Measurement Engine 200 proceeds to check the House identifier (ref HOUSE-ID-IN 2825) as per Same House 620.

When the Demographic code, Channel Call Sign, and House are all the same, the Measurement Engine 200 proceeds to Tabulate Channel Viewing 648 where it will add the viewing activity represented in this Video Viewing Event record into the overall viewing activity for the House. Details of this process are described in FIG. 18.

Once the viewing activity for the House is tabulated, the Measurement Engine 200 proceeds read the next record in file Enriched Video Viewing Event File 170 per Read Next Enriched Video Viewing Event Record 652. If it is not end of file as per End of File? 656, the process proceeds to the start of the loop (to part 608) to begin processing the next record.

If the process does reach the end of the video viewing events per End of File? 656, the process proceeds to Calculate House Reach for Last House 660. The process for calculating House Reach is described in FIG. 19. When the House Reach calculation is done, the process is Done 664.

Figure 19:
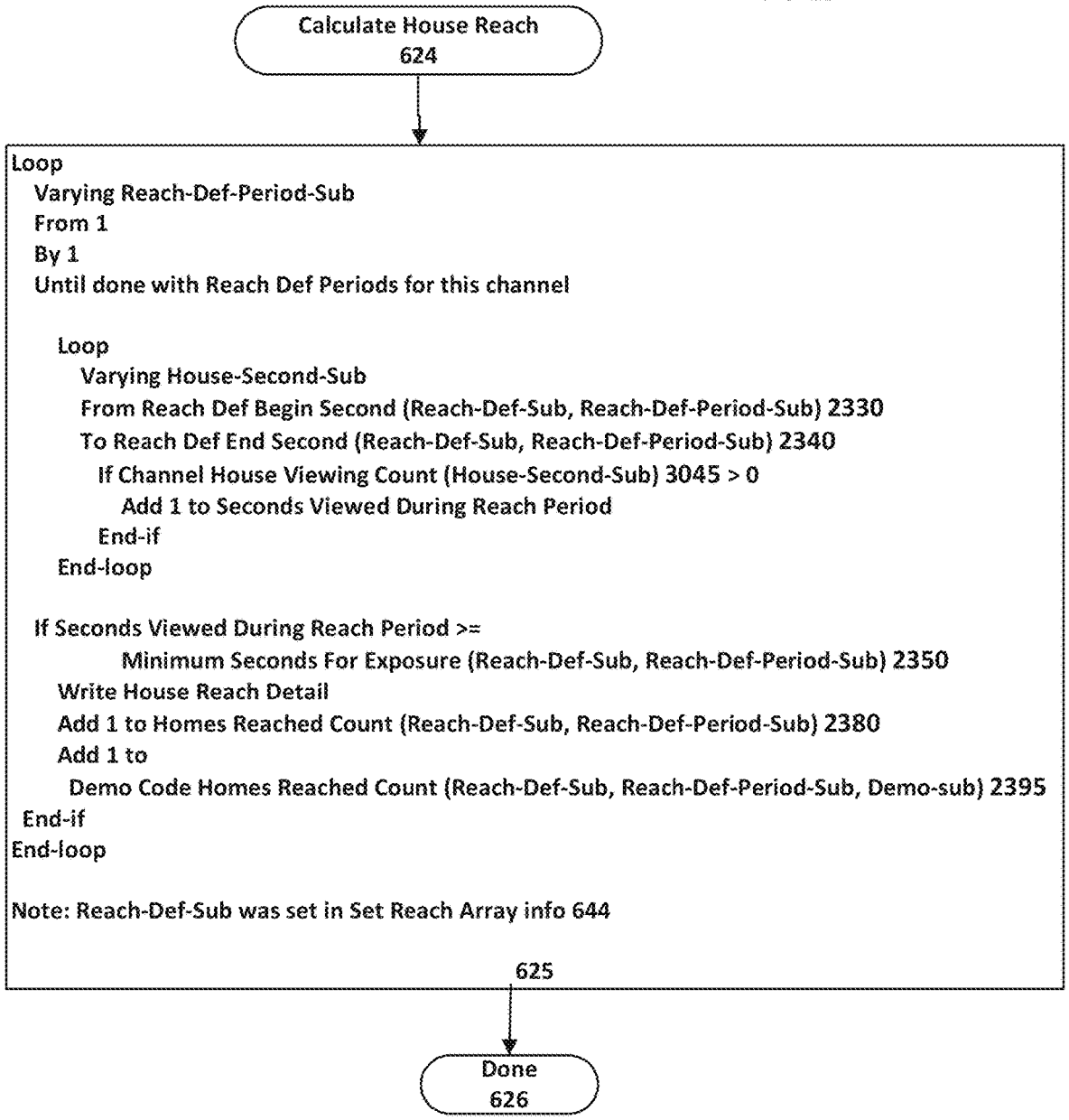
FIG. 19 illustrates an exemplary flowchart describing the process for calculating house reach by the House Demographic Measurement Engine 200, according to one embodiment.

Returning to the comparison process, step Same House 620, when the House identifier HOUSE-ID-IN 2825 is not the same as the value from the previous Video Viewing Event record (ref part 170 and FIG. 8), the system proceeds to calculate the House Reach per Calculate House Reach 624—see FIG. 19 for details. It then proceeds to Reset Channel View Detail 628—see FIG. 20 for details. It then proceeds to Calculate Values 632 where the Measurement Engine 200 is calculating various record counts. When these steps are completed, the Engine 200 proceeds to Tabulate Channel Viewing 648 where the same steps are described previously are performed.

Returning to the comparison process, step Same Call Sign 616, when the House identifier CHANNEL-CALL-SIGN-TARGET-IN 2815 is not the same as the value from the previous Video Viewing Event record (ref part 170 and FIG. 8), this indicates that the Engine 200 is about to begin processing of a new Channel Call Sign. Before that happens, the Engine 200 must wrap up the work related to the old Call Sign. The first step is to calculate the House Reach per Calculate House Reach 624—see FIG. 19 for details. It then proceeds to Reset Channel View Detail 628—see FIG. 20 for details. It then proceeds to Calculate Values 632 where the Measurement Engine 200 is calculating various record counts. It then resets the Reach array information per Set Reach Array info 644—see FIG. 21 for details. When these steps are completed, the Engine 200 proceeds to Tabulate Channel Viewing 648 where the same steps are described previously are performed.

Returning to the comparison process, step Same Demo Code 612, when the DEMOGRAPHIC-CODE-IN 2810 is not the same as the value from the previous Video Viewing Event record (ref part 170 and FIG. 8), this indicates that the Engine 200 is about to begin processing of a new Demographic group. Before that happens, the Engine 200 must wrap up the work related to the old Demographic group. The first step is to calculate the House Reach per Calculate House Reach 624—see FIG. 19 for details. It then proceeds to Reset Channel View Detail 628—see FIG. 20 for details. It then proceeds to Calculate Values 632 where the Measurement Engine 200 is calculating various record counts. It then resets the Demographic info per Set Demo info 636—see FIG. 22 for details. It then copies the list of Channels to the new row in the Channel Viewing Detail array per Copy Channels to New Demo 640—See FIG. 23 for details. It then sets the Reach array information per Set Reach Array info 644—see FIG. 21 for details. When these steps are completed, the Engine 200 proceeds to Tabulate Channel Viewing 648 where the same steps described previously are performed.

Calculate Values 632 includes the following calculations:
DEMO-CODE-CHANNEL-COUNT FIG. 15 3245 is incremented by 1 when the Channel changes using this formula:
   ADD 1 TO DEMO-CODE-CHANNEL-COUNT (DEMO-SUB, CHAN-SUB) 3245 Ref Source Code Routine: D120-PROCESS-CHAN-TUNE-DETAIL
DEMO-CODE-CHANNEL-HOUSE-COUNT FIG. 15 3250 is incremented by 1 when the House id changes using this formula:
   ADD 1 TO DEMO-CODE-CHANNEL-HOUSE-COUNT (DEMO-SUB, CHAN-SUB) 3250 Ref Source Code Routine: D120-PROCESS-CHAN-TUNE-DETAIL DEMO-CODE-CHANNEL-TUNE-COUNT FIG. 15 3255 is incremented by 1 for each video viewing event for the Channel using this formula:
   ADD 1 TO DEMO-CODE-CHANNEL-TUNE-COUNT (DEMO-SUB, CHAN-SUB) 3255 Ref Source Code Routine: D120-PROCESS-CHAN-TUNE-DETAIL At the conclusion of FIG. 17 processing, the Measurement Engine 200 has read the entire Video Viewing Event File 170 and it has calculated Reach information for every House represented in the file. Along the way, the Engine 200 has loaded each home's data into the Channel Viewing Detail One-Second Array Data Structure FIG. 14 so that it could calculate House Reach using the one second level data in that Data Structure. Additionally, the Engine 200 has tabulated the FIG. 15 fields One Minute Channel Viewing AGGR-CHAN-VIEW-SEC-THIS-MINUTE 3280, Total unique homes viewing at the beginning (first second) of the minute AGGR-CHAN-VIEW-AT-BEG-OF-MINUTE 3282, and Total unique homes viewing at the middle (30th second) of the minute AGGR-CHAN-VIEW-AT-MID-OF-MINUTE 3284 in the Channel Viewing Detail Array for Aggregation Data Structure FIG. 15 in preparation for subsequent aggregation processing.

FIG. 18 illustrates an exemplary flowchart describing the process for tabulating channel viewing activity by the House Demographic Measurement Engine 200, according to one embodiment. As noted in the description of FIG. 17, the Tabulate Channel Viewing 648 process is called as part of processing each Video Viewing Event. This process uses the Tune-in second of the day (ref FIG. 8 TUNE-IN-SECOND-OF-DAY 2860) and the Tune-out second of the day (Ref FIG. 8 TUNE-OUT-SECOND-OF-DAY 2875). Also recall from FIG. 17 that the Tune-out second of the day may have been adjusted, based on input parameter Max Tune Duration 8010, to truncate long running video viewing events.

Also note that prior to entering this routine, the Engine 200 has set the values of the Demo-sub and the Chan-sub. As noted in FIG. 15, there are up to 60 values allowed for CHAN-VD-DEMO-CODE 3215. Demo-sub controls the row of that array thus identifying the demographic group into which the values will be added.

Also, as noted in FIG. 15, there are up to 600 values allowed for CHAN-VD-CHANNEL-CALL-SIGN-TRGT 3230. Chan-sub controls the row of that array thus identifying the channel into which the values will be added.

Proceeding with the review of FIG. 18, the process begins with Tabulate Channel Viewing 648. The Engine 200 then performs a loop in which it loops through each of the seconds represented in the adjusted video viewing event from the tune-in second to the adjusted tune-out second. The first step in the loop is to calculate the Minute-sub which is used to control bucket into which the minute level viewing activity will be aggregated; the formula ((Second-sub−1)/60)+1 truncated will yield the minute of the day which contains the second being processed.

To calculate the AGGR-CHAN-VIEW-AT-BEG-OF-MINUTE 3282 and AGGR-CHAN-VIEW-AT-MID-OF-MINUTE 3284, the following formulas are used:

Compute second-for-beg-of-minute=minute-sub*60

Compute second-for-mid-of-minute=second-for-beg-of-minute+30

If second-sub=second-for-beg-of-minute
   Add 1 to AGGR-CHAN-VIEW-AT-BEG-OF-MINUTE (DEMO-SUB, CHAN-SUB, MINUTE-SUB) 3282

End-if
If second-sub=second-for-mid-of-minute
   Add 1 to AGGR-CHAN-VIEW-AT-MID-OF-MINUTE
      (DEMO-SUB, CHAN-SUB, MINUTE-SUB) 3284
End-if
Reference program code routine: D200-TABULATE-CHANNEL-VIEWING The Engine 200 then tests to see whether the process is calculating 'All' viewing seconds or 'Unique' viewing seconds. This is based on the input parameter FIG. 50 All or Unique Seconds 8025.

For 'All' viewing seconds, the Engine 200 simply adds 1 to the House Viewing Count for the second (Ref FIG. 14 CVDS-CHAN-HOUS-VIEWING-COUNT 3045) and to Demo-Channel-Minute Viewing Seconds (Ref FIG. 15 AGGR-CHAN-VIEW-SEC-THIS-MINUTE 3280). When second-sub=second-for-beg-of-minute, the Engine 200 also increments AGGR-CHAN-VIEW-AT-BEG-OF-MINUTE (DEMO-SUB, CHAN-SUB, MINUTE-SUB) 3282. When second-sub=second-for-mid-of-minute, the Engine 200 also increments AGGR-CHAN-VIEW-AT-MID-OF-MINUTE (DEMO-SUB, CHAN-SUB, MINUTE-SUB) 3284 as shown in the program code routine D200-TABULATE-CHANNEL-VIEWING.

For 'Unique' viewing seconds, the Engine 200 will only tally the viewing seconds if the value in the array position (Ref FIG. 14 CVDS-CHAN-HOUS-VIEWING-COUNT 3045) is still zero which means that no device in the house has been identified as viewing that Channel during that second of the day. A value of 1 or more means that the Engine 200 has already determined that a viewing device in that house has already been flagged as viewing that channel during that second of the day; in this case, the Engine 200 can simply increment the count of Duplicate viewing seconds.

So when the count of viewing seconds (Ref FIG. 14 CVDS-CHAN-HOUS-VIEWING-COUNT 3045) is still zero, the Engine 200 simply adds 1 to the House Viewing Count for the second (Ref FIG. 14 CVDS-CHAN-HOUS-VIEWING-COUNT 3045) and to Demo-Channel-Minute Viewing Seconds (Ref FIG. 15 AGGR-CHAN-VIEW-SEC-THIS-MINUTE 3280). When second-sub=second-for-beg-of-minute, the Engine 200 also increments AGGR-CHAN-VIEW-AT-BEG-OF-MINUTE (DEMO-SUB, CHAN-SUB, MINUTE-SUB) 3282. When second-sub=second-for-mid-of-minute, the Engine 200 also increments AGGR-CHAN-VIEW-AT-MID-OF-MINUTE (DEMO-SUB, CHAN-SUB, MINUTE-SUB) 3284 as shown in the program code routine D200-TABULATE-CHANNEL-VIEWING.

At the end of the loop, all of the viewing activity represented in the video viewing event has been accounted for and aggregated into the Channel Viewing Detail One-Second Array Data Structure FIG. 14 and then Channel Viewing Detail Array for Aggregation Data Structure FIG. 15.

FIG. 19 illustrates an exemplary flowchart describing the process for calculating house reach by the House Demographic Measurement Engine 200, according to one embodiment. As noted in the description of FIG. 17, the Calculate House Reach 624 process is called after all of the Video Viewing Events for a House have been loaded to the Channel Viewing Detail One-Second Array Data Structure FIG. 14. Whether through a change in the House id (ref Enriched Video Viewing Event House File Structure FIG. 8 HOUSE-ID-IN 2825), or the Channel Call Sign (ref FIG. 8 CHANNEL-CALL-SIGN-TARGET-IN 2815), or the Demographic code (ref FIG. 8 DEMOGRAPHIC-CODE-IN 2810), the Engine 200 has determined that it is time to analyze the Reach viewing for the House.

Also note that prior to calling this routine, the Engine 200 has in FIG. 17 set the Reach array info in step Set Reach Array Info 644 where the Reach Period subscript is set. Also recall that the Household Reach Definition Array Data Structure FIG. 13 allows up to 30 different Channels (ref FIG. 13 REACH-DEF-CALL-SIGN 2310) for which Reach periods can be defined. FIG. 13 also allows up to 180 Reach Definitions (ref FIG. 13 field REACH-DEF-PERIOD-ID 2320 through field REACH-DEF-ASSET-ID 2370) to be recorded for each of the 30 different Channel Call Signs.

Prior to entering Calculate House Reach 624, the Channel 2310 has been determined and the appropriate subscript is set. This routine then is looping through each of the Reach Period Definitions (up to 180 of them) for that Channel 2310.

Proceeding with the review of FIG. 19, the first step is Calculate House Reach 624. The Engine 200 then performs a loop (process 625) in which it loops through each Reach Period Definition associated with the Channel 2310. Each Reach Period Definition contains a Beginning Second of the day (ref FIG. 13 REACH-DEF-BEG-SEC-OF-DAY 2330) and an Ending Second of the day (ref FIG. 13 REACH-DEF-END-SEC-OF-DAY 2340) which together define the bounds of the Reach Period. The Engine 200 will use these bounds to set up a loop in which it tabulates the viewing activity of the channel during each second of the Reach Period. Whenever the House has viewing during that second, this is added to the total.

Claims Reference: By examining viewing activity during each second of the Reach Period, this enables measurement of the viewing activity during the Reach Period to identify Households having viewing activity during each said Reach Period defined by the Reach Period Definitions.

Claims Reference: By examining viewing activity during each second of the Reach Period, this enables the Engine 200 to compare viewing activity in each Bucket based upon the window of time defined by the reach period begin second of the day and reach period end second of the day to identify homes with less than sufficient viewing to qualify as an Exposure according to the Reach Period Definition.

Claims Reference: By examining viewing activity during each second of the Reach Period, this enables the Engine 200 to compare viewing activity in each Bucket based upon the window of time defined by the reach period begin second of the day and reach period end second of the day to identify homes with sufficient viewing to qualify as an Exposure according to the Reach Period Definition.

At the end of the Loop, the Engine 200 compares the number of seconds where there was viewing activity to the Minimum seconds required for an exposure (ref FIG. 13 REACH-DEF-MIN-SEC-EXPOSU 2350). When the threshold is met, the Homes Reach Count (ref FIG. 13 HOMES-REACHED-COUNT 2380) is incremented. At the same time, the Demographic Homes Reached Count (ref FIG. 13 DEMO-CODE-HOMES-REACHED-COUNT 2395) is incremented for the Demographic code that was previously identified. Thus the Engine 200 has tracked Reach Period viewing at an aggregate level across all demographic codes and at the demographic code level for each individual demographic code.

Claims Reference: By comparing total house viewing activity during the Reach Period to the amount of viewing required to earn an exposure, this enables the tracking of house level exposures as recorded in Homes Reached Count for each Reach Period.

Claims Reference: By comparing total house viewing activity for a house identified by a demographic code during the Reach Period to the amount of viewing required to earn an exposure, this enables the tracking of house level exposures categorized by a plurality of Demographic Codes such that Homes Reached Count is tracked for each Demographic Code for each Reach Period Definition.

The Engine 200 then proceeds to the next Reach Period incrementing the Reach-Def-Period-Sub and the process is repeated for the new Reach period. This continues until all of the Reach Period Definitions for the Channel have been processed. The Engine then proceeds to Done 626.

Figure 20:
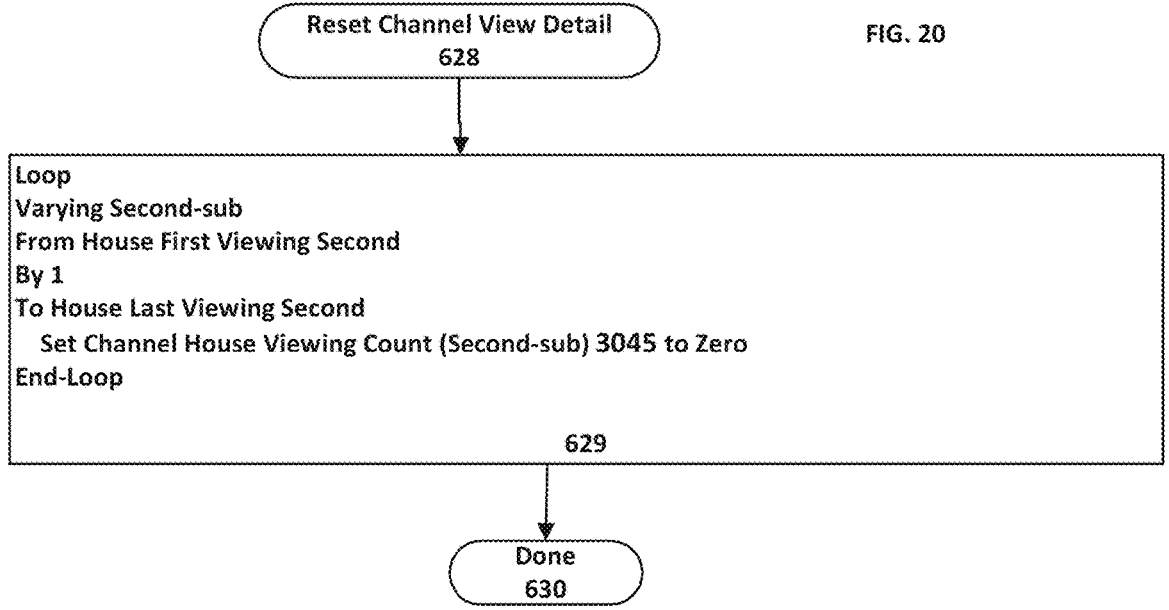
FIG. 20 illustrates an exemplary flowchart describing the process for resetting the channel view detail fields by the House Demographic Measurement Engine 200, according to one embodiment.

FIG. 20 illustrates an exemplary flowchart describing the process for resetting the channel view detail fields by the House Demographic Measurement Engine 200, according to one embodiment. As noted in the description of FIG. 17, the Reset Channel View Detail 628 process is called after performing process Calculate House Reach 624.

Proceeding with the review of FIG. 20, the first step is Reset Channel View Detail 628. The Engine 200 then performs a loop (process 629) in which it loops through each of the seconds of viewing activity (Ref field CVDS-CHAN-HOUS-VIEWING-COUNT 3045) in the Channel Viewing Detail One-Second Array Data Structure FIG. 14 that was captured for the House with the objective of resetting the array to zero in preparation for processing the video viewing activity for the next house. The first and last viewing seconds are identified by the program variables House First Viewing Second and House Last Viewing Second. After the loop is complete, the process is Done 630. Source program reference is D600-RESET-CHAN-VIEW-DTL-SECND.

In an alternative embodiment, the Engine 200 could simply move zero to the array for the 86400 seconds of the day (Ref field CVDS-CHAN-HOUS-VIEWING-COUNT 3045).

Figure 21:
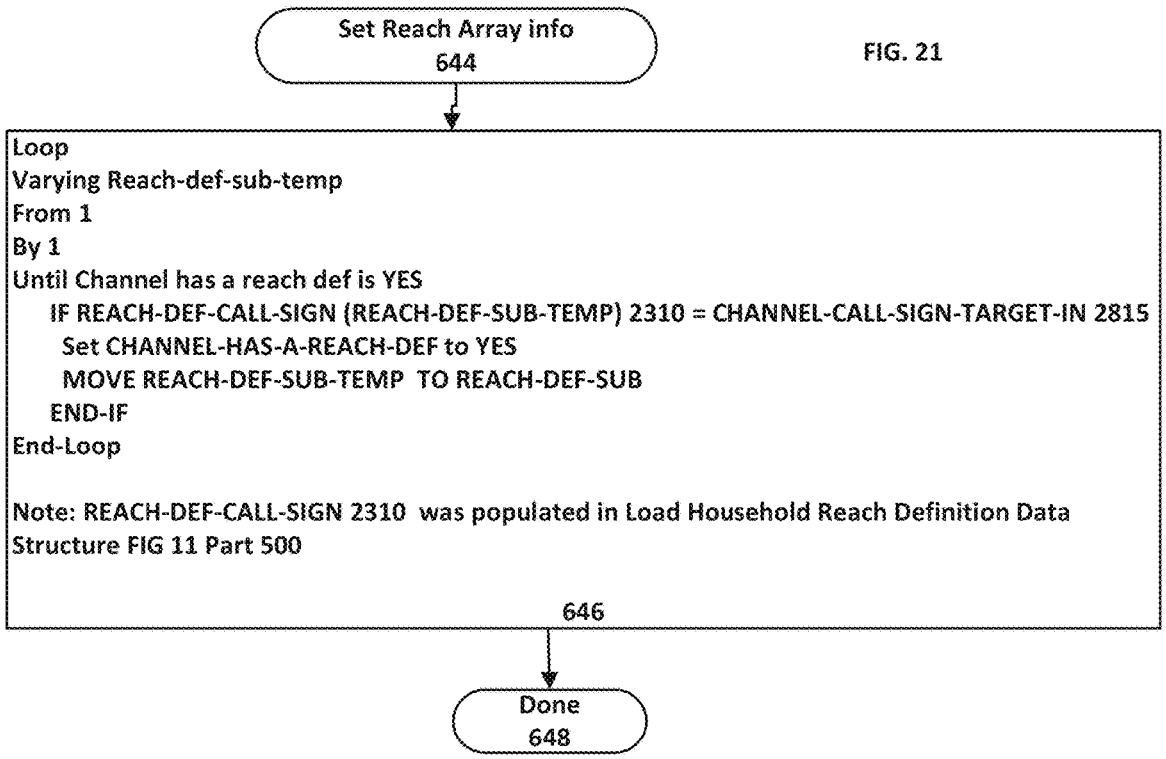
FIG. 21 illustrates an exemplary flowchart describing the process for setting the reach definition flag and subscript value in preparation for use by the House Demographic Measurement Engine 200, according to one embodiment.

FIG. 21 illustrates an exemplary flowchart describing the process for setting the reach definition flag and subscript value in preparation for use by the House Demographic Measurement Engine 200, according to one embodiment. As noted in the description of FIG. 17, the Set Reach Array info 644 process is called after the Channel changes or the Demographic code changes.

Proceeding with the review of FIG. 21, the first step is Set Reach Array info 644. The Engine 200 then performs a loop (process 646) in which it loops through each of the Channels (Ref field REACH-DEF-CALL-SIGN 2310) in the Household Reach Definition Array Data Structure FIG. 13. Recall that these channels define the channels on which the Engine 200 will look for Reach Period viewing activity. When there is a match between the Channel in the Reach Definition (Ref field REACH-DEF-CALL-SIGN 2310) and the Channel in the Enriched Video Viewing Event House File Structure field FIG. 8 CHANNEL-CALL-SIGN-TARGET-IN 2815, then the Channel is identified as having a Reach Period and the subscript associated with that channel is saved for use in subsequence processing. When a matching channel is found, the process is Done 648.

In an alternative embodiment, the Engine 200 could simply scan through the entire list of Reach Period channels for every Channel in the input file. The present embodiment provides a more efficient process because the act of looking for the Reach Period channel is only done as needed.

Figure 22:
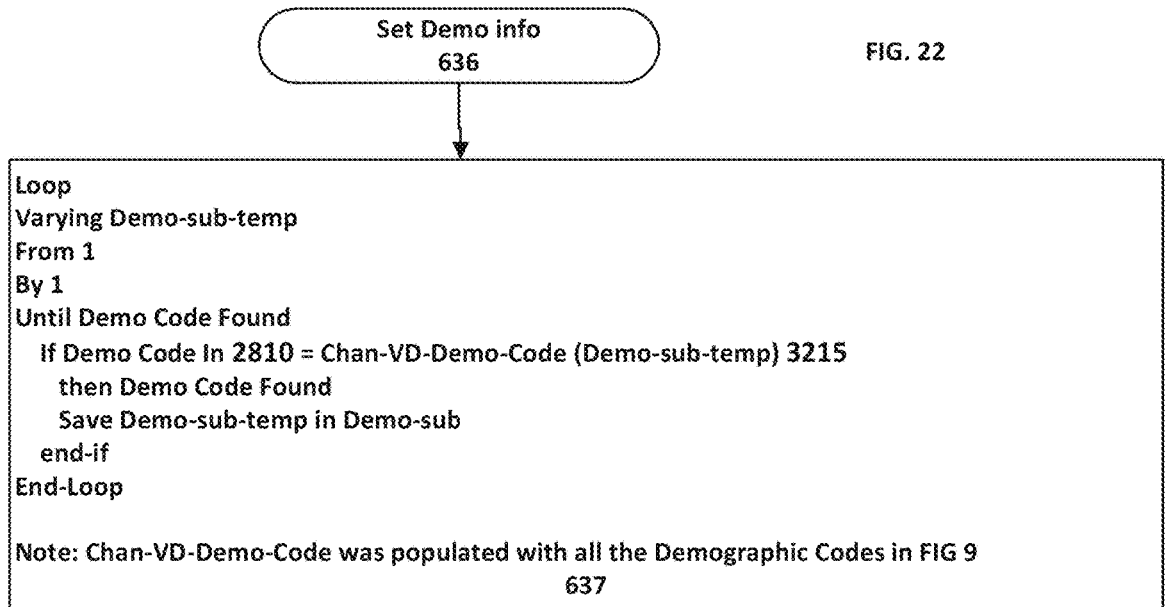
FIG. 22 illustrates an exemplary flowchart describing the process for setting the demographic code subscript value in preparation for use by the House Demographic Measurement Engine 200, according to one embodiment.

FIG. 22 illustrates an exemplary flowchart describing the process for setting the demographic code subscript value in preparation for use by the House Demographic Measurement Engine 200, according to one embodiment. As noted in the description of FIG. 17, the Set Demo info 636 process is called after the Demographic code changes.

Proceeding with the review of FIG. 22, the first step is Set Demo info 636. The Engine 200 then performs a loop (process 637) in which it loops through each of the Demographic Codes (Ref field CHAN-VD-DEMO-CODE 3215) in the Channel Viewing Detail Array for Aggregation Data Structure FIG. 15 looking for a match between the value in CHAN-VD-DEMO-CODE 3215 and DEMOGRAPHIC-CODE-IN 2810. Recall that these demographic codes where loaded to the Data Structure during FIG. 9 processing. When there is a match between the two fields, then the subscript associated with that Demographic Code is saved for use in subsequence processing. When a matching Demographic Code is found, the process is Done 638.

In an alternative embodiment, the Engine 200 could simply scan through the entire list of Demographic Codes for every Demographic Code in the input file. The present embodiment provides a more efficient process because the act of looking for the Demographic Code is only done as needed.

Figure 23:
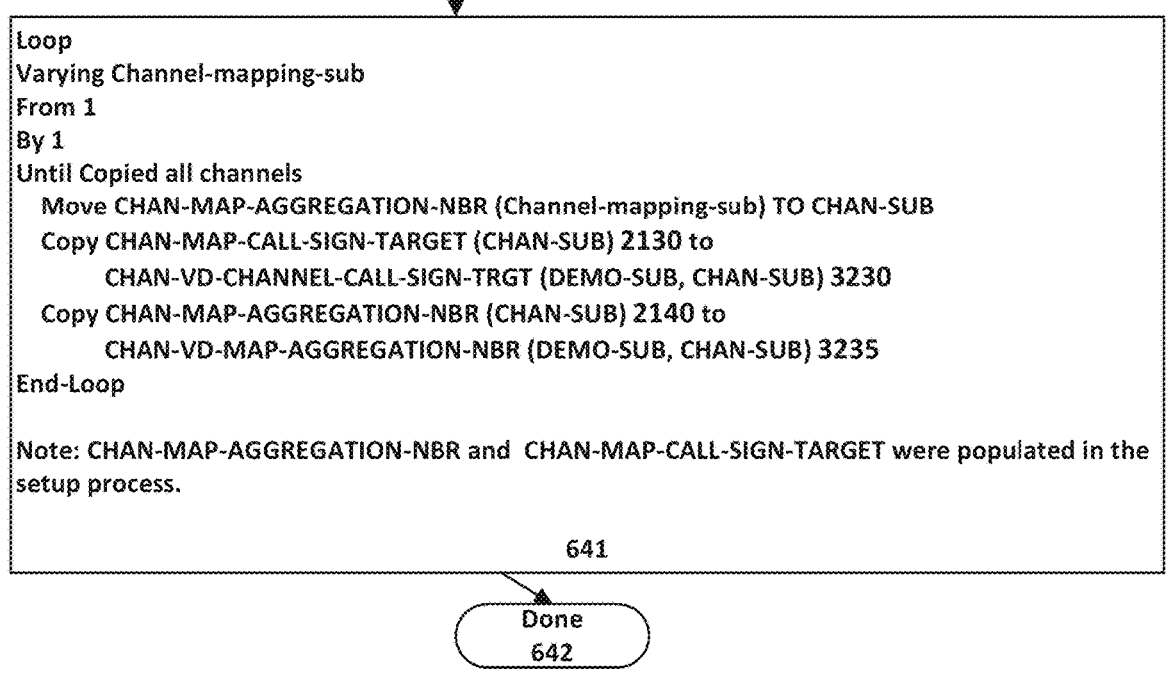
FIG. 23 illustrates an exemplary flowchart describing the process for copying the channel information to a new demographic code grouping in preparation for use by the House Demographic Measurement Engine 200, according to one embodiment.

FIG. 23 illustrates an exemplary flowchart describing the process for copying the channel information to a new demographic code grouping in preparation for use by the House Demographic Measurement Engine 200, according to one embodiment. As noted in the description of FIG. 17, the Copy Channels to New Demo 640 process is called after executing Set Demo info 636 which was run when the Demographic code changes.

Proceeding with the review of FIG. 23, the first step is Copy Channels to New Demo 640. The Engine 200 then performs a loop (process 641) in which it loops through each of the rows in the Channel Mapping Definition Array Data Structure FIG. 6 so that it can copy the channel information to the Channel Viewing Detail Array for Aggregation Data Structure FIG. 15.

The Engine 200 uses the Channel Aggregation number (Ref CHAN-MAP-AGGREGATION-NBR 2140) to identify the subscript of the row to which the channel information will be copied.

Having done that, the Engine 200 copies:

FIG. 6 CHAN-MAP-CALL-SIGN-TARGET 2130 to FIG. 15 CHAN-VD-CHANNEL-CALL-SIGN-TRGT 3230

FIG. 6 CHAN-MAP-AGGREGATION-NBR 2140 to FIG. 15 CHAN-VD-MAP-AGGREGATION-NBR 3235

When all the Channels have been copied, the process is Done 642.

Note: Fields CHAN-MAP-CALL-SIGN-TARGET 2130 and CHAN-MAP-AGGREGATION-NBR 2140 are populated by the Measurement Engine 200 when it is loading the Channel Mapping Data Structure in preparation for measurement activity. Ref Engine 200 program routine B500-LOAD-CHANNEL-MAPPING-DEF. The population process is similar to what occurs in FIG. 4 steps 410 to 440.

Review of FIGS. 24-33

I will now review FIGS. 24-33.

These figures provide the record layouts for the various files that are created by the Measurement Engine 200 as a result of calculating video asset viewing activity. These files are structured such that they can be loaded to a database where a reporting application can be developed. To assist the reader in implementing such a system I have provided suggested Table names. The reader will note that while this embodiment shows that these outputs are created as flat files, another embodiment may insert to or update a data base table to record this information. Yet another embodiment may show XML messages or any other computer readable format.

For each of FIGS. 24-33, the reader will find a block of information entitled Summary Information. It provides a Short name of the file/data, a Table Name which is a suggested name which can be assigned to the table to which this file is loaded in the database, the Output file name assigned by Measurement Engine 200, a Record description, and the Specification File Name. With these various elements, the reader has an start-to-finish view of each file.

After the Summary Information, the reader will find the Record Layout which lists the Name of the individual fields, data type, size, and description or definition for each field in the file.

For each file, in the DESCRIPTION field under the Record Layout, I have specified how the field is populated or where the field is populated from. The DESCRIPTION field is intended to augment the description found in the source field.

The reader will also find the heading Query Source Code Ref which is followed by the title of a query that can be found in the attached Query Source Code Ref file which is included with this specification. The reader will appreciate that there are multiple ways to query the various tables to produce the results shown. All such query variations fall within the spirit and scope of this teaching.

FIG. 24 illustrates summary information and an exemplary record layout for the House Reach Detail file 205 which is produced by the Measurement Engine 200 as a result of calculating Reach activity at the house level.

Discussion of FIG. 24 Data Usage

Commercial Schedule Cumulative Audience

The file in FIG. 24 can be loaded to a database table with a layout matching the FIG. 24 file structure for additional analytics. Those skilled in the art will have no difficulty loading such a table with daily data for multiple days.

One nonlimiting example of using this data is to calculate Commercial Schedule Cumulative Audience for an Advertising Campaign which is running a particular ad multiple times over a period of days. The Advertising Campaign is identified by field HRD-REACH-CAMPAIGN-ID 4050. The ad being aired is identified by field HRD-REACH-ASSET-ID 4055. Commercial Schedule Cumulative Audience is the number of unique households that were exposed to the ad during the campaign; this information is important to an advertiser. Commercial Schedule Cumulative Audience requires the detail viewing data including the House identifier and the Reach Period information in order to be calculated; once the data is aggregated to counts, the detail needed to calculate Cumulative Audience is lost.

Note: Exposed means that the household had sufficient viewing of the ad to meet the viewing seconds exposure requirement.

So once this data has been loaded to a database table such as HOUSE-REACH-DETAIL, a query like the following will produce the Commercial Schedule Cumulative Audience for a particular demographic group that may have viewed the ad run as part of a Campaign during a defined time period:
Select count (distinct HRD_REACH_VD_HOUSE_ID) 4035
From HOUSE_REACH_DETAIL
Where HRD_TUNING_ACTIVITY_DATE 4010 in (list of desired dates)
And HRD_REACH_VD_MARKET 4020=user specified market value
And HRD_REACH_DEMO_TYPE 4025=User specified demographic type value
And HRD_REACH_DEMO_CODE 4030=User specified demographic code value
And HRD_REACH_CAMPAIGN_ID 4050=User specified advertising campaign id value
And HRD_REACH_ASSET_ID 4055=User specified video asset id (ad id) value
Claims Reference: This provides the Commercial Schedule Cumulative Audience metric.
Query Source Code Ref: Commercial Schedule Cumulative Audience Commercial Schedule Cumulative Audience House List In addition to producing the count of Commercial Schedule Cumulative Audience, an advertiser may want to have a list of House id's for a particular demographic group that may have viewed the ad during a defined time period. A query like the following will produce the Commercial Schedule Cumulative Audience House List for a particular demographic group that may have viewed the ad run as part of a Campaign during a defined time period:
Select count (distinct HRD-REACH-VD-HOUSE-ID) 4035
From HOUSE-REACH-DETAIL
Where HRD-TUNING-ACTIVITY-DATE 4010 in (list of desired dates)
And HRD-REACH-VD-MARKET 4020=user specified market value
And HRD-REACH-DEMO-TYPE 4025=User specified demographic type value
And HRD-REACH-DEMO-CODE 4030=User specified demographic code value
And HRD-REACH-CAMPAIGN-ID 4050=User specified advertising campaign id value
And HRD-REACH-ASSET-ID 4055=User specified video asset id (ad id) value
Claims Reference: This provides the Commercial Schedule Cumulative Audience House List metric.
Query Source Code Ref: Commercial Schedule Cumulative Audience House List Impressions for Multiple Reach Periods Another option is to use a database table such as HOUSE-REACH-DETAIL to produce the Impressions count across all demographic groups that may have viewed the ad during a defined time period which includes multiple reach periods. A query like the following will produce the Impressions for Multiple Reach Periods across all demographic groups that may have viewed the ad run as part of a Campaign during a defined time period which includes multiple reach periods:
Select count(HRD-REACH-VD-HOUSE-ID) 4035
From HOUSE-REACH-DETAIL
Where HRD-TUNING-ACTIVITY-DATE 4010 in (list of desired dates)
And HRD-REACH-VD-MARKET 4020=user specified market value
And HRD-REACH-PERIOD-ID 4045=User specified reach period id value Claims Reference: This provides the Impressions for Multiple Reach Periods metric.

Query Source Code Ref: Impressions for Multiple Reach Periods

Impressions for a Particular Reach Period

Another option is to use a database table such as HOUSE-REACH-DETAIL to produce the Impressions count across all demographic groups that may have viewed the ad during a specific reach period. A query like the following will produce the Impressions for a Particular Reach Period across all demographic groups that may have viewed the ad run as part of a Campaign during a a specific reach period:
Select count(HRD-REACH-VD-HOUSE-ID) 4035
From HOUSE-REACH-DETAIL
Where HRD-TUNING-ACTIVITY-DATE 4010 in (list of desired dates)
And HRD-REACH-VD-MARKET 4020=user specified market value
And HRD-REACH-PERIOD-ID 4045=User specified Reach Period Id Claims Reference: This provides the Impressions for a Particular Reach Period metric.

Query Source Code Ref: Impressions for a Particular Reach Period

Demographic Group Impressions for Multiple Reach Periods

Another option is to use a database table such as HOUSE-REACH-DETAIL to produce the Impressions count across all demographic groups that may have viewed the ad during a specific reach period. A query like the following will produce the Impressions for a Particular Reach Period across all demographic groups that may have viewed the ad run as part of a Campaign during a as specific reach period:
Select count(HRD-REACH-VD-HOUSE-ID) 4035
From HOUSE-REACH-DETAIL
Where HRD-TUNING-ACTIVITY-DATE 4010 in (list of desired dates)
And HRD-REACH-VD-MARKET 4020=user specified market value
And HRD-REACH-DEMO-TYPE 4025=User specified demographic type value
And HRD-REACH-DEMO-CODE 4030=User specified demographic code value
And HRD-REACH-PERIOD-ID 4045 in (list of desired Reach Period Ids)

Claims Reference: This provides the Demographic Group Impressions for Multiple Reach Periods metric.

Query Source Code Ref: Demographic Group Impressions for Multiple Reach Periods

Demographic Group Impressions for a Particular Reach Period

Another option is to use a database table such as HOUSE-REACH-DETAIL to produce the Impressions count for a particular demographic group that may have viewed the ad during a particular reach period. A query like the following will produce the Demographic Group Impressions for a Particular Reach Period for a particular demographic group that may have viewed the ad run as part of a Campaign during a particular reach period:
Select count(HRD-REACH-VD-HOUSE-ID) 4035
From HOUSE-REACH-DETAIL
Where HRD-TUNING-ACTIVITY-DATE 4010 in (list of desired dates)
and HRD-REACH-VD-MARKET 4020=user specified market value
And HRD-REACH-DEMO-TYPE 4025=User specified demographic type value
And HRD-REACH-DEMO-CODE 4030=User specified demographic code value
And HRD-REACH-PERIOD-ID 4045=User specified Reach Period Id Claims Reference: This provides the metric Demographic Group Impressions for a Particular Reach Period.

Query Source Code Ref: Demographic Group Impressions for a Particular Reach Period

FIG. 25 illustrates summary information and an exemplary record layout for the House Reach Summary file 210 which is produced by the Measurement Engine 200 as a result of calculating Reach activity at the house level.

Discussion of FIG. 25 Data Usage

Impressions for Multiple Reach Periods

The file in FIG. 25 can be loaded to a database table with a layout matching the FIG. 25 file structure for additional analytics. Those skilled in the art will have no difficulty loading such a table with daily data for multiple days.

One nonlimiting example of using this data is to calculate Impressions for an Advertising Campaign which is running a particular ad multiple times over a period of days. The Advertising Campaign is identified by field HRS-REACH-CAMPAIGN-ID 4235. The ad being aired is identified by field HRS-REACH-ASSET-ID 4240. Impressions is the number of total gross (including duplicate) viewings of the ad (where the viewing met the minimum number of seconds to be considered an exposure) across all the households during the campaign; this information is important to an advertiser.

So once this data has been loaded to a database table such as HOUSE-REACH-SUMMARY, a query like the following will produce the Impressions count across all demographic groups that may have viewed the ad during a defined time period:
Select Sum (HRS-HOMES-REACHED-COUNT) 4260
From HOUSE-REACH-SUMMARY
Where HRS-TUNING-ACTIVITY-DATE 4210 in (list of desired dates)
And HRS-REACH-VD-MARKET 4220=user specified market value
And HRS-REACH-CAMPAIGN-ID 4235=User specified advertising campaign id value
And HRS-REACH-ASSET-ID 4240=User specified video asset id (ad id) value
Group by HRS-TUNING-ACTIVITY-DATE 4210, HRS-REACH-VD-MARKET 4220,
HRS-REACH-CAMPAIGN-ID 4235, HRS-REACH-ASSET-ID 4240

Claims Reference: This provides the metric Impressions for Multiple Reach Periods.

Query Source Code Ref: Impressions for Multiple Reach Periods

Impressions for a Particular Reach Period

Another nonlimiting example of using this data is to calculate Impressions for a Particular Reach Period which might be an ad airing on a single channel at a point in time. The Channel is identified by HRS-REACH-VD-CHAN-CALL-SIGN 4225. The Reach Period is identified by HRS-REACH-PERIOD-ID 4230. The Advertising Campaign may be identified by field HRS-REACH-CAMPAIGN-ID 4235. The ad being aired is identified by field HRS-REACH-ASSET-ID 4240. Impressions for a Particular Reach Period is the number of total gross viewings of the ad where the viewing met the minimum number of seconds to be considered an exposure across all the households during the Reach Period; this information is important to an advertiser. This tells the advertiser how many households were exposed to his ad when it ran on a certain channel on a certain date at a certain time. Impressions for a Particular Reach Period is the same thing as Commercial Cumulative Audience which is answering the question of how many viewers saw an ad that was aired on a channel at a particular time.

So once this data has been loaded to a database table such as HOUSE-REACH-SUMMARY, a query like the following will produce the Impressions for a Particular Reach Period across all demographic groups that may have viewed the ad during a defined time period:

Select Sum (HRS-HOMES-REACHED-COUNT) 4260
From HOUSE-REACH-SUMMARY
Where HRS-TUNING-ACTIVITY-DATE 4210=User specified date
And HRS-REACH-VD-MARKET 4220=User specified market value
And HRS-REACH-CAMPAIGN-ID 4235=User specified advertising campaign id value
And HRS-REACH-ASSET-ID 4240=User specified video asset id (ad id) value
And HRS-REACH-PERIOD-ID 4230=User specified Reach Period Id
And HRS-REACH-VD-CHAN-CALL-SIGN 4225=User specified Channel call sign
Group By HRS-TUNING-ACTIVITY-DATE 4210, HRS-REACH-VD-MARKET 4220,
HRS-REACH-CAMPAIGN-ID 4235, HRS-REACH-ASSET-ID 4240, HRS-REACH-PERIOD-ID 4230,
HRS-REACH-VD-CHAN-CALL-SIGN 4225

Claims Reference: This provides the metric Impressions for a Particular Reach Period.

Query Source Code Ref: Impressions for a Particular Reach Period

FIG. 26 illustrates summary information and an exemplary record layout for the Demographic House Reach Summary file 215 which is produced by the Measurement Engine 200 as a result of calculating Reach activity at the house level.

Discussion of FIG. 26 Data Usage

Demographic Group Impressions for Multiple Reach Periods

The file in FIG. 26 can be loaded to a database table with a layout matching the FIG. 26 file structure for additional analytics. Those skilled in the art will have no difficulty loading such a table with daily data for multiple days.

One nonlimiting example of using this data is to calculate Demographic Group Impressions for Multiple Reach Periods for an Advertising Campaign which is running a particular ad multiple times over a period of days, targeted to a certain demographic group. The Advertising Campaign is identified by field DHRS-REACH-CAMPAIGN-ID 4445. The ad being aired is identified by field DHRS-REACH-ASSET-ID 4450. Demographic Group Impressions is the number of total gross (including duplicate) viewings of the ad where the viewing met the minimum number of seconds to be considered an exposure during the campaign by households identified by the proper demographic code; this information is important to an advertiser.

So once this data has been loaded to a database table such as DEMO-HOUSE-REACH-SUMMARY, a query like the following will produce the Demographic Group Impressions for Multiple Reach Periods for a demographic group that may have viewed the ad during a defined time period:

Select Sum (DHRS-HOMES-REACHED-COUNT) 4470
From DEMO-HOUSE-REACH-SUMMARY
Where DHRS-TUNING-ACTIVITY-DATE 4410 in (list of desired dates)
And DHRS-REACH-VD-MARKET 4420=user specified market value
And DHRS-REACH-CAMPAIGN-ID 4445=User specified advertising campaign id value
And DHRS-REACH-ASSET-ID 4450=User specified video asset id (ad id) value
And DHRS-REACH-VD-DEMO-TYPE 4425=User specified demographic type value
And DHRS-REACH-VD-DEMO-CODED 4430=user specified demographic code value
group by DHRS-TUNING-ACTIVITY-DATE 4410, DHRS-REACH-VD-MARKET 4420,
DHRS-REACH-CAMPAIGN-ID 4445, DHRS-REACH-ASSET-ID 4450,
DHRS-REACH-VD-DEMO TYPE 4425, DHRS-REACH-VD-DEMO-CODE 4430

Claims Reference: This provides the metric Demographic Group Impressions for Multiple Reach Periods.

Query Source Code Ref: Demographic Group Impressions for Multiple Reach Periods

Demographic Group Impressions for a Particular Reach Period

This query follows the pattern of Impressions for a Particular Reach Period with the additional criteria that Demographic type and Code are added to the query. With the query Demographic Group Impressions for a Particular Reach Period, an advertiser could determine how many households in the demographic group that he is targeting actually saw his ad when it ran on a certain channel on a certain date at a certain time. The query is like this:

Select Sum (DHRS-HOMES-REACHED-COUNT) 4470
From DEMO-HOUSE-REACH-SUMMARY
Where DHRS-TUNING-ACTIVITY-DATE 4410=User specified date
And DHRS-REACH-VD-MARKET 4420=User specified market value
And DHRS-REACH-CAMPAIGN-ID 4445=User specified advertising campaign id value
And DHRS-REACH-ASSET-ID 4450=User specified video asset id (ad id) value And DHRS-REACH-VD-DEMO-TYPE 4425=User specified demographic type value
And DHRS-REACH-VD-DEMO-CODE 4430=User specified demographic code value
And DHRS-REACH-PERIOD-ID 4440=User specified Reach Period Id
Group by DHRS-TUNING-ACTIVITY-DATE 4410, DHRS-REACH-VD-MARKET 4420, DHRS-REACH-CAMPAIGN-ID 4445, DHRS-REACH-ASSET-ID 4450,
DHRS-REACH-VD-DEMO-TYPE 4425, DHRS-REACH-VD-DEMO-CODE 4430,
DHRS-REACH-PERIOD-ID 4440

Claims Reference: This provides the metric Demographic Group Impressions for a Particular Reach Period.

Query Source Code Ref: Demographic Group Impressions for a Particular Reach Period

FIG. 27 illustrates summary information and an exemplary record layout for the House Demographic Channel Viewing Detail Minute file 220 which is produced by the Measurement Engine 200 as a result of calculating house level video asset viewing activity at the one-minute level for each channel.

Discussion of FIG. 27 Data Usage

Demographic Group Average Audience One Minute Timeframe

The file in FIG. 27 can be loaded to a database table with a layout matching the FIG. 27 file structure for additional analytics. Those skilled in the art will have no difficulty loading such a table with daily data for multiple days.

One nonlimiting example of using this data is to calculate Demographic Group Average Audience for any minute of time or for multiple minutes of time. Demographic Group Average Audience is an estimate of how many households identified by a particular demographic group are viewing a certain channel during a certain minute. It is calculated as total viewing seconds for the chosen channel during the period/the period duration in seconds. In terms of the fields in FIG. 27, it is CVDM-AGGR-CHN-VIEW-SEC-THS-MIN 4645/60 seconds in the minute. If the time period was 3 minutes, then the denominator would be 180 seconds.

So once this data has been loaded to a database table such as HOUSE_DEMO_CHAN_VW_DETL_01_MIN, a query like the following will produce the Demographic Group Average Audience One Minute Timeframe for a demographic group that may have viewed a certain channel during a particular minute on a certain date:
Select CVDM-AGGR-CHN-VIEW-SEC-THS-MIN 4645/60 as "Demo Group Avg Audience"
From HOUSE_DEMO_CHAN_VW_DETL_01_MIN
Where CVDM-TUNING-ACTIVITY-DATE 4610=User specified date
And CVDM-CHAN-VD-MARKET 4620=User specified market value
And CVDM-CHAN-VD-DEMO-TYPE 4625=User specified demographic type value
And CVDM-CHAN-VD-DEMO-CODE 4630=User specified demographic code value
And CVDM-CHAN-VD-CHAN-CALL-SIGN 4635=User specified channel call sign
And CVDM-MINUTE-SUB 4640=User specified minute of the date Query Source Code Ref: Demographic Group Average Audience One Minute Timeframe Demographic Group Average Rating One Minute Timeframe Another use of the FIG. 27 data is to calculate Demographic Group Average Rating which is (Demographic Group Average Audience/Universe Estimate)*100 (see Definitions). The Demographic Group Average Rating is the percentage of the potential audience that this one minute segment earned. It is potential audience because the Universe Estimate is the total universe or the total population of TV households in a geographic area, but it is not likely that every single house is viewing television at the time of the measurement.

So once this data has been loaded to a database table such as HOUSE_DEMO_CHAN_VW_DETL_01_MIN, a query like the following will produce the Demographic Group Average Rating One Minute Timeframe for a demographic group that may have viewed a certain channel during a particular minute on a certain date:
Select (CVDM-AGGR-CHN-VIEW-SEC-THS-MIN 4645/Universe-Estimate)*100 as "Demo Group Avg Rating"
From HOUSE_DEMO_CHAN_VW_DETL_01_MIN, Universe_Estimate_Data
Where CVDM-TUNING-ACTIVITY-DATE 4610=User specified date
And CVDM-CHAN-VD-MARKET 4620=User specified market value
And CVDM-CHAN-VD-DEMO-TYPE 4625=User specified demographic type value
And CVDM-CHAN-VD-DEMO-CODE 4630=User specified demographic code value
And CVDM-CHAN-VD-CHAN-CALL-SIGN 4635=User specified channel call sign
And CVDM-MINUTE-SUB 4640=User specified minute of the date
and UE ESTIMATE DATE=CVDM-TUNING-ACTIVITY-DATE 4610
and UE MARKET=CVDM-CHAN-VD-MARKET 4620

Note: Universe_Estimate_Data would be a one row table containing the Universe Estimate. Those skilled in the art will have no difficulty creating such a table and using it in the query.

Query Source Code Ref: Demographic Group Average Rating One Minute Timeframe

Claims Reference: Queryable House Demographic Channel Viewing Detail Data Structure which is loaded from House Demographic Channel Viewing Detail Minute file 220 represents a Queryable House Demographic Channel Viewing Detail Data Structure containing Channel Viewing Detail Fields. This Queryable House Demographic Channel Viewing Detail Data Structure can be queried to create Channel Viewing Detail House Based Metrics including, but not limited to, Demographic Group Average Audience One Minute Timeframe, Demographic Group Average Rating One Minute Timeframe.

FIG. 28 illustrates summary information and an exemplary record layout for the House Demographic Channel Minute of Day Summary file 225 which is produced by the Measurement Engine 200 as a result of calculating house level video asset viewing activity at the one-minute level across all the channels.

Discussion of FIG. 28 Data Usage

Demographic Group Households Using Television One Minute Timeframe

The file in FIG. 28 can be loaded to a database table with a layout matching the FIG. 28 file structure for additional analytics. Those skilled in the art will have no difficulty loading such a table with daily data for multiple days.

One nonlimiting example of using this data is to calculate Demographic Group Households Using Television for any minute of time or for multiple minutes of time. Demographic Group Households Using Television is an estimate of how many households identified by a particular demographic group are viewing any television channel during a certain minute. It is calculated as total viewing seconds by the Demographic Group across all channels during the period/the period duration in seconds. In terms of the fields in FIG. 28, it is MODS-AGGR-VIEWING-SECONDS 4840/60 seconds in the minute. If the time period was 3 minutes, then the denominator would be 180 seconds.

So once this data has been loaded to a database table such as HOUSE_DEMO_CHAN_DAY_01_MIN_SUM, a query like the following will produce the Demographic Group Households Using Television One Minute Timeframe for a demographic group during a particular minute on a certain date:

Select MODS-AGGR-VIEWING-SECONDS 4840/60 as "Demo Group Homes Using TV"
From HOUSE_DEMO_CHAN_DAY_01_MIN_SUM
Where MODS-TUNING-DATE-YYYYMMDD 4810=User specified date
And MODS-MARKET-CODE 4820=User specified market value
And MODS-CHAN-DAY-SUM-DEMO-TYPE 4825=User specified demographic type value
And MODS-CHAN-DAY-SUM-DEMO-CODE 4830=User specified demographic code value
And MODS-MINUTE-OF-DAY 4835=User specified minute of the date
Query Source Code Ref: Demographic Group Households Using Television One Minute Timeframe

Aggregate Households Using Television One Minute Timeframe

The file in FIG. 28 can be loaded to a database table with a layout matching the FIG. 28 file structure for additional analytics. Those skilled in the art will have no difficulty loading such a table with daily data for multiple days.

One nonlimiting example of using this data is to calculate Aggregate Households Using Television for any minute of time or for multiple minutes of time. Aggregate Households Using Television is an estimate of how many households across the entire population are viewing any television channel during a certain minute. If the Engine 200 is used to aggregate the data across the entire population as discussed in FIG. 9 Single Demographic Group Aggregation, then there is one Demographic Code with the value "ALLRECS" which contains a single aggregation that crosses the entire population. In this case, Aggregate Households Using Television is calculated as total viewing seconds by the population across all channels during the period/the period duration in seconds. In terms of the fields in FIG. 28, it is MODS-AGGR-VIEWING-SECONDS 4840/60 seconds in the minute. If the time period was 3 minutes, then the denominator would be 180 seconds.

So once this data has been loaded to a database table such as HOUSE_DEMO_CHAN_DAY_01_MIN_SUM, a query like the following will produce the Aggregate Households Using Television One Minute Timeframe for the full population during a particular minute on a certain date:

Select MODS-AGGR-VIEWING-SECONDS 4840/60 as "Aggregate Homes Using TV"
From HOUSE_DEMO_CHAN_DAY_01_MIN_SUM
Where MODS-TUNING-DATE-YYYYMMDD 4810=User specified date
And MODS-MARKET-CODE 4820=User specified market value
And MODS-CHAN-DAY-SUM-DEMO-TYPE 4825="ALL"
And MODS-CHAN-DAY-SUM-DEMO-CODE 4830="ALLRECS"
And MODS-MINUTE-OF-DAY 4835=User specified minute of the date
Query Source Code Ref: Aggregate Households Using Television One Minute Timeframe

Households Using Television Percent One Minute Timeframe

Another nonlimiting example of using this data is to calculate Households Using Television Percent for any minute of time or for multiple minutes of time. Households Using Television Percent is an estimate of the percentage of households across the entire population viewing any television channel during a certain minute or minutes. So following the process for calculating Aggregate Households Using Television discussed above, we can build on that to calculate Households Using Television Percent by simply dividing Aggregate Households Using Television by Universe Estimate, then multiple by 100 to make this a percentage. A query like the following will produce the Households Using Television Percent One Minute Timeframe for the full population during a particular minute on a certain date:

Select ((MODS-AGGR-VIEWING-SECONDS 4840/60)/Universe-Estimate)*100 as "Homes Using TV Pct"
From HOUSE_DEMO_CHAN_DAY_01_MIN_SUM, Universe_Estimate_Data
Where MODS-TUNING-DATE-YYYYMMDD 4810=User specified date
And MODS-MARKET-CODE 4820=User specified market value
And MODS-CHAN-DAY-SUM-DEMO-TYPE 4825="ALL"
And MODS-CHAN-DAY-SUM-DEMO-CODE 4830="ALLRECS"
And MODS-MINUTE-OF-DAY 4835=User specified minute of the date
and UE ESTIMATE DATE=MODS-TUNING-DATE-YYYYMMDD 4810
and UE MARKET=MODS-MARKET-CODE 4820
Query Source Code Ref: Households Using Television Percent One Minute Timeframe
Note: Universe_Estimate_Data would be a one row table containing the Universe Estimate. Note: Recall from above that Aggregate Households Using Television is MODS-AGGR-VIEWING-SECONDS 4840/60 seconds.

Claims Reference: Queryable House Demographic Channel Daily Summary Data Structure which is loaded from House Demographic Channel Minute of Day Summary file 225 represents a Queryable House Demographic Channel Daily Summary Data Structure containing Channel Viewing Summary Fields. This Queryable House Demographic Channel Daily Summary Data Structure can be queried to create Channel Viewing Detail House Based Metrics including, but not limited to, Demographic Group Households Using Television One Minute Timeframe, Aggregate Households Using Television One Minute Timeframe, Households Using Television Percent One Minute Timeframe.

Discussion of FIG. 27 and FIG. 28 Combined Data Usage

Demographic Group Average Audience Share One Minute Timeframe

After loading both the file in FIG. 27 and the file in FIG. 28, additional metrics that combine data from both files can be calculated.

One nonlimiting example of using this data is to calculate Demographic Group Average Audience Share for any minute of time or for multiple minutes of time. Demographic Group Average Audience Share is based on the amount of viewing that one channel has compared to all the viewing occurring during that minute. This is calculated as Demographic Group Average Audience [from FIG. 27]/Demographic Group Households Using Television [from FIG. 28]. By combining those two queries two produce a query like the following, we can produce Demographic Group Average Audience Share One Minute Timeframe for a demographic group for a particular channel during a particular minute on a certain date:

Select CVDM-AGGR-CHN-VIEW-SEC-THS-MIN 4645/60 as "Demo Group Avg Audience",
MODS-AGGR-VIEWING-SECONDS 4840/60 as "Demo Group Homes Using TV",
(CVDM-AGGR-CHN-VIEW-SEC-THS-MIN 4645/60)/(MODS-AGGR-VIEWING-SECONDS 4840/60) as "Demo Group Audience Share"
From HOUSE DEMO_CHAN_VW_DETL_01_MIN, HOUSE_DEMO_CHAN_DAY_01_MIN_SUM
Where CVDM-TUNING-ACTIVITY-DATE 4610=User specified date
And CVDM-CHAN-VD-MARKET 4620=User specified market value
And CVDM-CHAN-VD-DEMO-TYPE 4625=User specified demographic type value
And CVDM-CHAN-VD-DEMO-CODE 4630=User specified demographic code value
And CVDM-CHAN-VD-CHAN-CALL-SIGN 4635=User specified channel call sign
And CVDM-MINUTE-SUB 4640=User specified minute of the date
And MODS-TUNING-DATE-YYYYMMDD 4810=CVDM-TUNING-ACTIVITY-DATE 4610
And MODS-MARKET-CODE 4820=CVDM-CHAN-VD-MARKET 4620
And MODS-CHAN-DAY-SUM-DEMO-TYPE 4825=CVDM-CHAN-VD-DEMO-TYPE 4625
And MODS-CHAN-DAY-SUM-DEMO-CODE 4830=CVDM-CHAN-VD-DEMO-CODE 4630
And MODS-MINUTE-OF-DAY 4835=CVDM-MINUTE-SUB 4640

Claims Reference: This creates the metric Demographic Group Average Audience Share One Minute Timeframe.

Query Source Code Ref: Demographic Group Average Audience Share One Minute Timeframe The above query can easily be adjusted to make the denominator cover the entire population by using query criteria like this:
And MODS-CHAN-DAY-SUM-DEMO-TYPE 4825="ALL"
And MODS-CHAN-DAY-SUM-DEMO-CODE 4830="ALLRECS"
As taught in FIG. 28 Aggregate Households Using Television above.

Aggregate Average Audience Share One Minute Timeframe

We can adjust the previous query to produce Aggregate Average Audience Share One Minute Timeframe by changing the query as shown below. Within the context of this teaching, this query produces Aggregate Average Audience Share across the entire population instead of only for one demographic group.

Select CVDM-AGGR-CHN-VIEW-SEC-THS-MIN 4645/60 as "Aggregate Avg Audience",
MODS-AGGR-VIEWING-SECONDS 4840/60 as "Aggregate Homes Using TV",
(CVDM-AGGR-CHN-VIEW-SEC-THS-MIN 4645/60)/(MODS-AGGR-VIEWING-SECONDS 4840/60) as "Aggregate Avg Audience Share"
From HOUSE DEMO_CHAN_VW_DETL_01_MIN, HOUSE_DEMO_CHAN_DAY_01_MIN_SUM
Where CVDM-TUNING-ACTIVITY-DATE 4610=User specified date
And CVDM-CHAN-VD-MARKET 4620=User specified market value
And CVDM-CHAN-VD-DEMO-TYPE 4625="ALL"
And CVDM-CHAN-VD-DEMO-CODE 4630="ALLRECS"
And CVDM-CHAN-VD-CHAN-CALL-SIGN 4635=User specified channel call sign
And CVDM-MINUTE-SUB 4640=User specified minute of the date
And MODS-TUNING-DATE-YYYYMMDD 4810=CVDM-TUNING-ACTIVITY-DATE 4610
And MODS-MARKET-CODE 4820=CVDM-CHAN-VD-MARKET 4620
And MODS-CHAN-DAY-SUM-DEMO-TYPE 4825=CVDM-CHAN-VD-DEMO-TYPE 4625
And MODS-CHAN-DAY-SUM-DEMO-CODE 4830=CVDM-CHAN-VD-DEMO-CODE 4630
And MODS-MINUTE-OF-DAY 4835=CVDM-MINUTE-SUB 4640

Claims Reference: This creates the metric Aggregate Average Audience Share One Minute Timeframe.
Query Source Code Ref: Aggregate Average Audience Share One Minute Timeframe

FIG. 29 illustrates summary information and an exemplary record layout for the House Demographic Channel Viewing Detail Thirty Minute file 250 which is produced by the Measurement Engine 200 as a result of calculating house level video asset viewing activity at the thirty minute segment of the day level for each channel.

Discussion of FIG. 29 Data Usage

Demographic Group Average Audience Thirty Minute Timeframe

The file in FIG. 29 can be loaded to a database table with a layout matching the FIG. 29 file structure for additional analytics. Those skilled in the art will have no difficulty loading such a table with daily data for multiple days. This data can then be used to calculate Demographic Group Average Audience Thirty Minute Timeframe for the thirty minute period of time following the same pattern as shown under FIG. 27.

Demographic Group Average Rating Thirty Minute Timeframe

The FIG. 29 data can then be used to calculate Demographic Group Average Rating Thirty Minute Timeframe for the thirty minute period of time following the same pattern as shown under FIG. 27.

Claims Reference: Queryable House Demographic Channel Viewing Detail Data Structure which is loaded from House Demographic Channel Viewing Detail Thirty Minute file 250 represents a Queryable House Demographic Channel Viewing Detail Data Structure containing Channel Viewing Detail Fields. This Queryable House Demographic Channel Viewing Detail Data Structure can be queried to create Channel Viewing Detail House Based Metrics including, but not limited to, Demographic Group Average Audience Thirty Minute Timeframe, Demographic Group Average Rating Thirty Minute Timeframe.

FIG. 30 illustrates summary information and an exemplary record layout for the House Demographic Channel Thirty Minute of Day Summary file 255 which is produced by the Measurement Engine 200 as a result of calculating house level video asset viewing activity at the thirty minute segment of the day level across all the channels.

Discussion of FIG. 30 Data Usage

Demographic Group Households Using Television Thirty Minute Timeframe

The file in FIG. 30 can be loaded to a database table with a layout matching the FIG. 30 file structure for additional analytics. Those skilled in the art will have no difficulty loading such a table with daily data for multiple days.

This data can then be used to calculate Demographic Group Households Using Television Thirty Minute Timeframe for the thirty minute period of time following the same pattern as shown under FIG. 28.

Aggregate Households Using Television Thirty Minute Timeframe

The FIG. 30 data can then be used to calculate Aggregate Households Using Television Thirty Minute Timeframe for the thirty minute period of time following the same pattern as shown under FIG. 28.

Households Using Television Percent Thirty Minute Timeframe

The FIG. 30 data can then be used to calculate Households Using Television Percent Thirty Minute Timeframe for the thirty minute period of time following the same pattern as shown under FIG. 28.

Claims Reference: Queryable House Demographic Channel Daily Summary Data Structure which is loaded from House Demographic Channel Thirty Minute of Day Summary file 255 represents a Queryable House Demographic Channel Daily Summary Data Structure containing Channel Viewing Summary Fields. This Queryable House Demographic Channel Daily Summary Data Structure can be queried to create Channel Viewing Detail House Based Metrics including, but not limited to, Demographic Group Households Using Television Thirty Minute Timeframe, Aggregate Households Using Television Thirty Minute Timeframe, Households Using Television Percent Thirty Minute Timeframe.

Discussion of FIG. 29 and FIG. 30 Combined Data Usage

After loading both the file in FIG. 29 and the file in FIG. 30, additional metrics that combine data from both files can be calculated.

Demographic Group Average Audience Share Thirty Minute Timeframe can be calculated as described above for the Demographic Group Average Audience Share One Minute Timeframe (minute level) following the pattern shown under Discussion of FIG. 27 and FIG. 28 Combined Data Usage.

Aggregate Average Audience Share Thirty Minute Timeframe can be calculated as described above for the Aggregate Average Audience Share One Minute Timeframe (minute level) following the pattern shown under Discussion of FIG. 27 and FIG. 28 Combined Data Usage.

Claims Reference: This creates the metric Demographic Group Average Audience Share Thirty Minute Timeframe.

Claims Reference: This creates the metric Aggregate Average Audience Share Thirty Minute Timeframe.

FIG. 31 illustrates summary information and an exemplary record layout for the House Demographic Channel Viewing Detail Sixty Minute file 260 which is produced by the Measurement Engine 200 as a result of calculating house level video asset viewing activity at the sixty minute segment of the day level for each channel.

Discussion of FIG. 31 Data Usage

Demographic Group Average Audience Sixty Minute Timeframe

The file in FIG. 31 can be loaded to a database table with a layout matching the FIG. 31 file structure for additional analytics. Those skilled in the art will have no difficulty loading such a table with daily data for multiple days.

This data can then be used to calculate Demographic Group Average Audience Sixty Minute Timeframe for the sixty minute period of time following the same pattern as shown under FIG. 27.

Demographic Group Average Rating Sixty Minute Timeframe

The FIG. 31 data can then be used to calculate Demographic Group Average Rating Sixty Minute Timeframe for the sixty minute period of time following the same pattern as shown under FIG. 27.

Claims Reference: Queryable House Demographic Channel Viewing Detail Data Structure which is loaded from House Demographic Channel Viewing Detail Sixty Minute file 260 represents a Queryable House Demographic Channel Viewing Detail Data Structure containing Channel Viewing Detail Fields. This Queryable House Demographic Channel Viewing Detail Data Structure can be queried to create Channel Viewing Detail House Based Metrics including, but not limited to, Demographic Group Average Audience Sixty Minute Timeframe, Demographic Group Average Rating Sixty Minute Timeframe.

FIG. 32 illustrates summary information and an exemplary record layout for the House Demographic Channel Sixty Minute of Day Summary file 265 which is produced by the Measurement Engine 200 as a result of calculating house level video asset viewing activity at the sixty minute segment of the day level across all the channels.

Discussion of FIG. 32 Data Usage

Demographic Group Households Using Television Sixty Minute Timeframe

The file in FIG. 32 can be loaded to a database table with a layout matching the FIG. 32 file structure for additional analytics. Those skilled in the art will have no difficulty loading such a table with daily data for multiple days.

This data can then be used to calculate Demographic Group Households Using Television Sixty Minute Timeframe for the sixty minute period of time following the same pattern as shown under FIG. 28.

Aggregate Households Using Television Sixty Minute Timeframe

The FIG. 32 data can then be used to calculate Aggregate Households Using Television Sixty Minute Timeframe for the sixty minute period of time following the same pattern as shown under FIG. 28.

Households Using Television Percent Sixty Minute Timeframe

The FIG. 32 data can then be used to calculate Households Using Television Percent Sixty Minute Timeframe for the sixty minute period of time following the same pattern as shown under FIG. 28.

Claims Reference: Queryable House Demographic Channel Daily Summary Data Structure which is loaded from House Demographic Channel Sixty Minute of Day Summary file 265 represents a Queryable House Demographic Channel Daily Summary Data Structure containing Channel Viewing Summary Fields. This Queryable House Demographic Channel Daily Summary Data Structure can be queried to create Channel Viewing Detail House Based Metrics including, but not limited to, Demographic Group Households Using Television Sixty Minute Timeframe, Aggregate Households Using Television Sixty Minute Timeframe, Households Using Television Percent Sixty Minute Timeframe.

Discussion of FIG. 31 and FIG. 32 Combined Data Usage

After loading both the file in FIG. 31 and the file in FIG. 32, additional metrics that combine data from both files can be calculated.

Demographic Group Average Audience Share Sixty Minute Timeframe can be calculated as described above for the Demographic Group Average Audience Share One Minute Timeframe (minute level) following the pattern shown under Discussion of FIG. 27 and FIG. 28 Combined Data Usage.

Aggregate Average Audience Share Sixty Minute Timeframe can be calculated as described above for the Aggregate Average Audience Share One Minute Timeframe (minute level) following the pattern shown under Discussion of FIG. 27 and FIG. 28 Combined Data Usage.

Claims Reference: This creates the metric Demographic Group Average Audience Share Sixty Minute Timeframe.

Claims Reference: This creates the metric Aggregate Average Audience Share Sixty Minute Timeframe.

FIG. 33 illustrates summary information and an exemplary record layout for the Channel Daily Summary file 270 which is produced by the Measurement Engine 200 as a result of calculating aggregate viewing seconds based on unique house level viewing for each channel for the entire day.

Figure 34:
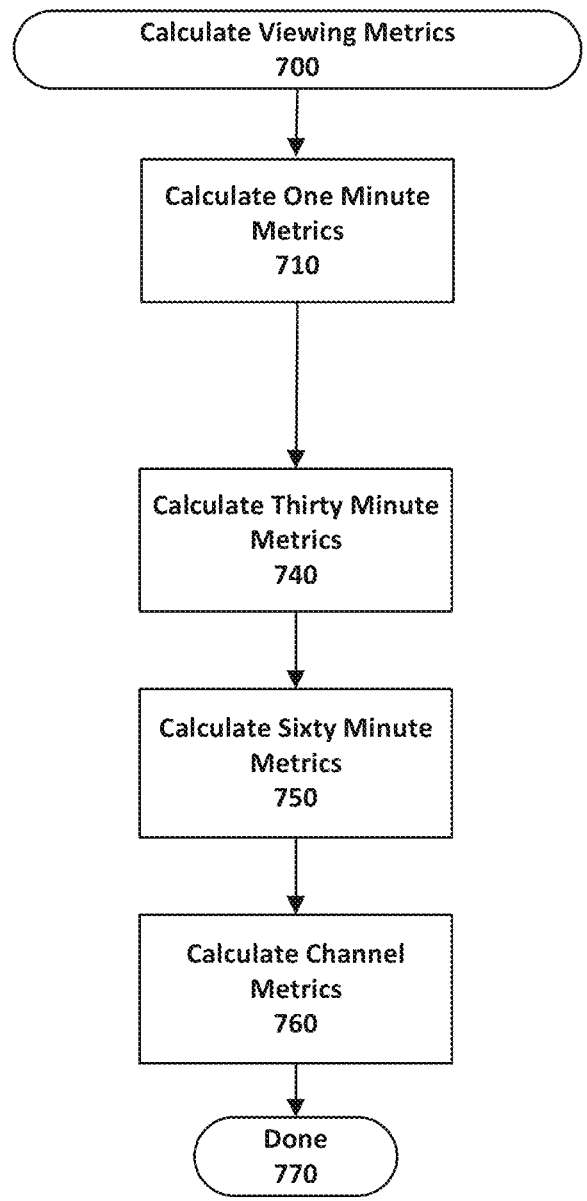
FIG. 34 illustrates an exemplary flowchart providing an overview of the process for calculating viewing metrics by the House Demographic Measurement Engine 200, according to one embodiment.

FIG. 34 illustrates an exemplary flowchart providing an overview of the process for calculating the viewing metrics. The process begins with Calculate Viewing Metrics 700. The Measurement Engine 200 then proceeds to calculate the one-minute metrics per Calculate One Minute Metrics 710. The next step is to calculate the thirty minute metrics per Calculate Thirty Minute Metrics 740. The next step is to calculate the sixty minute metrics per Calculate Sixty Minute Metrics 750. The next step is to calculate the channel metrics per Calculate Channel Metrics 760. At this point the process is done per Done 770. The detail for each of these steps is provided in subsequent figures.

Review of FIGS. 35-40

I will now review FIGS. 35-40.

These figures provide the exemplary flowcharts describing how the Measurement Engine 200 calculates the viewing metrics. It is helpful when reviewing these Flowcharts to envision a three dimensional table in the memory of the computer as follows: Demographic Group (Ref FIG. 15 CHAN-VD-DEMO-CODE 3215), Channel (Ref FIG. 15 CHAN-VD-CHANNEL-CALL-SIGN-TRGT 3230), and Minute (Ref FIG. 15 AGGR-CHAN-VIEW-SEC-THIS-MINUTE 3280) with the demographic groups as sheets, the Channels as rows on each sheet, and the minutes as columns across. Then the processes described in FIGS. 35 to 40 are each called once for each Demographic Code. Ref Source Code Routine A100-Control-process for details.

Figure 35:
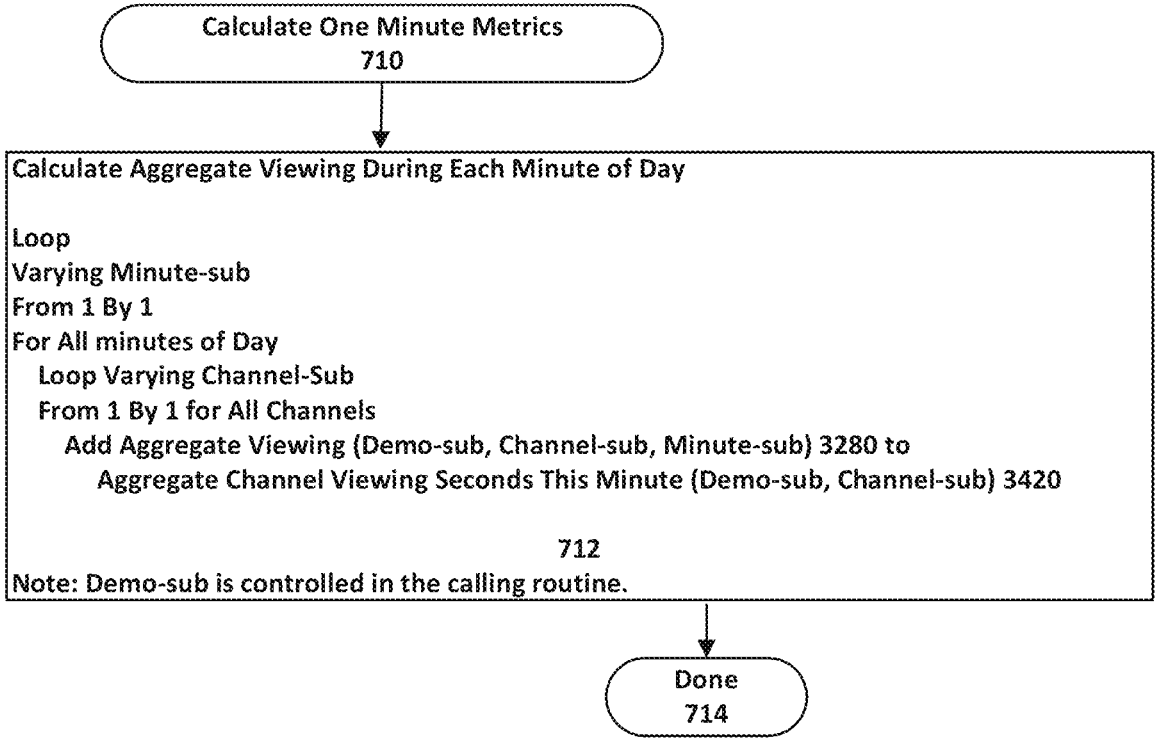
FIG. 35 illustrates an exemplary flowchart describing the process for calculating one-minute viewing metrics by the House Demographic Measurement Engine 200, according to one embodiment.

FIG. 35 illustrates an exemplary flowchart for calculating the one-minute viewing metrics. The process begins with Calculate One Minute Metrics 710. The objective of this routine is to Calculate Aggregate Viewing During Each Minute of Day. This routine is called once for each Demographic Code.

The process proceeds to Calculate Aggregate Viewing During Each Minute of Day 712. Once inside this routine, the outer loop goes across the minutes of the day, the inner loop goes down the channels. As the Engine 200 goes down the Channels (Ref FIG. 15 CHAN-VD-CHANNEL-CALL-SIGN-TRGT 3230), it is adding up the aggregate viewing seconds from each channel+minute (Ref FIG. 15 AGGR-CHAN-VIEW-SEC-THIS-MINUTE 3280). The result is being saved in the Minute level aggregate viewing seconds (Ref FIG. 16 MINUTE-AGGR-VIEWING-SECONDS 3420). When the Engine 200 completes adding up all the viewing seconds for one channel, it advances to the next minute of the day to add up all its values.

When the last minute of the day has been processed, the Engine 200 proceeds to Done 714.

Figure 36:
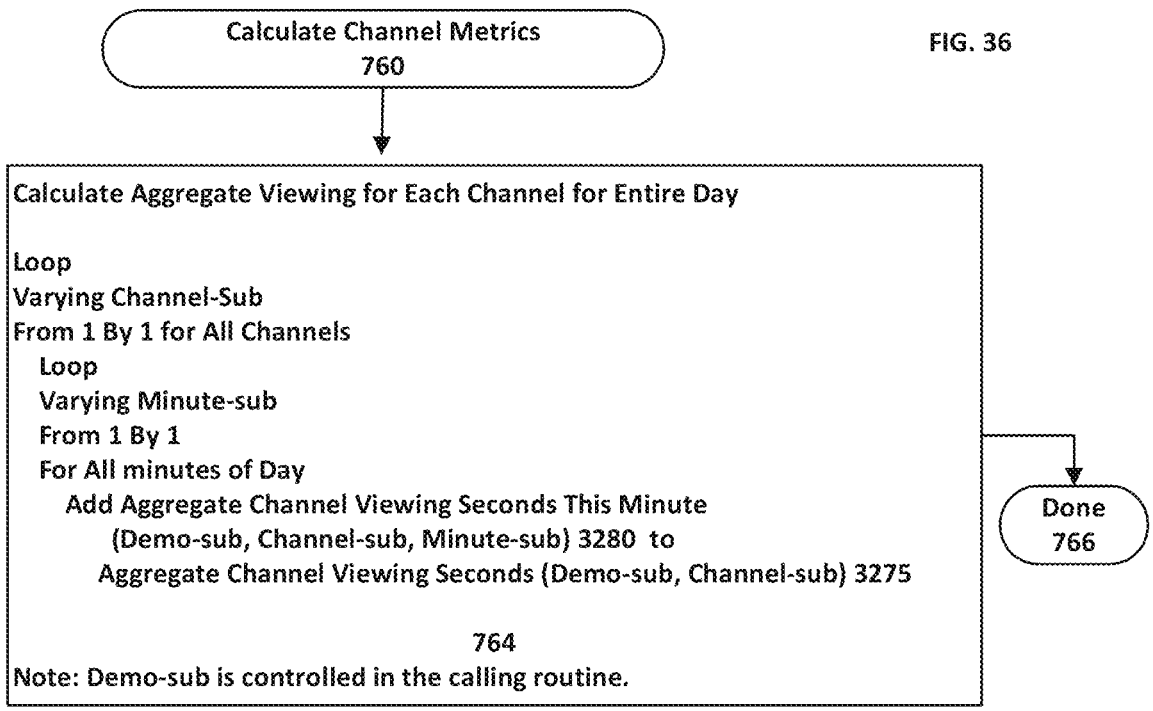
FIG. 36 illustrates an exemplary flowchart describing the process for calculating channel viewing metrics by the House Demographic Measurement Engine 200, according to one embodiment.

FIG. 36 illustrates an exemplary flowchart describing the process for calculating channel viewing metrics by the House Demographic Measurement Engine 200, according to one embodiment. The process begins with Calculate Channel Metrics 760. This routine is called once for each Demographic Code. The Engine 200 then proceeds to Calculate Aggregate Viewing for Each Channel for Entire Day 764. The objective of this routine is to summarize, for each channel, the channel one-minute level data (Ref FIG. 15 field AGGR-CHAN-VIEW-SEC-THIS-MINUTE 3280) across to produce the total viewing seconds for the channel for the entire day (Ref FIG. 15 AGG-CHANNEL-VIEWING-SECONDS 3275).

Once inside this routine, the outer loop goes down the channels, the inner loop goes across the minutes of the day. As the Engine 200 goes down the Channels (Ref FIG. 15 CHAN-VD-CHANNEL-CALL-SIGN-TRGT 3230), it is adding up the aggregate viewing seconds from each channel+minute (Ref FIG. 15 AGGR-CHAN-VIEW-SEC-THIS-MINUTE 3280). The result is being saved in the Channel level aggregate viewing seconds (Ref FIG. 15 AGG-CHANNEL-VIEWING-SECONDS 3275). When the Engine 200 completes adding up all the viewing seconds across the day for one channel, it advances to the next channel to add up all its values.

When the last minute of the day has been processed, the Engine 200 proceeds to Done 766.

FIG. 37 illustrates an exemplary flowchart describing the process for calculating aggregate viewing for each channel for each thirty-minute segment of the day by the House Demographic Measurement Engine 200, according to one embodiment. The process begins with Calculate Channel Viewing for Thirty Minute Segment 740. The Engine 200 then proceeds to Calculate Aggregate Viewing for Each Channel For Each Thirty Minute Segment for Day 742. This routine is called once for each Demographic Code. The objective of this routine is to summarize the channel one-minute level data (Ref FIG. 15 field AGGR-CHAN-VIEW-SEC-THIS-MINUTE 3280) to channel thirty-minute data (Ref FIG. 15 AGG-CHAN-VIEW-SEC-THIS-30-MIN 3295).

Once inside the main process (742), the outer loop goes down the channels, the inner loop goes across the minutes of the day. As the Engine 200 goes across the minutes of the day, it is taking each block of 30 minutes and summarizing all of the one-minute channel level viewing activity during each of the 30 minutes in that thirty-minute segment of the day. The summarized value is recorded in the Aggregate Channel Viewing during that 30 minute segment (Ref FIG. 15 AGG-CHAN-VIEW-SEC-THIS-30-MIN 3295). When it is the first minute of the thirty minute segment, the Engine 200 will copy the Channel Viewing for the first second of that minute 3282 to the first second of the thirty minute segment 3297. When it is minute fifteen of the thirty minute segment, the Engine 200 will copy the Channel Viewing for the first second of that minute 3282 to the first second of minute 15 of the thirty minute segment 3299.

This is repeated for all the channels and for the 48 thirty-minute segments of the day.

When the Engine 200 completes adding up all the viewing seconds for one channel, it advances to the next thirty-minute segment of the day to add up all its values. Reference program code routine V240-AGGR-CHN-VW-SEC-THS-30 MIN.

FIG. 38 illustrates an exemplary flowchart describing the process for calculating aggregate viewing across all channels for each thirty-minute segment of the day by the House Demographic Measurement Engine 200, according to one embodiment. The process begins with Calculate Aggregate Viewing for Thirty Minute Segment 744. This routine is called once for each Demographic Code. The objective of this routine is to Calculate Aggregate Viewing During Each thirty-minute segment of the day.

Once inside main process (746), the outer loop goes across the thirty-minute segment of the day, the inner loop goes down the channels. As the Engine 200 goes down the Channels (Ref FIG. 15 CHAN-VD-CHANNEL-CALL-SIGN-TRGT 3230), it is adding up the aggregate viewing seconds from each channel+thirty-minute segment of the day (Ref FIG. 15 AGG-CHAN-VIEW-SEC-THIS-30-MIN 3295). The result is being saved in the Thirty Minute level aggregate viewing seconds (Ref FIG. 16 S30-AGGR-VIEWING-SECONDS 3435). When the Engine 200 completes adding up all the viewing seconds from the various channels for one thirty minute segment, it advances to the next thirty-minute segment of the day to add up all the values for the channels for the thirty minute segment.

This is repeated for all the thirty-minute segments of the day and then for each channel therein. When the last thirty-minute segment of the day has been processed, the process is done. Reference program code routine V240-AGGR-CHN-VW-SEC-THS-30MIN.

FIG. 39 illustrates an exemplary flowchart describing the process for calculating aggregate viewing for each channel for each sixty-minute segment of the day by the House Demographic Measurement Engine 200, according to one embodiment. The process begins with Calculate Channel Viewing for Sixty Minute Segment 760. This routine is called once for each Demographic Code. The Engine 200 then proceeds to Calculate Aggregate Viewing for Each Channel For Each Sixty Minute Segment for Day 762. The objective of this routine is to summarize the channel one-minute level data (Ref FIG. 15 field AGGR-CHAN-VIEW-SEC-THIS-MINUTE 3280) to channel sixty-minute data (Ref FIG. 15 AGG-CHAN-VIEW-SEC-THIS-60-MIN 3300).

Once inside main process (762), the outer loop goes down the channels, the inner loop goes across the minutes of the day. As the Engine 200 goes across the minutes of the day, it is taking each block of 60 minutes and summarizing all of the one-minute channel level viewing activity during each of the 60 minutes in that sixty-minute segment of the day. The summarized value is recorded in the Aggregate Channel Viewing during that 60 minute segment (Ref FIG. 15 AGG-CHAN-VIEW-SEC-THIS-60-MIN 3300). When it is the first minute of the sixty minute segment, the Engine 200 will copy the Channel Viewing for the first second of that minute 3282 to the first second of the sixty minute segment 3302. When it is minute thirty of the sixty minute segment, the Engine 200 will copy the Channel Viewing for the first second of that minute 3282 to the first second of minute 30 of the sixty minute segment 3304. This is repeated for all the channels and for the 24 sixty-minute segments of the day.

When the Engine 200 completes adding up all the viewing seconds for one channel, it advances to the next sixty-minute segment of the day to add up all its values. Reference program code routine V270-AGGR-VIEWING-SEC-ONDS-30M.

FIG. 40 illustrates an exemplary flowchart describing the process for calculating aggregate viewing across all channels for each sixty-minute segment of the day by the House Demographic Measurement Engine 200, according to one embodiment. The process begins with Calculate Aggregate Viewing for Sixty Minute Segment 764. This routine is called once for each Demographic Code. The objective of this routine is to Calculate Aggregate Viewing During Each sixty-minute segment of the day.

Once inside main process (766), the outer loop goes across the sixty-minute segment of the day, the inner loop goes down the channels. As the Engine 200 goes down the Channels (Ref FIG. 15 CHAN-VD-CHANNEL-CALL-SIGN-TRGT 3230), it is adding up the aggregate viewing seconds from each channel+Sixty-minute segment of the day (Ref FIG. 15 AGG-CHAN-VIEW-SEC-THIS-60-MIN 3300). The result is being saved in the Sixty Minute level aggregate viewing seconds (Ref FIG. 16 S60-AGGR-VIEWING-SECONDS 3440). When the Engine 200 completes adding up all the viewing seconds from the various channels for one sixty minute segment, it advances to the next sixty-minute segment of the day to add up all the values for the channels for the sixty minute segment.

This is repeated for all the sixty-minute segments of the day and then for each channel therein. When the last sixty-minute segment of the day has been processed, the process is done. Reference program code routine V270-AGGR-VIEWING-SECONDS-60.

Figure 41:
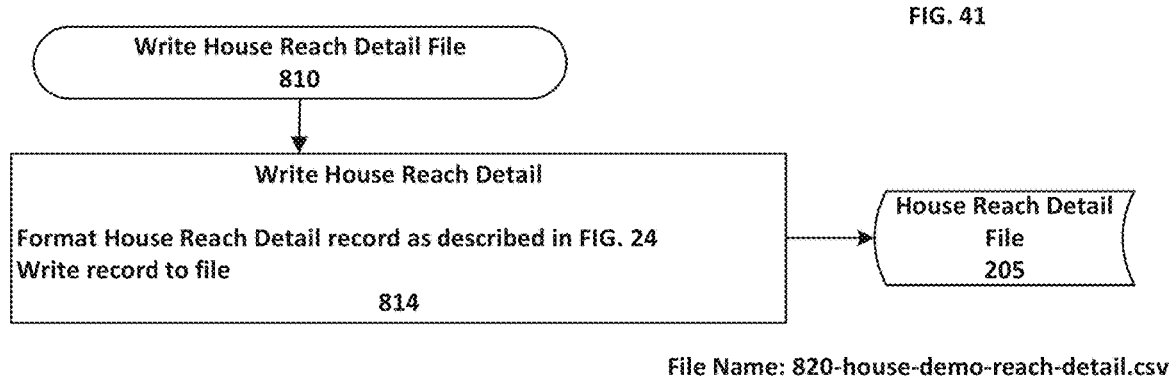
FIG. 41 illustrates an exemplary process for writing the House Reach Detail file 205, according to one embodiment.

FIG. 41 illustrates an exemplary flowchart for writing the House Reach Detail file 205, according to one embodiment. The process begins with Write House Reach Detail File 810. The Measurement Engine 200 then proceeds to Write House Reach Detail 814 where it does the following:
Format record House Reach Detail record as described in FIG. 24
Write record to file House Reach Detail file 205
Reference W100-WRITE-HOUSE-REACH-DETAIL for the program code.

Figure 42:
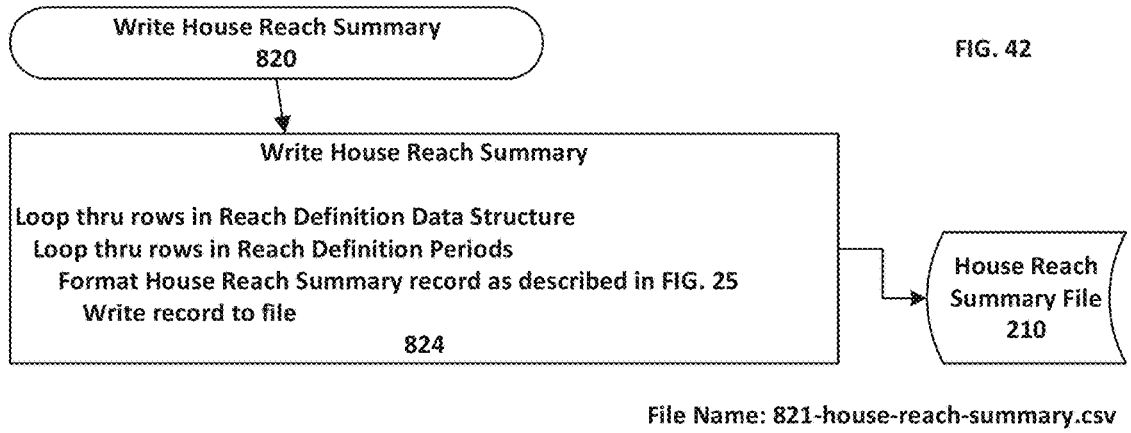
FIG. 42 illustrates an exemplary process for writing the House Reach Summary file 210, according to one embodiment.

FIG. 42 illustrates an exemplary flowchart for writing the House Reach Summary file 210, according to one embodiment. The process begins with Write House Reach Summary 820. The Measurement Engine 200 then proceeds to Write House Reach Summary 824 where it does the following:
Loop thru rows in Reach Definition Data Structure
Loop thru rows in Reach Definition Periods
Format House Reach Summary record as described in FIG. 25
Write record to file House Reach Summary file 210
Reference W200-WRITE-HOUSE-REACH-SUMMARY for the program code.

Figure 43:
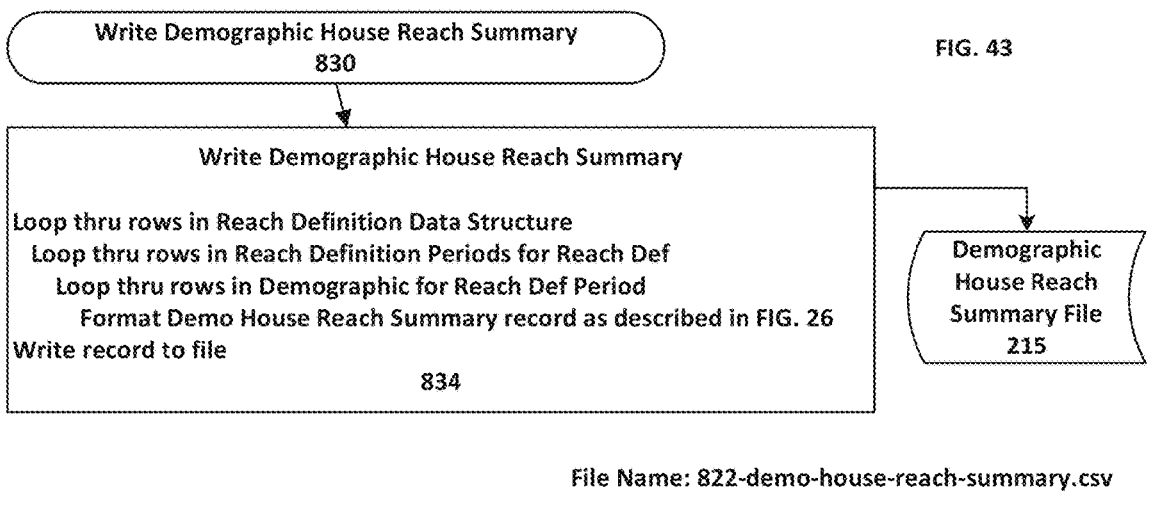
FIG. 43 illustrates an exemplary process for writing the Demographic House Reach Summary file 215, according to one embodiment.

FIG. 43 illustrates an exemplary process for writing the Demographic House Reach Summary file 215, according to one embodiment. The process begins with Write Demographic House Reach Summary 830. The Measurement Engine 200 then proceeds to Write Demographic House Reach Summary 834 where it does the following:
Loop thru rows in Reach Definition Data Structure
Loop thru rows in Reach Definition Periods for Reach Def
Loop thru rows in Demographic for Reach Def Period
Format Demo House Reach Summary record as described in FIG. 26
Write record to file Demographic House Reach Summary file 215
Reference W300-WRIT-DEMO-HOUSE-REACH-SUM for the program code.

Figure 44:
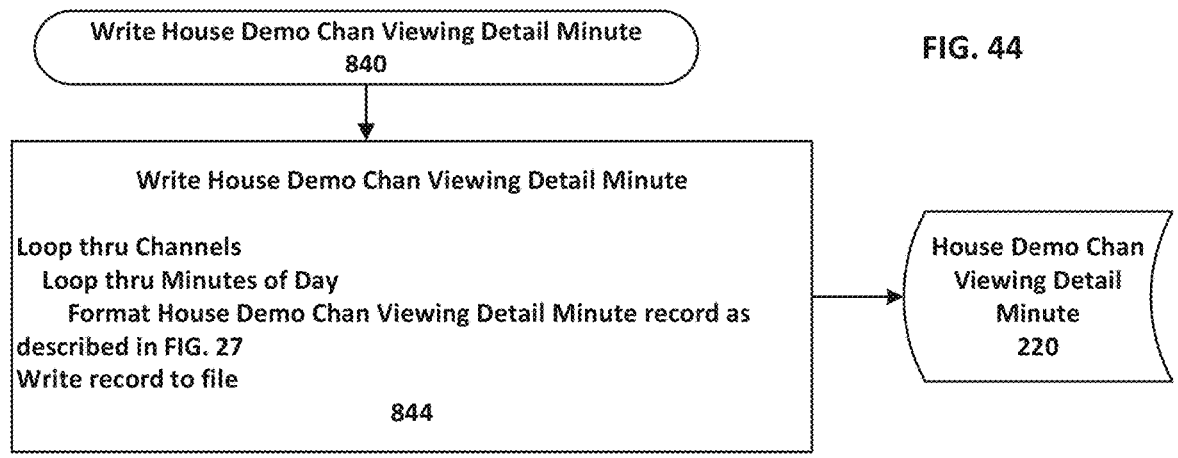
FIG. 44 illustrates an exemplary process for writing the House Demographic Channel Viewing Detail Minute file 220, according to one embodiment.

FIG. 44 illustrates an exemplary process for writing the House Demographic Channel Viewing Detail Minute file 220, according to one embodiment. The process begins with Write House Demo Chan Viewing Detail Minute 840. The Measurement Engine 200 then proceeds to Write House Demo Chan Viewing Detail Minute 844 where it does the following:
Loop thru Channels
Loop thru Minutes of Day
Format House Demo Chan Viewing Detail Minute record as described in FIG. 27
Write record to file House Demographic Channel Viewing Detail Minute file 220
Reference X100-WRITE-CHAN-VIEW-DTL-MINUT for the program code.

Figure 45:
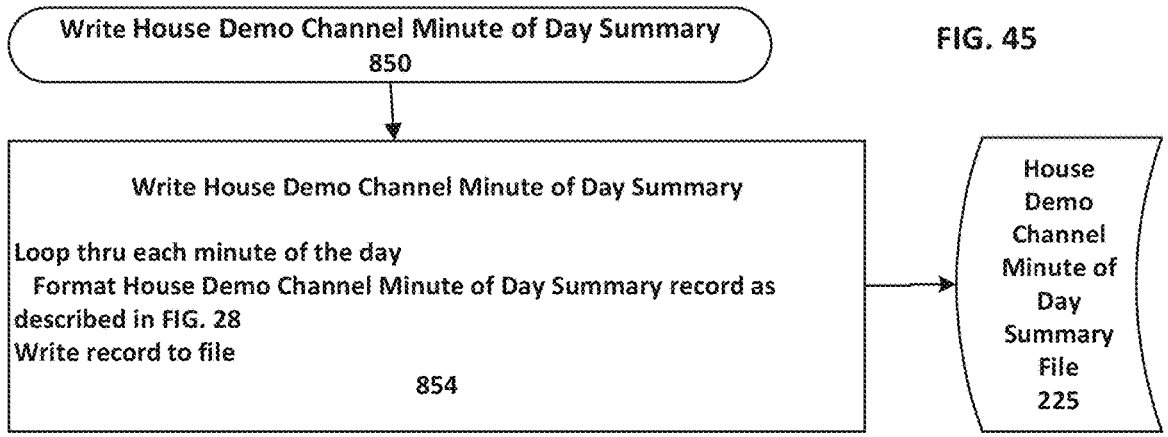
FIG. 45 illustrates an exemplary process for writing the House Demographic Channel Minute of Day Summary file 225, according to one embodiment.

FIG. 45 illustrates an exemplary process for writing the House Demographic Channel Minute of Day Summary file 225, according to one embodiment. The process begins with Write House Demo Channel Minute of Day Summary 850. The Measurement Engine 200 then proceeds to Write House Demo Channel Minute of Day Summary 854 where it does the following:
Loop thru each minute of the day
Format House Demo Channel Minute of Day Summary record as described in FIG. 28
Write record to file House Demographic Channel Minute of Day Summary file 225
Reference X300-WRITE-CHAN-MIN-DAY-SUM-DB for the program code.

Figure 46:
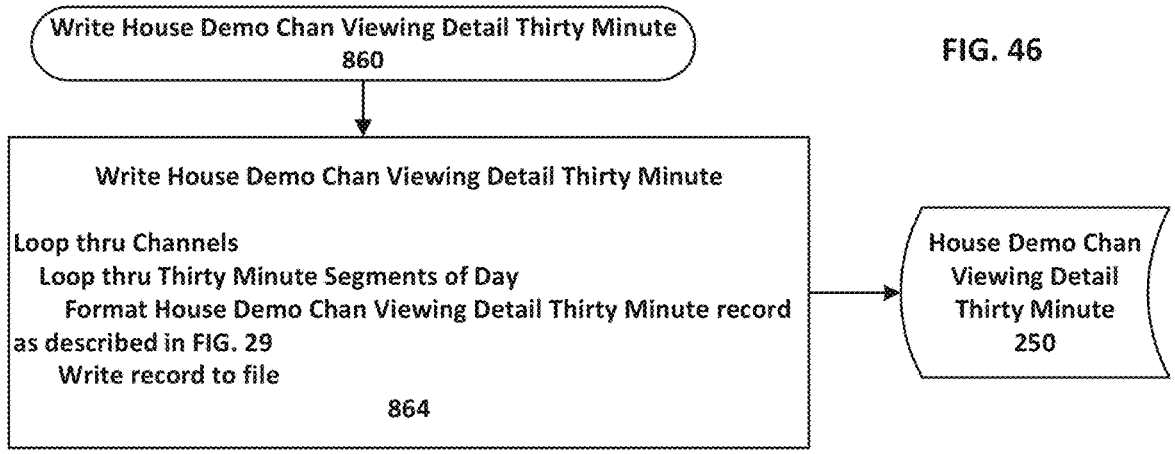
FIG. 46 illustrates an exemplary process for writing the House Demographic Channel Viewing Detail Thirty-Minute file 250, according to one embodiment.

FIG. 46 illustrates an exemplary process for writing the House Demographic Channel Viewing Detail Thirty-Minute file 250, according to one embodiment. The process begins with Write House Demo Chan Viewing Detail Thirty Minute 860. The Measurement Engine 200 then proceeds to Write House Demo Chan Viewing Detail Thirty Minute 864 where it does the following:
Loop thru Channels
Loop thru Thirty Minute Segments of Day
Format House Demo Chan Viewing Detail Thirty Minute record as described in FIG. 29
Write record to file House Demographic Channel Viewing Detail Thirty-Minute file 250
Reference Z100-WRITE-CHAN-VIEW-DTL-30MIN for the program code.

Figure 47:
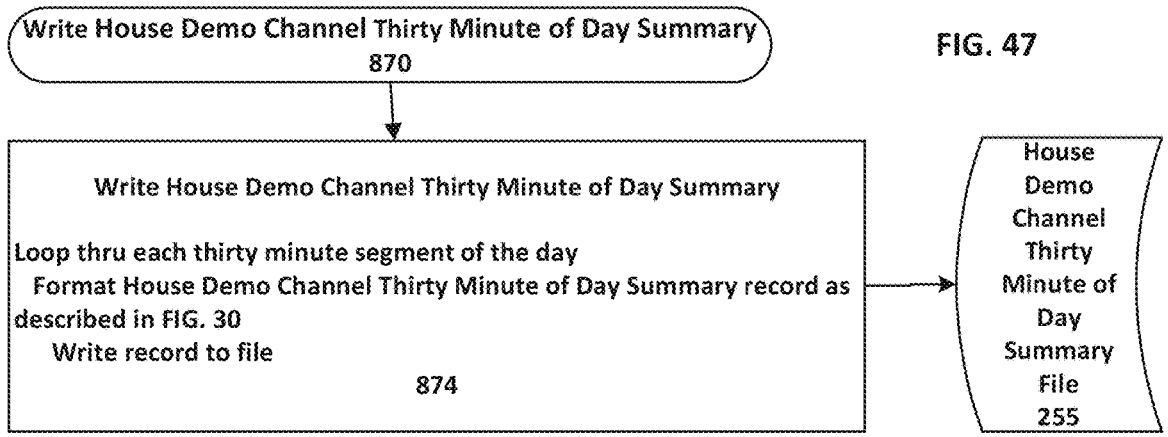
FIG. 47 illustrates an exemplary process for writing the House Demographic Channel Thirty-Minute of Day Summary file 255, according to one embodiment.

FIG. 47 illustrates an exemplary process for writing the House Demographic Channel Thirty-Minute of Day Summary file 255, according to one embodiment. The process begins with Write House Demo Channel Thirty Minute of Day Summary 870. The Measurement Engine 200 then proceeds to Write House Demo Channel Thirty Minute of Day Summary 874 where it does the following:
Loop thru each thirty minute segment of the day
Format House Demo Channel Thirty Minute of Day Summary record as described in FIG. 30
Write record to file House Demographic Channel Thirty-Minute of Day Summary file 255
Reference Z300-WRT-CHN-30-MIN-DAY-SUM-DB for the program code.

Figure 48:
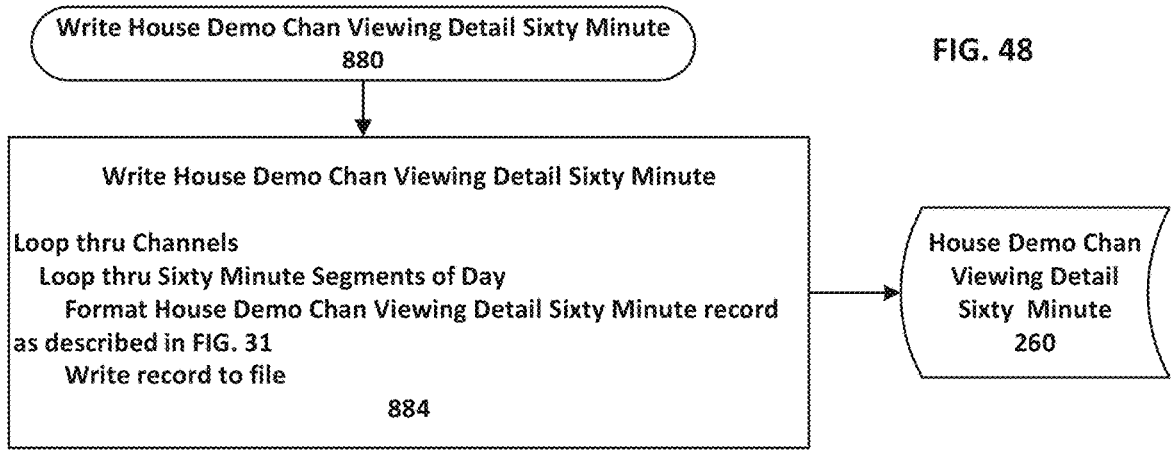
FIG. 48 illustrates an exemplary process for writing the House Demographic Channel Viewing Detail Sixty-Minute file 260, according to one embodiment.

FIG. 48 illustrates an exemplary process for writing the House Demographic Channel Viewing Detail Sixty-Minute file 260, according to one embodiment. The process begins with Write House Demo Chan Viewing Detail Sixty Minute 880. The Measurement Engine 200 then proceeds to Write House Demo Chan Viewing Detail Sixty Minute 884 where it does the following:

Loop thru Channels
    Loop thru Sixty Minute Segments of Day
        Format House Demo Chan Viewing Detail Sixty Minute record as described in FIG. 31
        Write record to file House Demographic Channel Viewing Detail Sixty-Minute file 260

Reference Z100-WRITE-CHAN-VIEW-DTL-60MIN for the program code.

Figure 49:
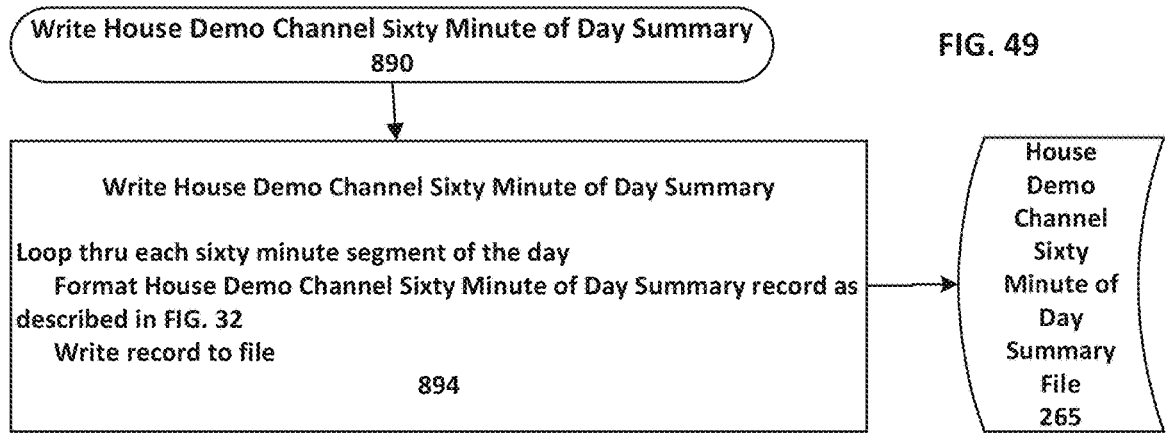
FIG. 49 illustrates an exemplary process for writing the House Demographic Channel Sixty-Minute of Day Summary file 265, according to one embodiment.

FIG. 49 illustrates an exemplary process for writing the House Demographic Channel Sixty-Minute of Day Summary file 265, according to one embodiment. The process begins with Write House Demo Channel Sixty Minute of Day Summary 890. The Measurement Engine 200 then proceeds to Write House Demo Channel Sixty Minute of Day Summary 894 where it does the following:

Loop thru each sixty minute segment of the day
    Format House Demo Channel Sixty Minute of Day Summary record as described in FIG. 32
    Write record to file House Demographic Channel Sixty-Minute of Day Summary file 265

Reference Z300-WRT-CHN-60-MIN-DAY-SUM-DB for the program code.

FIG. 50 illustrates summary information and an exemplary record layout for the Input Parameters file 125 which is used as input to the Measurement Engine 200 to control various aspects of processing, according to one embodiment. FIG. 50 contains Summary Information followed by the Data Structure description. In the source code there are additional parameters that are not relevant to this Specification.

ALTERNATIVE EMBODIMENTS

Note that the specification and drawings and program code use certain terms interchangeably. The reader will note this most frequently with the terms set-top box and video asset viewing device. The reader will appreciate that a set-top box is merely a specific kind of video asset viewing device. A smart phone, a tablet device, a gaming console are all examples of video asset viewing device. Thus any reference to a set-top box should be read to also include any kind of a video asset viewing device.

Although the description above contains much specificity, this should not be construed as limiting the scope of the embodiments but as merely providing illustrations of some of several embodiments. As a nonlimiting example, additional qualifiers may be added along with demographic and geographic codes. Additional calculations can be done once the data is loaded to the various data structures.

Methods for Receiving Data

I presently contemplate Channel Mapping Definition File 120, and the Enriched Video Viewing Event File 170, and the Household Reach Definition File 180, and the Demographic Code File 190 data being provided in flat files, but another embodiment may provide this data in any computer readable format including but not limited to data base tables, XML messages, or other messaging constructs.

I presently contemplate Raw Video Viewing Event File 110 data being provided as a flat file, but another embodiment may provide this data in any computer readable format including but not limited to data base tables, XML messages, or other messaging constructs. I presently contemplate that the Unsorted Enriched Video Viewing Event File 150 data being sorted as a separate step, but another embodiment may sort this data as part of the extract from the Media Measurement Data Base 100.

Identifiers for Data

I presently contemplate using a combination of numeric and mnemonics for the various identifiers such as market, demographic code, geographic code, channel call sign, campaign id, asset id, and other similar fields, but another embodiment could use only numeric values as identifiers with links to reference tables for the descriptions of the numeric identifiers or only mnemonic identifiers.

Data Structure Specifications

I presently contemplate allowing multiple, up to 60, demographic codes, but another embodiment may allow a different number of demographic codes.

I presently contemplate allowing multiple, up to 30, channels in the Reach Period definitions, but another embodiment may allow a different number of channels in the Reach Period definitions.

I presently contemplate allowing multiple, up to 600, target channels to be tracked as the outcome of channel mapping, but another embodiment may allow a different number of target channels to be mapped.

Programming Algorithm Scope

I presently contemplate executing the algorithms described herein separately in some sequence, but another embodiment could combine multiple simple algorithms into fewer complex algorithms.

Receiving Date and Time Information

I presently contemplate that the various file formats which provide date and time information will provide such data in the format indicated whether this be (a) a date format such as YYYY-MM-DD HH:MM:SS AM/PM, or (b) a number format identifying the second of the day. Another embodiment may provide similar values that can be used to accomplish a similar result. Nonlimiting examples include UTC time, Epoch time (seconds since Jan. 1, 1970), etc. Either embodiment can be used as input to create the metrics.

I presently contemplate receiving all of the date and time values in local time, but another embodiment may provide these in Coordinated Universal Time (UTC time).

Usage of the Media Measurement Model Data Model

I presently contemplate that the Raw Video Viewing Event 110 data, and the various supporting elements will be provided in a format similar to that shown herein, but another embodiment may capture the viewing data in some other format and make that data available to the Measurement Engine 200 for analysis while still working within the spirit and scope of this disclosure.

General Information

I presently contemplate using variables having the data types and field sizes shown, but another embodiment may use variables with different data types and field sizes to accomplish a similar result.

I presently contemplate tracking viewing activity at the granularity of one second, but another embodiment may track viewing activity at a finer granularity, perhaps half-second, or tenth-second, or millisecond, or video frame. Yet another embodiment may receive data at a granularity finer than one second and round to the nearest second for use by the Measurement Engine 200.

I presently contemplate using Data Structures similar to those defined herein, but another embodiment may use a different Data Structure or Data Structures to accomplish a similar result. As a nonlimiting example, another embodiment may use database tables or other objects instead of Data Structures similar to those I have defined herein to accomplish a similar result while still working within the spirit and scope of this disclosure.

Implementation Information

I presently contemplate using the WINDOWS 7 Professional operating system from MICROSOFT Corporation, but another embodiment may use a different operating system.

I presently contemplate using FUJITSU® NetCOBOL® for WINDOWS® version 10.1 developed by FUJITSU® and distributed by Alchemy Solutions Inc, but another embodiment may use a different programming language or a different version of COBOL.

General Remarks

It will be apparent to those of ordinary skill in the art that various changes and modifications may be made which clearly fall within the scope of the embodiments revealed herein. In describing an embodiment illustrated in the drawings, specific terminology has been used for the sake of clarity. However, the embodiments are not intended to be limited to the specific terms so selected, and it is to be understood that each specific term includes all technical equivalents which operate in a similar manner to accomplish a similar purpose.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present embodiment. For example, the embodiments described herein above may be implemented in computer software using any suitable computer software language type such as, for example, C, C#, or C++ using, for example, conventional or object-oriented techniques. Such software may be stored on any type of suitable computer-readable medium or media such as, for example, a magnetic or optical storage medium. Thus, the operation and behavior of the embodiments are described in COBOL style pseudocode purely as a matter of convenience. It is clearly understood that artisans of ordinary skill would be able to design software and control hardware to implement the embodiments presented in the language of their choice based on the description herein with only a reasonable effort and without undue experimentation.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, a compact disk, an optical disk, magnetic tape, or magnetic disk. Furthermore, some of the processes may be programmed when the computer system is manufactured or via a computer-readable medium.

It can also be appreciated that certain process aspects disclosed herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, memory sticks, and hard disk drives. A computer-readable medium may also include memory storage that may be physical, virtual, permanent, temporary, semi-permanent and/or semi-temporary.

In various embodiments disclosed herein, a single component or algorithm may be replaced by multiple components or algorithms, and multiple components or algorithms may be replaced by a single component or algorithm, to perform a given function or functions. Except where such substitution would not be operative to implement the embodiments disclosed herein, such substitution is within the scope presented herein. Thus any element expressed herein as a means or a method for performing a specified function is intended to encompass any way of performing that function including, for example, a combination of elements that performs that function. Therefore, any means or method that can provide such functionalities may be considered equivalents to the means or methods shown herein.

While I have developed this embodiment on a personal computer, it can be appreciated that the "data analysis computer system" may be, for example, a wireless or wire line variety of a microcomputer, minicomputer, server, mainframe, laptop, personal data assistant (PDA), smart phone, cellular phone, cable box, pager, processor, fax machine, scanner, or any programmable device configured to transmit and receive data over a network. Computer devices disclosed herein may include memory for storing certain software applications used in obtaining, processing and communicating data. It can be appreciated that such memory may be internal or external to the disclosed embodiments. The memory may also include any means or method for storing software, including a hard disk, an optical disk, floppy disk, ROM (read only memory), RAM (random access memory), PROM (programmable ROM), EEPROM (electrically erasable PROM), and other computer-readable media.

While various embodiments have been described herein, it should be apparent, however, that various modifications, alterations and adaptations to those embodiments may occur to persons skilled in the art with the attainment of some or all of the advantages described herein. The disclosed embodiments are therefore intended to include all such modifications, alterations and adaptations without departing from the scope and spirit of the embodiments presented herein as set forth in the appended claims.

Accordingly, the scope should be determined not by the embodiments illustrated, but by the appended claims and their legal equivalents.

Conclusions, Ramifications, and Scope

In my previous Applications, I have identified numerous Conclusions, Ramifications, and Scope items. Many of those are similar for this application. The Conclusions, Ramifications, and Scope items from (1) my Application U.S. application Ser. No. 12/981,301 filed on Dec. 29, 2010, and (2) my U.S. application Ser. No. 13/052,026 filed on Mar. 18, 2011, and (3) my U.S. application Ser. No. 13/360,704 filed on Jan. 28, 2012, and (4) my U.S. application Ser. No. 13/567,073 filed on Aug. 5, 2012 are included herein by reference but not admitted to be prior art.

In this discussion below, I will focus on new ramifications introduced by this Application.

From the description above, a number of advantages of some embodiments of my House Demographic Measurement Engine 200 and its supporting processes become evident:

In this specification I have taught how to measure video asset viewing activity at a house level. This provides the information needed to determine house reach which is very important to advertisers. By measuring at a house level, the Engine 200 is eliminating duplicate viewing within the house as would happen when two or more devices in the house are tuned to the same channel at the same time. If an advertiser is paying for Reach, then it would be important to that advertiser to eliminate such duplicate viewing in the house.

Additionally, I have taught how to create one minute, thirty minute and sixty minute aggregations. These are very useful for a variety of downstream analytical work. As a nonlimiting example, the thirty and sixty minute aggregations are very useful in analyzing television program viewing which often has such a length. The format of the aggregated data is convenient for loading to a database or other persisted data store for additional analysis.

Additionally, I have taught how to create these measurements at a demographic group level. This is very useful for a variety of downstream analytical work where it is necessary to understand various demographic attributes of the viewing audience. This data can be used to gain deeper insights into demographics such as age, income, occupation, etc. of the viewers of various programs. These measures can also provide valuable insight into viewer behavior.

The ability to produce metrics that were not previously possible will provide information that is valuable to advertisers and content providers and service providers.

This method of tracking viewing activity on a second-by-second basis is contrary to the teaching of those who work with start time and duration (seconds viewed) in a relational data base model. Thus I am able to solve problems previously found insolvable when limited to using the existing techniques. I am able to provide metrics that could not be produced using existing techniques.

Subsequent Usage of the Metrics

As I have taught, the metrics produced by the Measurement Engine 200 can be loaded to a data warehouse to support additional longitudinal analysis beyond what is done by the Engine. Thus we can readily envision a myriad of uses for the metrics produced by the Measurement Engine 200, several of which I have described in detail.

All of this could be done using anonymous and/or de-identified identifiers for video viewing device, for household, and for viewer all to protect viewer privacy.

Numerous additional metrics can readily be identified by those skilled in the art. Additionally, numerous additional uses for the metrics identified herein will be readily evident to those skilled in the art.

Summary

In accordance with one embodiment, I have disclosed a computer-implemented method of using video viewer interaction data as input to a measurement engine which then calculates: demographic level and aggregate level (a) household reach for advertisements and video content based on user defined reach periods, (b) One-minute, Thirty-minute, and Sixty-minute channel viewing metrics, and (c) One-minute, Thirty-minute, and Sixty-minute aggregate viewing metrics, all based on second-by-second household level viewing activity. My teaching also shows creation of Commercial Schedule Cumulative Audience, Impressions for Reach Periods, Demographic Group Impressions, Average Audience, Average Audience Share, Average Rating, Households Using Television, and Households Using Television Percent using household level data. My design works with IP and linear video delivery. Together these metrics provide detailed information on customer viewing behavior which can be used to drive business decisions for service providers, advertisers, and content producers.

These viewing metrics meet pressing needs for detailed audience viewership information that is not presently available and thus the metrics will be of great value to the industry.

The invention claimed is:

1. A method comprising:
receiving a query for video-viewing-activity metrics;
determining, by a first computing device and based on the query and first data received from a plurality of video-asset-viewing devices, a plurality of time periods during which a video asset was output by the plurality of video-asset-viewing devices;
determining, based on a first video-asset-viewing device, of the plurality of video-asset-viewing devices, being associated with a second video-asset-viewing device, of the plurality of video-asset-viewing devices, by one or more of a common viewer or a common household, second data indicating one or more time periods, of the plurality of time periods, during which the video asset was output by at least one of the second video-asset-viewing device or the first video-asset-viewing device;
based on determining that the one or more time periods satisfies a threshold indicating content reach to the one or more of the common viewer or the common household, updating a content reach count for the video asset; and
sending, to a second computing device, a data structure indicating the content reach count for the video asset.

2. The method of claim 1, wherein the query for video-viewing-activity metrics indicates one or more time ranges comprising the plurality of time periods.

3. The method of claim 1, further comprising:
determining, based on the content reach count, a video-viewing-activity metric for the video asset.

4. The method of claim 1, wherein the data structure further indicates the one or more time periods.

5. The method of claim 1, further comprising:
determining, based on the second data, a duplicate viewing count for the one or more of the common viewer or the common household.

6. The method of claim 1, wherein the determining the second data is further based on a geographical location of the second video-asset-viewing device corresponding to a geographical location of the first video-asset-viewing device.

7. The method of claim 1, wherein the determining the plurality of time periods during which the video asset was output by the plurality of video-asset-viewing devices is based on determining, for each of the plurality of time periods, that one or more video-asset-viewing devices, of the plurality of video-asset-viewing devices, output a threshold portion of the video asset.

8. The method of claim 1, wherein the content reach count indicates a quantity of households comprising at least one video-asset-viewing device that outputs the video asset during the one or more time periods.

9. An apparatus comprising:
one or more processors; and
memory storing instructions that, when executed by the one or more processors, cause the apparatus to:
receive a query for video-viewing-activity metrics;
determine, based on the query and first data received from a plurality of video-asset-viewing devices, a plurality of time periods during which a video asset was output by the plurality of video-asset-viewing devices;
determine, based on a first video-asset-viewing device, of the plurality of video-asset-viewing devices, being associated with a second video-asset-viewing device, of the plurality of video-asset-viewing devices, by one or more of a common viewer or a common household, second data indicating one or more time periods, of the plurality of time periods, during which the video asset was output by at least one of the second video-asset-viewing device or the first video-asset-viewing device;
based on determining that the one or more time periods satisfies a threshold indicating content reach to the one or more of the common viewer or the common household, update a content reach count for the video asset; and
send, to a computing device, a data structure indicating the content reach count for the video asset.

10. The apparatus of claim 9, wherein the instructions, when executed by the one or more processors, cause the apparatus to:
determine, based on the content reach count, a video-viewing-activity metric for the video asset.

11. The apparatus of claim 9, wherein the instructions, when executed by the one or more processors, cause the apparatus to:
determine, based on the second data, a duplicate viewing count for the one or more of the common viewer or the common household.

12. The apparatus of claim 9, wherein the instructions, when executed by the one or more processors, cause the apparatus to determine the second data based on a geographical location of the second video-asset-viewing device corresponding to a geographical location of the first video-asset-viewing device.

13. The apparatus of claim 9, wherein the instructions, when executed by the one or more processors, cause the apparatus to determine the plurality of time periods during which the video asset was output by the plurality of video-asset-viewing devices based on determining, for each of the plurality of time periods, that one or more video-asset-viewing devices, of the plurality of video-asset-viewing devices, output a threshold portion of the video asset.

14. The apparatus of claim 9, wherein the content reach count indicates a quantity of households comprising at least one video-asset-viewing device that outputs the video asset during the one or more time periods.

15. A non-transitory computer-readable medium storing instructions that, when executed, cause a computing device to:
receive a query for video-viewing-activity metrics;
determine, based on the query and first data received from a plurality of video-asset-viewing devices, a plurality of time periods during which a video asset was output by the plurality of video-asset-viewing devices;
determine, based on a first video-asset-viewing device, of the plurality of video-asset-viewing devices, being associated with a second video-asset-viewing device, of the plurality of video-asset-viewing devices, by one or more of a common viewer or a common household, second data indicating one or more time periods, of the plurality of time periods, during which the video asset was output by at least one of the second video-asset-viewing device or the first video-asset-viewing device;
based on determining that the one or more time periods satisfies a threshold indicating content reach to the one or more of the common viewer or the common household, update a content reach count for the video asset; and
send, to a computing device, a data structure indicating the content reach count for the video asset.

16. The computer-readable medium of claim 15, wherein the instructions, when executed, further cause the computing device to:
determine, based on the content reach count, a video-viewing-activity metric for the video asset.

17. The computer-readable medium of claim 15, wherein the instructions, when executed, further cause the computing device to:
determine, based on the second data, a duplicate viewing count for the one or more of the common viewer or the common household.

18. The computer-readable medium of claim 15, wherein the instructions, when executed, further cause the computing device to determine the second data based on a geographical location of the second video-asset-viewing device corresponding to a geographical location of the first video-asset-viewing device.

19. The computer-readable medium of claim 15, wherein the instructions, when executed, further cause the computing device to determine the plurality of time periods during which the video asset was output by the plurality of video-asset-viewing devices based on determining, for each of the plurality of time periods, that one or more video-asset-viewing devices, of the plurality of video-asset-viewing devices, output a threshold portion of the video asset.

20. The computer-readable medium of claim 15, wherein the content reach count indicates a quantity of households comprising at least one video-asset-viewing device that outputs the video asset during the one or more time periods.

* * * * *

UNITED STATES PATENT AND TRADEMARK OFFICE
CERTIFICATE OF CORRECTION

| | | |
|---|---|---|
| PATENT NO. | : 11,968,421 B2 | |
| APPLICATION NO. | : 17/662149 | |
| DATED | : April 23, 2024 | |
| INVENTOR(S) | : Robert Alan Orlowski | |

It is certified that error appears in the above-identified patent and that said Letters Patent is hereby corrected as shown below:

In the Specification

In the Detailed Description of the Drawings

Column 21, Line 6:
After "file", insert --,--

Column 38, Line 10:
Delete "HRD_REACH_VD_HOUSE_ID)" and insert --HRD-REACH-VD-HOUSE-ID)--

Column 38, Line 12:
Delete "HOUSE_REACH_DETAIL" and insert --HOUSE-REACH-DETAIL--

Column 38, Line 13:
Delete "HRD_TUNING_ACTIVITY_DATE" and insert --HRD-TUNING-ACTIVITY-DATE--

Column 38, Line 15:
Delete "HRD_REACH_VD_MARKET" and insert --HRD-REACH-VD-MARKET--

Column 38, Line 17:
Delete "HRD_REACH_DEMO_TYPE" and insert --HRD-REACH-DEMO-TYPE--

Column 38, Line 19:
Delete "HRD_REACH_DEMO_CODE" and insert --HRD-REACH-DEMO-CODE--

Column 38, Line 21:
Delete "HRD_REACH_CAMPAIGN_ID" and insert --HRD-REACH-CAMPAIGN-ID--

Signed and Sealed this
Thirtieth Day of September, 2025

John A. Squires
*Director of the United States Patent and Trademark Office*

Column 38, Line 23:
Delete "HRD_REACH_ASSET_ID" and insert --HRD-REACH-ASSET-ID--

Column 38, Line 41:
Delete "count (distinct HRD-REACH-VD-HOUSE-ID)" and insert --distinct HRD-REACH-VD-HOUSE-ID--

Column 39, Line 25:
Delete "a a" and insert --a--

Column 39, Lines 41-42:
Delete "across all" and insert --for a particular--

Column 39, Line 42:
Delete "groups" and insert --group--

Column 39, Line 43:
Delete "specific reach period." and insert --defined time period which includes multiple reach periods.--

Column 39, Line 44:
After "the", insert --Demographic Group--

Column 39, Line 44-45:
Delete "a Particular Reach Period across all" and insert --Multiple Reach Periods for a particular--

Column 39, Line 45:
Delete "groups" and insert --group--

Column 39, Line 46:
Delete "as specific reach period:" and insert --defined time period which includes multiple reach periods:--

Column 42, Line 34:
Delete "DHRS-REACH-VD-DEMO-CODED" and insert --DHRS-REACH-VD-DEMO-CODE--

Column 44, Line 42:
Delete "UE ESTIMATE DATE" and insert --UE_ESTIMATE_DATE--

Column 44, Line 44:
Delete "UE MARKET" and insert --UE_MARKET--

CERTIFICATE OF CORRECTION (continued)
U.S. Pat. No. 11,968,421 B2

Column 46, Line 57:
Delete "UE ESTIMATE DATE" and insert --UE_ESTIMATE_DATE--

Column 46, Line 59:
Delete "UE MARKET" and insert --UE_MARKET--

Column 47, Line 43:
Delete "HOUSE DEMO_CHAN_VW_DETL_01_MIN," and insert
--HOUSE_DEMO_CHAN_VW_DETL_01_MIN,--

Column 48, Line 34:
Delete "HOUSE DEMO_CHAN_VW_DETL_01_MIN," and insert
--HOUSE_DEMO_CHAN_VW_DETL_O1_MIN,--